(12) United States Patent
Iwata et al.

(10) Patent No.: US 7,173,718 B2
(45) Date of Patent: Feb. 6, 2007

(54) CONTROL OF DISTRIBUTED PRINTING USING DATA OUTPUT CONTROL MODULE

(75) Inventors: Fumihiko Iwata, Nagano-ken (JP); Masashi Asakawa, Nagano-ken (JP); Akihiro Sato, Nagano-ken (JP); Akira Mochida, Nagano-ken (JP); Koki Togashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 781 days.

(21) Appl. No.: 09/980,111

(22) PCT Filed: Apr. 5, 2001

(86) PCT No.: PCT/JP01/02967

§ 371 (c)(1),
(2), (4) Date: Nov. 30, 2001

(87) PCT Pub. No.: WO01/77808

PCT Pub. Date: Oct. 18, 2001

(65) Prior Publication Data

US 2002/0163665 A1 Nov. 7, 2002

(30) Foreign Application Priority Data

| Apr. 7, 2000 | (JP) | ............................. 2000-106535 |
| Apr. 7, 2000 | (JP) | ............................. 2000-107230 |
| Jul. 6, 2000 | (JP) | ............................. 2000-205550 |

(51) Int. Cl.
*G06F 3/12* (2006.01)

(52) U.S. Cl. ..................... 358/1.13; 709/203; 358/1.15

(58) Field of Classification Search ............... 358/1.13, 358/1.12, 1.15, 1.16; 709/203; 710/15
See application file for complete search history.

(56) References Cited

U.S. PATENT DOCUMENTS 5,036,476 A * 7/1991 Yamaguchi et al. ....... 358/1.18

(Continued)

FOREIGN PATENT DOCUMENTS

JP 07-064744 3/1995

(Continued)

OTHER PUBLICATIONS

Abstract of Japanese Patent Publication No. 07-064744, Pub. Date Mar. 10, 1995, Patent Abstracts of Japan.

(Continued)

*Primary Examiner*—Kimberly Williams
*Assistant Examiner*—Dillon Murphy
(74) *Attorney, Agent, or Firm*—Martine Penilla & Gencarella, LLP

(57) ABSTRACT

A technique for distributed printing that ensures favorable operability within a sufficiently short time. The procedure first generates intermediate print data and executes the parallel rendering process by time sharing to sequentially convert page data on the first page of the intermediate print data into data adequate for the printers. Transmission of final print data converted for the first printer is carried out in parallel with the rendering process for the second printer. In a similar manner, transmission of converted final print data to the second printer and third printers is carried out in parallel with the rendering process for the next printer. The parallel rendering process sequentially converts page data on the second page of the intermediate print data into data adequate for the printers. Subsequently, the parallel rendering process sequentially converts page data on the third page of the intermediate print data into data adequate for the printers.

37 Claims, 36 Drawing Sheets

U.S. PATENT DOCUMENTS

| | | | | |
|---|---|---|---|---|
| 5,287,194 | A * | 2/1994 | Lobiondo | 358/296 |
| 5,564,109 | A * | 10/1996 | Snyder et al. | 710/8 |
| 5,805,777 | A * | 9/1998 | Kuchta | 358/1.13 |
| 5,978,559 | A * | 11/1999 | Quinion | 358/1.15 |
| 6,348,971 | B2 * | 2/2002 | Owa et al. | 358/1.15 |
| 6,452,607 | B1 * | 9/2002 | Livingston | 715/705 |
| 6,552,813 | B2 * | 4/2003 | Yacoub | 358/1.1 |
| 6,563,944 | B1 * | 5/2003 | Kumada | 382/162 |
| 6,606,165 | B1 * | 8/2003 | Barry et al. | 358/1.9 |
| 6,654,136 | B2 * | 11/2003 | Shimada | 358/1.15 |

FOREIGN PATENT DOCUMENTS

| | | |
|---|---|---|
| JP | 07-144459 | 6/1995 |
| JP | 07-195789 | 8/1995 |
| JP | 07-271780 | 10/1995 |
| JP | A-9-34660 | 2/1997 |
| JP | 09-146731 | 6/1997 |
| JP | 09-190312 | 7/1997 |
| JP | 09-218764 | 8/1997 |
| JP | 09-222964 | 8/1997 |
| JP | 09-231023 | 9/1997 |
| JP | 09-319533 | 12/1997 |
| JP | 10-049318 | 2/1998 |
| JP | 11-065780 | 3/1999 |
| JP | A-11-78178 | 3/1999 |
| JP | 11-143652 | 5/1999 |
| JP | 11-143661 | 5/1999 |
| JP | 11-203082 | 7/1999 |
| JP | 11-242574 | 9/1999 |
| JP | 2000-039977 | 2/2000 |
| JP | 2000-043328 | 2/2000 |
| JP | 2000-076031 | 3/2000 |
| JP | 2000-078342 | 3/2000 |

OTHER PUBLICATIONS

Abstract of Japanese Patent Publication No. 07-271780, Pub. Date: Oct. 20, 1995, Patent Abstracts of Japan.

Abstract of Japanese Patent Publication No. 09-190312, Pub. Date: Jul. 22, 1997, Patent Abstracts of Japan.

Abstract of Japanese Patent Publication No. 09-218764, Pub. Date: Aug. 19, 1997, Patent Abstracts of Japan.

Abstract of Japanese Patent Publication No. 09-319533, Pub. Date: Dec. 12, 1997, Patent Abstracts of Japan.

Abstract of Japanese Patent Publication No. 10-049318, Pub. Date: Feb. 20, 1998, Patent Abstracts of Japan.

Abstract of Japanese Patent Publication No. 11-143661, Pub. Date May 28, 1999, Patent Abstracts of Japan.

Abstract of Japanese Patent Publication No. 11-203082, Pub. Date: Jul. 30, 1999, Patent Abstracts of Japan.

Abstract of Japanese Patent Publication No. 2000-076031, Pub. Date: Mar. 14, 2000, Patent Abstracts of Japan..

Abstract of Japanese Patent Publication No. 11-242574, Pub. Date Sep. 7, 1999, Patent Abstracts of Japan.

Abstract of Japanese Patent Publication No. 2000-043328, Pub. Date: Feb. 15, 2000, Patent Abstracts of Japan.

Abstract of Japanese Patent Publication No. 09-146731, Pub. Date: Jun. 6, 1997, Patent Abstracts of Japan.

Abstract of Japanese Patent Publication No. 11-065780, Pub. Date: Mar. 9, 1999, Patent Abstracts of Japan.

Abstract of Japanese Patent Publication No. 11-143652, Pub. Date: May 28, 1999, Patent Abstracts of Japan.

Abstract of Japanese Patent Publication No. 2000-078342, Pub. Date: Mar. 14, 2000, Patent Abstracts of Japan.

Abstract of Japanese Patent Publication No. 07-144459, Pub. Date: Jun. 6, 1995, Patent Abstracts of Japan.

Abstract of Japanese Patent Publication No. 07-195789, Pub. Date: Aug. 1, 1995, Patent Abstracts of Japan.

Abstract of Japanese Patent Publication No. 09-222964, Pub. Date: Aug. 26, 1997, Patent Abstracts of Japan.

Abstract of Japanese Patent Publication No. 09-231023, Pub. Date: Sep. 5, 1997, Patent Abstracts of Japan.

Abstract of Japanese Patent Publication No. 11-242574, Pub. Date: Sep. 7, 1999, Patent Abstracts of Japan.

Abstract of Japanese Patent Publication No. 2000-039977, Pub. Date: Feb. 8, 2000, Patent Abstracts of Japan.

* cited by examiner

Fig. 10

| id5 \ id4 | CE11 By Printer | CE12 By Copy or Page |
|---|---|---|
| No Marked Page | | |
| Marked Page Head | | |
| Marked Page End | | |
| Marked Page Head + End | | |

Fig. 18

| Output Resources | Page Numbers |
|---|---|
| Printer 60 | 1、2、3、4 |
| Printer 70 | 5、1、2、3、4、5、1、2 |
| Printer 80 | 3、4、5、1、2、3、4、5 |

Fig. 19

| Output Resources | Page Numbers |
|---|---|
| Printer 60 | 1、2、3、4、5 |
| Printer 70 | 1、2、3、4、5、1、2、3、4、5 |
| Printer 80 | 1、2、3、4、5 |

| GROUP NAMES | PRINTER NAMES | COMMENTS |
|---|---|---|
| MONOCHROMATIC LASER | LP-100,LP-200,LP-300 | ... |
| INK JET | PM-700C,PM-750C,PM-770C | ... |
| | | |
| | | |

Fig.40

| Output Resources | Page Numbers |
|---|---|
| Printer 60 | 1st page, 2nd page, 3rd page |
| Printer 70 | 1st page, 2nd page, 3rd page |
| Printer 80 | 1st page, 2nd page, 3rd page |

CONTROL OF DISTRIBUTED PRINTING USING DATA OUTPUT CONTROL MODULE

TECHNICAL FIELD

The present invention relates to a technique of outputting print data of interest, which are to be printed, to multiple printers in a distributive manner.

BACKGROUND ART

Recent advancement of the computer network enables a plurality of printers to be readily connected to one information processing apparatus like a personal computer. In the structure where one information processing apparatus connects with multiple printers, print data generated by the information processing apparatus may be output to the respective printers in a distributive manner. When there is a large mass of print data, it takes an undesirably long time to complete printing with only one printer Output of the print data to multiple printers in a distributive manner desirably shortens the total time required for printing.

The prior art technique has a variety of operatability-related problems discussed below.

Problems Regarding Operatability of Printing

The prior art technique requires the operator to adequately divide a document to be printed and individually output a print command to the multiple printers. This makes the series of operations significantly complicated and leads to poor operatability and insufficiently shortened printing time.

It is thus highly demanded to attain the good operatability and the high-speed distributed printing.

Problems Regarding Acquisition of Favorable Resulting Prints

In the prior art technique, it is required to set various pieces of information in an information processing apparatus for distributed printing. The various pieces of information to be set include information on the printer names for identifying printers specified as destinations of distribution and paper-related information like the paper size and the paper type. A data input window is open on a display, and the operator inputs data on the window through operations of a keyboard and a mouse, so as to set the required pieces of information.

The information processing apparatus notifies each printer specified by the printer name of information regarding the printing performance of the printer, such as the paper-related information, prior to actual distributive output of the print data to the respective printers. Each printer prepares for printing to satisfy the paper-related information, based on such notification. The information processing apparatus then outputs the print data to each printer that has been ready for printing.

In this prior art arrangement, the setting with regard to the paper-related information may be out of the range of the printing performance possessed by a certain printer specified as the destination of distribution. For example, A3 may be set to the paper size, while the certain printer specified as the destination of distribution is capable of printing up to the size A4. The printing requirement with the A3 paper to the printer having the printing performance of up to the size A4 does not ensure the favorable resulting print from the printer.

It is accordingly demanded to adequately set various pieces of information, such as the paper-related information, and thereby ensure preferable resulting prints.

Problems Regarding Coincidence of Printing Area

In the prior art technique, when the multiple printers specified as destinations of distribution are of different types, printing on sheets of an identical size with different printers does not ensure an identical printing area on the sheets. This causes some irregularity in resulting prints. Each printer has an unprintable area on the paper area, and the size of the unprintable area depends upon the type of the printer. This leads to a variation in printable area among different types of printers. Here the unprintable area represents any area that does not allow printing, due to the relation of the sheet feed mechanism to paper, for example, a lower end or a right end of the paper.

It is accordingly demanded to enable resulting prints having a perfectly identical size and position of the printing area to be obtained from the multiple printers specified as the destinations of distribution.

DISCLOSURE OF THE INVENTION

The object of the present invention is thus to solve at least part of the above problems and to ensure favorable resulting prints with good operatability.

The present invention is directed to a first distributed printing control apparatus, which includes: a data allocation module that divides print data, which is an object to be printed, by page and specifies information representing pages allocated to multiple printers; and a data output control module that outputs the print data in a distributive manner to the multiple printers according to the information specified by the data allocation module. The first distributed printing control apparatus is capable of printing multiple copies of the print data according to a requirement. The data allocation module arranges pages included in each copy in a sequence of the pages, divides all the pages of the multiple copies into the number of the multiple printers specified as destinations of distribution, and allocates respective divisions to the multiple printers. The data output control module carries out the distributive output of the print data to the multiple printers in a substantially parallel manner, the data output control module converting the print data of each page, sequentially from a head page of each division, to a format suitable for each printer specified as the destination of distribution and then performing each distributive output.

In the first distributed printing control apparatus of the above construction, the data allocation module specifies allocation of the respective pages of the print data to the multiple printers. The operator is thus not required to individually output the print command to each of the printers specified as the destinations of distribution. This arrangement thus ensures favorable operatability. In this first distributed printing control apparatus, the distributive output of the print data to the respective printers is performed in a substantially parallel manner. The data output control module converts the print data of each page, sequentially from a head page of each division, to a format suitable for each printer specified as the destination of distribution and then performing each distributive output.

The technique of the present invention carries out the series of processing to obtain the print data of the head page adequate for the respective printers sequentially: that is, the head page allocated to the first printer, the head page allocated to the second printer, and the head page allocated to the third printer. While the series of processing is executed for the head page allocated to the second printer, the print data obtained as the result of the processing for the head page allocated to the first printer is output to the first printer.

The process of generating the print data adequate for a certain printer is thus carried out in parallel with the process of outputting the previously obtained data to another printer. Compared with the prior art technique, this technique effectively shortens the total time required for printing.

In accordance with one preferable application, the first distributed printing control apparatus further includes: a virtual printer driver storage module that stores a virtual printer driver for specifying information on a virtual printer corresponding to the multiple printers; and an intermediate print data generation module that executes the virtual printer driver and thereby obtains intermediate print data, which is adequate for the virtual printer, from an application program that generates source data of the print data. The intermediate print data thus obtained is specified as the print data used in the data allocation module and the data output control module.

In the first distributed printing control apparatus with the virtual printer driver, the intermediate print data is obtained by outputting only one print command from the application program to the virtual printer driver. The distributed printing of the intermediate print data to the respective printers is carried out automatically. The operator is thus required to carry out only one series of printing operation on the application program. This arrangement effectively ensures excellent operatability.

The present invention is also directed to a second distributed printing control apparatus, which includes: a data allocation module that divides print data, which is an object to be printed, by page and specifies information representing pages allocated to multiple printers; a data output control module that outputs the print data in a distributive manner to the multiple printers according to the information specified by the data allocation module; and a printer speed performance detection module that detects a performance on a printing speed of each of the multiple printers. The data allocation module specifies the pages allocated to the multiple printers according to the performance on the printing speed of each printer detected by the printer speed performance detection module.

In the second distributed printing control apparatus of the above construction, the data allocation module specifies allocation of the respective pages of the print data to the multiple printers. The operator is thus not required to individually output the print command to each of the printers specified as the destinations of distribution. This arrangement thus ensures favorable operatability. In this second distributed printing control apparatus, the number of pages to be allocated to each of the multiple printers is specified according to the performance information on the printing speed of each printer. This arrangement enables the printer with the high printing speed performance to print a large number of pages, while causing the printer with the low printing speed performance to print a small number of pages. This makes the respective printers conclude the printing operations almost simultaneously, thus effectively shortening the total time required for printing.

In accordance with one preferable application, the second distributed printing control apparatus further includes a distribution information setting module that causes an input window to be displayed on a display device and sets various pieces of information regarding distribution of the print data based on input data from an input device. The data allocation module specifies the pages allocated to the multiple printers, based on the various pieces of information set by the distribution information setting module. The distribution information setting module has a display control module that generates an illustrated image, which includes an arrangement of printing media and corresponds to the information specified by the data allocation module, based on the various pieces of information and causes the illustrated image to be displayed on the display device.

The operator sees the illustrated image displayed by the display control module and is thereby informed of the form of distributed printing in the process of setting the various pieces of distribution-related information in the input window. This visually informs the operator of the distributed form prior to actual execution of the distributed printing, thus further enhancing the operatability.

The present invention is further directed to a third distributed printing control apparatus, which includes: a data allocation module that divides print data, which is an object to be printed, by page and specifies information representing pages allocated to multiple printers; and a data output control module that outputs the print data in a distributive manner to the multiple printers according to the information specified by the data allocation module. The data allocation module specifies number of pages to be allocated to each of the multiple printers, such that each specified set of pages are printed with an identical printer.

In the third distributed printing control apparatus of the above construction, the data allocation module specifies allocation of the respective pages of the print data to the multiple printers. The operator is thus not required to individually output the print command to each of the printers specified as the destinations of distribution. This arrangement thus ensures favorable operatability In this third distributed printing control apparatus, the number of pages to be allocated to each of the multiple printers is specified, such that each specified set of pages are printed with an identical printer. The resulting print obtained from each printer that has concluded the printing operation is the specified set of pages. This arrangement thus ensures excellent operatability in collection of resulting prints.

In accordance with one preferable application, the third distributed printing control apparatus further includes a printer speed performance detection module that detects a performance on a printing speed of each of the multiple printers. The data allocation module specifies the number of pages to be allocated to each printer, such that each specified set of pages are printed with an identical printer, in response to an externally input predetermined first command. Otherwise the data allocation module specifies the number of pages to be allocated to each printer according to the performance on the printing speed of each printer detected by the printer speed performance detection module.

This arrangement ensures excellent operatability in collection of resulting prints in the case of input of the first command. In the case of no input of the first command, on the other hand, as discussed previously, the arrangement enables the respectively printers to conclude the printing operations almost simultaneously, thus desirably shortening the total time required for printing. Input or non-input of the first command readily changes over the mode between the speed preference mode and the print collection convenience preference mode (handling preference mode). This also ensures the excellent operatability.

In the third distributed printing control apparatus that enables the mode to be readily changed over between the speed preference mode and the handling preference mode, the data allocation module specifies the number of pages to be allocated to each printer, based on the condition that each specified set of pages are printed with an identical printer and according to the performance on the printing speed of each printer detected by the printer speed performance detection module, in response to both an externally input predetermined second command and the externally input predetermined first command.

This arrangement attains both the handling preference and the speed preference in the case of input of both the first command and the second command.

In accordance with another preferable application of the third distributed printing control apparatus, the data allocation module has a unit setting module that changes over the specified set of pages between a unit of each copy and a unit of each set of identical pages, in response to an externally input predetermined third command.

In response to the externally input third command, the specified set of pages is changed over between the unit of each copy and the unit of each set of identical pages.

In accordance with still another preferable application, the third distributed printing control apparatus further includes a distribution information setting module that causes an input window to be displayed on a display device and sets various pieces of information regarding distribution of the print data based on input data from an input device. The data allocation module specifies the pages allocated to the multiple printers, based on the various pieces of information set by the distribution information setting module. The distribution information setting module has a display control module that generates an illustrated image, which includes an array of printing media and corresponds to the information specified by the data allocation module based on the various pieces of information and causes the illustrated image to be displayed on the display device.

The operator sees the illustrated image displayed by the display control module and is thereby informed of the form of distributed printing in the process of setting the various pieces of distribution-related information in the input window. This visually informs the operator of the distributed form prior to actual execution of the distributed printing, thus further enhancing the operatability.

The present invention is also directed to a fourth distributed printing control apparatus that controls distributed printing and includes: a printer specification module that specifies multiple printers as destinations of distribution; and a distributive output module that outputs print data, which is an object to be printed, to the multiple printers specified by the printer specification module in a distributive manner. The fourth distributed printing control apparatus further includes: a condition setting module that causes a data input box for setting a predetermined condition relating to a printing performance of each printer to be displayed on a display device, receives input data into the data input box from an input device, and sets the predetermined condition based on the input data; a printer performance information collection module that collects performance information with regard to the predetermined condition from each of the multiple printers specified by the printer specification module; and a data input restriction module that restricts the input data in the data input box according to the performance information of each printer collected by the printer performance information collection module.

In the fourth distributed printing control apparatus of the above construction, the printer specification module specifies multiple printers as destinations of distribution, whereas the condition setting module sets a predetermined condition relating to the printing performance of each printer. The printer performance information collection module collects the performance information with regard to the predetermined condition from each of the multiple printers specified by the printer specification module. The data input restriction module restricts the input data in the data input box according to the collected performance information of each printer.

The predetermined condition set in the data input box accordingly reflects the performance information of each printer. The adequate setting of the predetermined condition ensures distributed printing according to the performance of the printer, thus effectively giving favorable resulting prints.

In accordance with one preferable application of the fourth distributed printing control apparatus, the data input restriction module specifies a set of performance information, which includes all the performance information of the respective printers collected by the printer performance information collection module, and restricts the input data in the data input box within a range of the specified set of performance information.

The input data in the data input box is restricted within the range of the specified set of performance information, which includes all the performance information of the respective printers with regard to the predetermined condition. This arrangement enables printing to be carried out with the performance possessed by at least one of the multiple printers specified as the destinations of distribution, thus ensuring the high-performance printing operation.

In accordance with another preferable application of the fourth distributed printing control apparatus, the data input restriction module specifies a set of common performance information, which is common to all the performance information of the respective printers collected by the printer performance information collection module, and restricts the input data in the data input box within a range of the specified set of common performance information.

The input data in the data input box is restricted within the range of the specified set of common performance information, which is common to all the performance information of the respective printers with regard to the predetermined condition. This arrangement enables printing to be carried out with the performance possessed by any of the multiple printers specified as the destinations of distribution, thus ensuring the printing operation with any of the multiple printers.

In accordance with still another preferable application of the fourth distributed printing control apparatus, the data input restriction module has a mode changeover module that selectively changes over a working mode between a first mode and a second mode, the first mode specifying a set of performance information, which includes all the performance information of the respective printers collected by the printer performance information collection module, and restricting the input data in the data input box within a range of the specified set of performance information, the second mode specifying a set of common performance information, which is common to all the performance information of the respective printers collected by the printer performance information collection module, and restricting the input data in the data input box within a range of the specified set of common performance information.

This arrangement enables the input data in the data input box to be restricted within the range of the specified set of performance information, which includes all the performance information of the respective printers with regard to the predetermined condition or within the range of the specified set of common performance information.

The fourth distributed printing control apparatus that is capable of changing over the working mode between the first mode and the second mode, the mode changeover module has a module that displays a switch for the mode changeover on the display device, receives input data for operating the switch from the input device, and gives an instruction to change over the working mode based on the input data.

The operator implements the changeover of the working mode through an operation of the input device. This arrangement thus ensures the excellent operatability.

In one preferable embodiment of the fourth distributed printing control apparatus, the condition setting module displays an option display box showing options possibly input in the data input box, together with the data input box, and sets one option selected among the options and specified from the input device as the predetermined condition, and the data input restriction module prohibits at least part of the options included in the option display box from being specified from the input device, so as to restrict the input data in the data input box.

This arrangement enables the operator to select one of the options satisfying the predetermined condition according to the performance information of the printer in the option display box, while not allowing the operator to select any of the options not satisfying the predetermined condition according to the performance information of the printer. This enhances the operatability of data input in the data input box.

In accordance with another preferable application, the fourth distributed printing control apparatus further includes a group mapping module that maps a plurality of printers to each group, wherein the printer specification module specifies the multiple printers by a unit of group mapped by the group mapping module.

This arrangement enables the multiple printers to be specified by the unit of a group as the destinations of distribution, thus ensuring favorable operatability.

In another preferable embodiment of the fourth distributed printing control apparatus, the printer specification module has a name display control module that displays names assigned to the specified multiple printers on the display device.

The display on the display device informs the operator of the multiple printers specified as the destinations of distribution.

In the fourth distributed printing control apparatus with the name display control module, the printer specification module has an input control module that displays switches, which correspond to the respective printer names displayed by the name display control module and are operated to exclude the corresponding printers from the destinations of distribution, and receives operation data of the switches from the input device. The distributive output module has an output resource exclusion module that excludes a printer, which is determined that the corresponding switch has been operated based on the operation data received by the input control module, from an output resource of the print data.

Any of the multiple printers once specified as the destinations of distribution may be excluded from the destinations of distribution through a simple operation of the corresponding switch. This arrangement ensures excellent operatability.

In still another preferable embodiment of the fourth distributed printing control apparatus, the printer specification module has a priority order specification module that specifies an order of priority allocated to the specified multiple printers, and the distributive output module carries out the distributive output by taking into account the order of priority specified by the priority order specification module.

Allocation of the order of priority to the multiple printers specified as the destinations of distribution desirably enhances convenience in collection of the resulting prints.

The fourth distributed printing control apparatus, which restricts the input data within the range of the specified set of performance information including all the performance information of the respective printers, further includes a performance decision module that determines whether or not each of the multiple printers specified by the printer specification module has a printing performance represented by the predetermined condition set by the condition setting module. The distributive output module has an output resource exclusion module that excludes a printer, which has been determined by the performance decision module not to have the printing performance, from an output resource of the print data.

The printing operation is carried out with the performance possessed by at least one of the multiple printers specified as the destinations of distribution. Some printers may thus not have the printing performance represented by the predetermined condition set by the condition setting module. Such printers are excluded from the output resources of the print data. This arrangement effectively prevents the print data from being mistakenly output to the printers without the printing performance represented by the predetermined condition.

In the fourth distributed printing control apparatus having the output resource exclusion module, the printer specification module has a name display control module that displays names of the specified multiple printers on the display device, and the name display control module has a module that prohibits distinctive display of the name of the printer, which is excluded by the output resource exclusion module.

The display on the display device informs the operator of the printer, which does not have the printing performance with regard to the predetermined condition and is thereby excluded from the destinations of distribution. This arrangement ensures excellent operatability.

In accordance with still another preferable application of the fourth distributed printing control apparatus, the printer performance information collection module receives information regarding performances of the multiple printers from printer drivers provided for respective types of the multiple printers and collects the performance information with regard to the predetermined condition from the received information.

This arrangement enables the performance information of the respective printers to be received from the printer drivers provided for the respective types of the multiple printers.

The present invention is further directed to a fifth distributed printing control apparatus, which includes: a first setting module that specifies multiple printers as destinations of distribution; a second setting module that sets paper information with regard to paper used for printing; and a distribution control module that processes externally input print data based on the specification by the first setting module and the setting by the second setting module and outputs plural divisions of the print data, which satisfy the paper information, to the multiple printers specified as the destinations of distribution. The fifth distributed printing control apparatus supplies the plural divisions of the print data output from the distribution control module to the multiple printers via printer drivers provided for the respective printers. The fifth distributed printing control apparatus further includes: an information input module that receives information with regard to an unprintable area included in a paper area in each of the multiple printers specified by the first setting module; and a printable area computation module that computes a printable area in the paper area, which is printable with any of the multiple printers, from the information of the respective printers received by the information input module. The distribution control module has an area fitting module that causes the plural divisions of the print data to be fit to the printable area computed by the printable area computation module.

The fifth distributed printing control apparatus thus constructed receives information with regard to an unprintable area included in a paper area, on which printing is performed, in each of the multiple printers specified as destinations of distribution, and computes a printable area in the paper area, which is printable with any of the multiple printers, from the received information of the respective printers. Externally input print data is distributed and output to be fit to the printable area. Each division of the print data accordingly occupies an identical printing area in any of the multiple printers specified as the destinations of distribution. This arrangement thus effectively enables resulting prints having a perfectly identical size and position of the printing area to be obtained from the multiple printers specified as the destinations of distribution.

In accordance with one preferable application of the fifth distributed printing control apparatus, the area fitting module has a margin correction module that corrects margins on each sheet of paper defined by the print data, based on the printable area computed by the printable area computation module. This arrangement makes the print data fit for the printable area by simply correcting the margins on the sheet of paper defined by the print data based on the printable area. This desirably simplifies the configuration.

In accordance with another preferable application of the fifth distributed printing control apparatus, the information input module receives the information from the printer drivers provided for the respective printers. This arrangement facilitates input of the information with regard to the unprintable area included in a certain size of paper area used in each printer.

In accordance with still another preferable application of the fifth distributed printing control apparatus, the multiple printers are connected via a computer network. The use of the computer network facilitates connection with a large number of printers.

The present invention is not restricted to the applications of the first through fifth distributed printing control apparatus es discussed above, but may be directed to corresponding distributed printing control methods. Other applications of the present invention include computer programs for attaining the functions of these apparatuses and methods and computer readable recording media in which such computer programs are recorded; Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

Still other applications of the present invention include data signals that include the computer programs and are embodied in carrier waves, as well as a program supply unit that supplies the computer programs via a communication path. In the application of the program supply unit, the computer programs are stored, for example, in a server on the computer network, and a required program is downloaded to a computer via the communication path and executed to attain the apparatuses discussed above and the corresponding methods.

BRIEF DESCRIPTION OF THE DRAWINGS

FIG. 10 shows a change of the illustrated image in the distributed form display box by the combination of the settings in data input boxes id4 and id5;

FIG. 18 shows an example of output resource list data in the speed preference mode;

FIG. 19 shows an example of output resource list data in the handling preference ode;

FIG. 40 shows an example of output resource list data.

BEST MODES OF CARRYING OUT THE INVENTION

Figure 1:
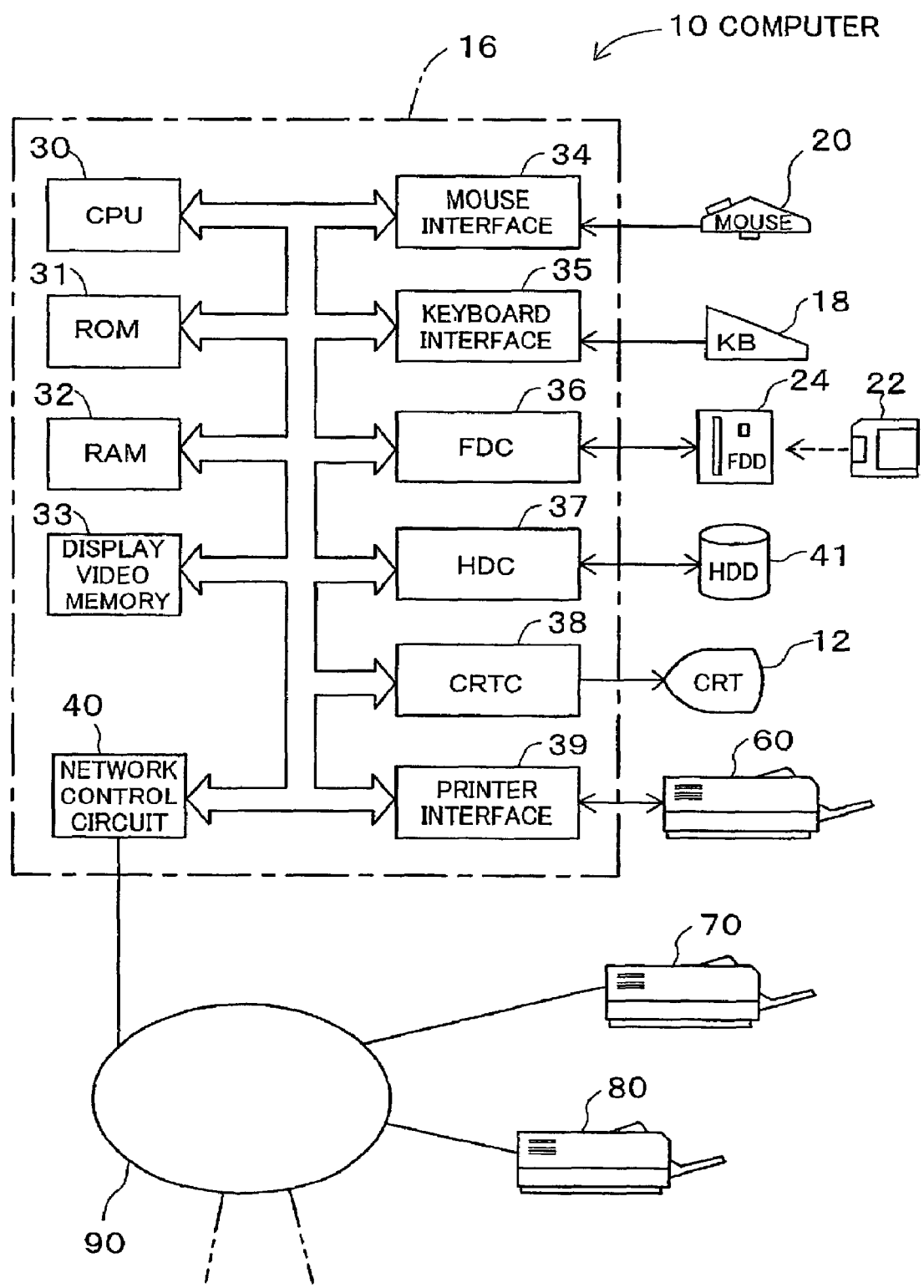
FIG. 1 is a block diagram schematically illustrating the hardware structure of a computer system in a first embodiment of the present invention.

Some modes of carrying out the present invention are discussed below as preferred embodiments in the following sequence:

A. First Embodiment
  A1. General Hardware Structure
  A2. Distributed Printing Process
  A3. Virtual Printer Driver
  A4. User Interface
  A5. Computer Programs
  A6. Effects of Embodiment B. Second Embodiment
  B1. User Interface
  B2. Computer Programs
  B3. Effects of Embodiment C. Third Embodiment
  C1. Distributed Printing Process
  C2. Computer Programs
  C3. Effects of Embodiment A1. General Hardware Structure FIG. 1 is a block diagram schematically illustrating the hardware structure of a computer system in a first embodiment of the present invention. As illustrated, the computer system of the first embodiment includes a computer 10, which is connected with a plurality of printers 70, 80, . . . having substantial computer functions via a computer network 90 constructed as a Local Area Network (LAN). The computer network 90 is, however, not restricted to the LAN but may be any of diverse networks like the Internet, an Intranet, and a Wide Area Network (WAN).

The computer 10 is further connected with a CRT display 12 as a peripheral device and is locally connected with another printer 60. The computer 10 has a computer main body 16, a keyboard 18, and a mouse 20. The computer main body 16 has a floppy disk drive 24 to read the contents of a floppy disk 22.

The computer main body 16 includes a central processing unit or CPU 30, a ROM 31, a RAM 32, a display video memory 33, a mouse interface 34, a keyboard interface 35, an FDC 36, an HDC 37, a CRTC 38, a printer interface 39, and a network control circuit 40, which are mutually connected via a bus.

The ROM 31 is a built-in read only memory that stores therein diverse programs. The RAM 32 is a readable and writable memory that stores various data therein. The display video memory 33 stores video data representing images to be displayed on the CRT display 12. The mouse interface 34 takes charge of transmission of data to and from the mouse 20. The keyboard interface 35 takes charge of key inputs from the keyboard 18. The FDC 36 is a floppy disk controller for controlling the floppy disk drive (FDD) 24. The HDC 37 is a hard disk controller for controlling a hard disk drive (HDD) 41. The CRTC 38 is a CRT controller for controlling display of images on the CRT display 12 based on the display video data stored in the display video memory 33. The printer interface 39 controls data output to the locally connected printer 14. The network control circuit 40 includes a network card and is connected to the computer network 90.

In this computer system, an operating system is stored in the HDD 41. In response to power supply to the computer main body 16, the operating system is loaded into a predetermined area in the RAM 32 according to a loader written in a boot block of the HDD 41. A real printer driver provided for each of the types of the printers 60, 70, and 80 is stored in advance in the floppy disk 22 and is installed from the floppy disk drive 24 into the computer 10 according to an activated preset installation program. The installed real printer driver is stored in the HDD 41, and is incorporated in the operating system and loaded into a predetermined area of the RAM 32 in response to power supply to the computer 10.

The computer system further includes a virtual printer driver 110 for specifying information on a virtual printer. Like the real printer driver, the virtual printer driver 110 is stored in advance in the floppy disk and is installed from the floppy disk drive 24 into the computer 10 according to an activated preset installation program. The installed virtual printer driver 110 is stored in the HDD 41, and is incorporated in the operating system and loaded into a predetermined area of the RAM 32 in response to power supply to the computer 10. The computer program of the virtual printer driver 110 may be stored in another portable recording medium (carriable recording medium), such as a CD-ROM, a magneto-optic disc, or an IC card, in place of the floppy disk 22. This computer program may be program data, which are downloaded from a specific server connecting with an external computer network (for example, the Internet) via the computer network and transferred to either the RAM 32 or the HDD 41.

The printers 60, 70, and 80 are laser printers that paints a photosensitive drum with a laser beam to form a latent image, which is developed by a toner and transferred onto a sheet. Diverse printers like ink jet printers and thermal transfer printers may alternatively be applied for the printers 60, 70, and 80. Here the printers 60, 70, and 80 are of respectively different types.

A2. Distributed Printing Process

In the computer system of the above configuration, the computer main body 16 generates print data to be printed and carries out a distributed printing process to distribute the generated print data into the printers 60, 70, and 80 connecting with the computer main body 16 for printing. The details of the distributed printing process are discussed below.

Figure 2:
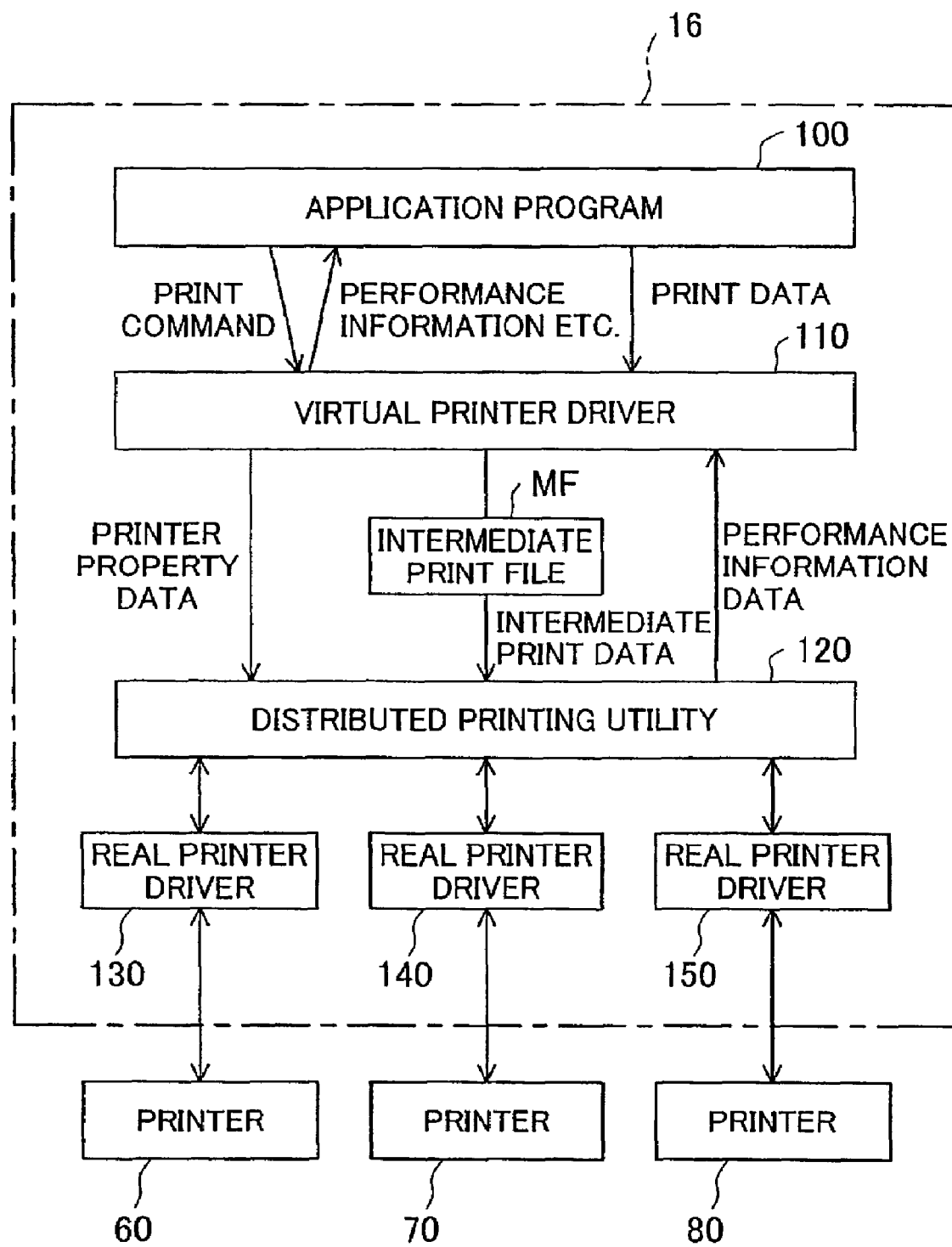
FIG. 2 is a block diagram schematically illustrating the general flow of a distributed printing process.
Figure 3:
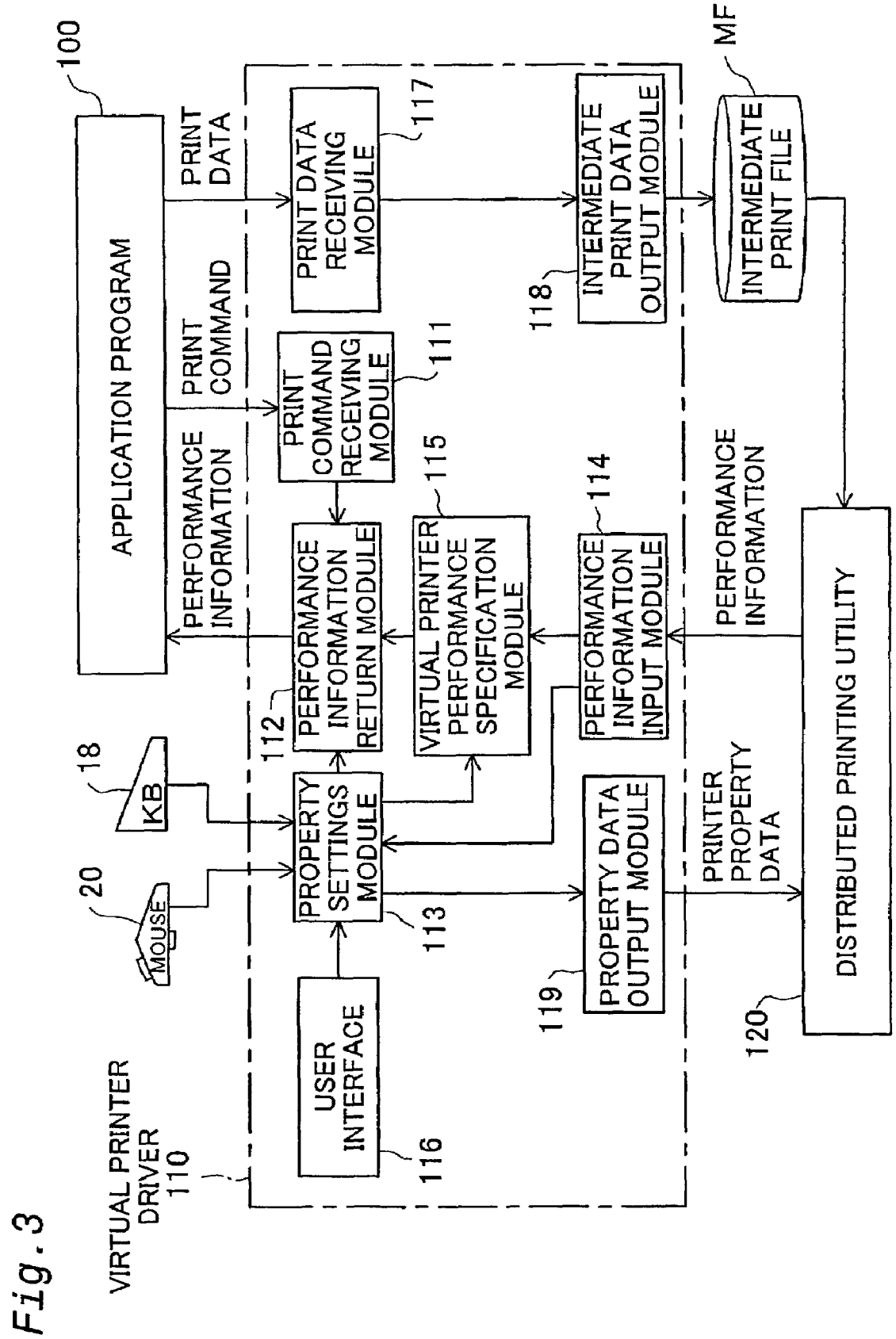
FIG. 3 is a block diagram showing the functions of a virtual printer driver 110 in the distributed printing process.
Figure 4:
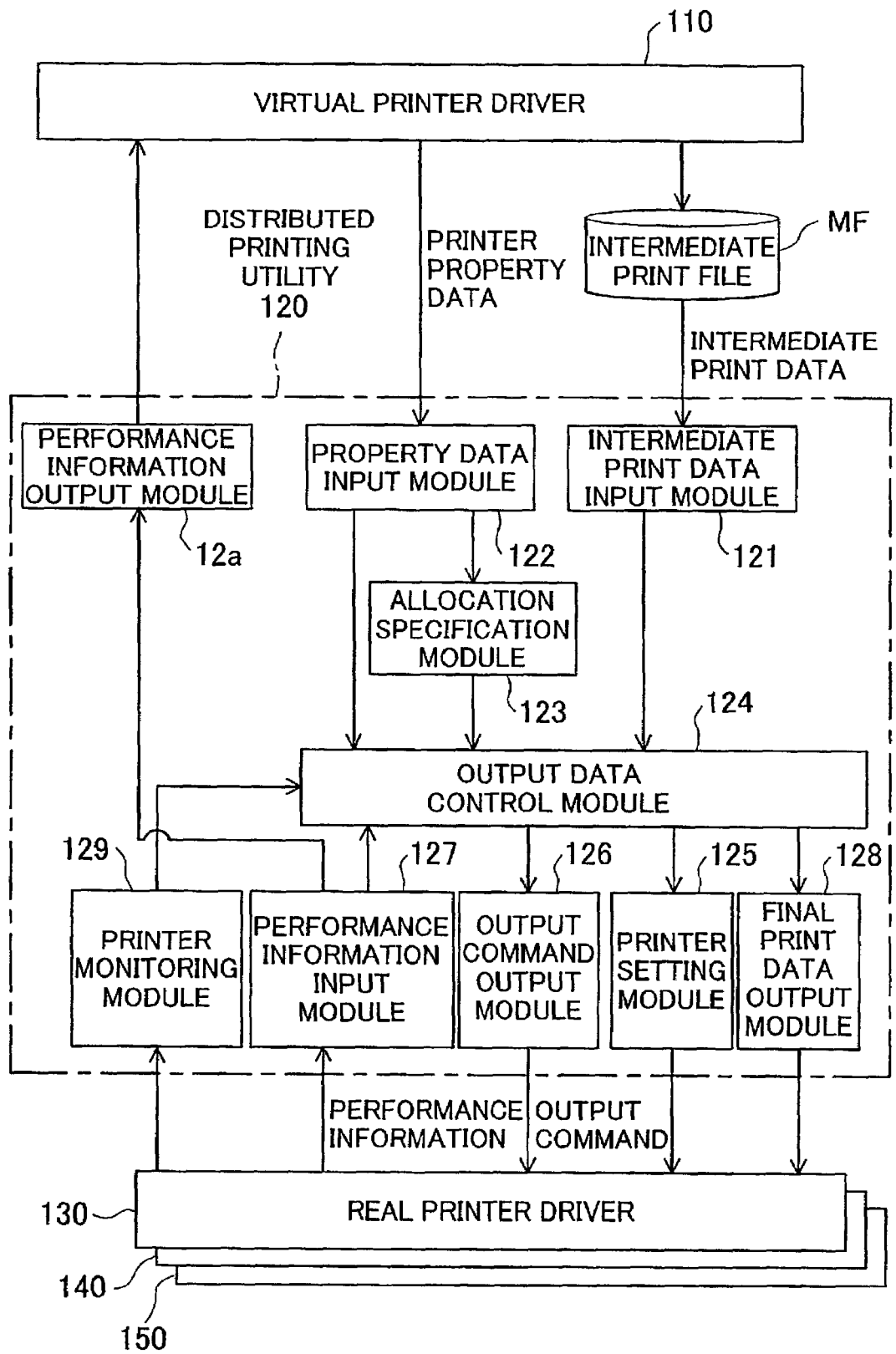
FIG. 4 is a block diagram showing the functions of a distributed printing utility 120, which actualizes part of the distributed printing process.

FIG. 2 is a block diagram schematically illustrating the general flow of the distributed printing process. FIG. 3 is a block diagram showing the functions of the virtual printer driver 110 in the distributed printing process. FIG. 4 is a block diagram showing the functions of a distributed printing utility program (hereinafter simply referred to as the 'distributed printing utility') 120, which actualizes part of the distributed printing process.

Referring to FIG. 2, an application program 100 working inside the computer main body 16 carries out image processing to generate video data and issues a print command to make the video data printed. In response to output of the print command from the application program 100, the virtual printer driver 110 receives the print command and returns performance information, which regards the performances of the virtual printer assumed by the virtual printer driver 110, to the application program 100. More specifically, as shown in FIG. 3, a print command receiving module 111 of the virtual printer driver 110 receives the print command output from the application program 100, and a performance information return module 112 returns the performance information regarding the performances of the virtual printer in response to receipt of the print command by the print command receiving module 111.

The performances of the virtual printer represent the performances of the highest-performance printer among all the available printers as destinations of distribution. In general, the high-performance printer applies a high-quality program, language for drawing. For example, the high-quality program language uses complicated drawing commands based on mathematical expressions to express figures, whereas a lower-quality program language uses simple drawing commands based on bitmaps to express figures. In this embodiment, the performances of the highest-performance printer among all the available printers as the destinations of distribution are set to the performances of the virtual printer. This arrangement enables the virtual printer driver 110 to carry out a data conversion process (rendering process) in the high-quality program language. Since the high-quality program language uses the complicated drawing command as mentioned above, the virtual printer driver 110 is capable of actualizing the efficient rendering process for the highest-performance printer.

The available printers as the destinations of distribution are printers belonging to a specific printer group set by a properties setting module 113 among all the printers connected to the computer main body 16 locally or via the network. Here the printers 60, 70, and 80 are the available printers.

More specifically, a performance information input module 114 receives the performance information of the respective printers 60, 70, and 80, which has been transmitted from printer drivers 130, 140, and 150 (hereinafter referred to as real printer drivers) provided for the respective types of the printers 60, 70, and 80 to the distributed printing utility 120. A virtual printer performance specification module 115 selects the highest performance from the performance information of the respective printers 60, 70, and 80 and specifies the extracted performance as performance information of the virtual printer. The performance information return module 112 returns the performance information of the virtual printer to the application program 100.

The performance information specified by the virtual printer driver 110 may be arbitrarily selected among the performance information of the respective printers 60, 70, and 80, instead of the performance of the highest-performance printer adopted in this embodiment. The performance information of the virtual printer may otherwise be preset performance information that does not depend upon the performance information of the respective printers 60, 70, and 80.

In the virtual printer driver 110, the properties setting module 113 activates a user interface 116 to set and store various pieces of information required for printing. Some of the various pieces of information required for printing are returned, together with the performance information, to the application program 100 via the performance information return module 112. The various pieces of information required for printing include, for example, information with regard to the basic settings of printing like the printing quality, the color correction, and the type of halftoning, information with regard to the settings of paper like the paper size and the printing orientation, information with regard to the printer group specifying available printers as destinations of distribution, and information with regard to the distributed form in the distributed printing process. Among these pieces of information, the information excluding those with regard to the printer group and the distributed form is sent to the application program 100.

The application program 100 receives the performance information and other pieces of information mentioned above, converts the generated video data into print data adequate for the printer (the virtual printer) based on the input performance information and the other pieces of information, and transmits the converted print data to the virtual printer driver 110. The conversion of the print data carried out here follows the efficient rendering process as described previously, while neither color conversion nor halftoning process carried out by the real printer driver is performed here.

Referring to FIG. 2, the virtual printer driver 110 sets the print data transmitted from the application program 100 as intermediate print data and temporarily stores a data set or a collection of the intermediate print data in the HDD 41 as an intermediate print file MF. More specifically, as shown in FIG. 3, a print data receiving module 117 receives the print data transmitted from the application program 100, and an intermediate print data output module 118 specifies the input print data as intermediate print data and outputs a set of the intermediate print data to the HDD 41. The intermediate print data in the intermediate print file MF is then read by the distributed printing utility 120. The intermediate print file MF may be stored in the RAM 32, in the floppy disk 22, or even in another external storage device, instead of the HDD 41. The virtual printer driver 110 also transmits the various pieces of information set by the properties setting module 113 as printer property data to the distributed printing utility 120 via a property data output module 119.

Referring back to FIG. 2, the distributed printing utility 120 receives the intermediate print data constituting the intermediate print file MF and the printer property data and allocates the intermediate print data to the respective printers 60, 70, and 80 according to the information with regard to the printer group and the distributed form included in the printer property data, and transmits the allocation to the real printer drivers 130, 140, and 150 provided corresponding to the respective printers 60, 70, and 80. This series of processing carried out by the distributed printing utility 120 is discussed in detail.

In the distributed printing utility 120, as shown in FIG. 4, an intermediate print data input module 121 first inputs the intermediate print data constituting the intermediate print file MF, whereas a property data input module 122 receives the printer property data transmitted from the virtual printer driver 110. An allocation specification module 123 specifies allocation of the intermediate print data, based on the information with regard to the printer group and the distributed form included in the printer property data. Here the allocation means to group the intermediate print data by the unit of each page and specify pages to be printed with the printers 60, 70, and 80 belonging to the specific printer group.

The allocation information thus specified is transmitted to an output data control module 124. The output data control module 124 actually allocates and outputs the intermediate print data, which has been input into the intermediate print data input module 121, to the real printer drivers 130, 140, and 150 of the respective printers 60, 70, and 80, based on the transmitted allocation information. The data output to the real printer drivers 130, 140, and 150 follows the series of processing discussed below.

A printer setting module 125 first gives an instruction to change the settings via the printer drivers to the printers specified as the destinations of allocation. An output command output module 126 issues an output command. A performance information input module 127 receives the performance information regarding the performances of the respective printers 60, 70, and 80 returned from the real printer drivers 130, 140, and 150 in response to the output command. The output data conversion module 124 converts the allocating pages of the intermediate print data into data suitable for the printers 60, 70, and 80 specified as the destinations of allocation, based on the performance information transmitted from the performance information input module 127 as well as the information with regard to the basic settings of printing and the information with regard to the paper settings included in the printer property data (excluding the information with regard to the printer group and the distributed form) transmitted from the property data input module 122 (hereinafter this process of data conversion is referred to as the rendering process).

The output data control module 124 sends the converted print data as final print data to the real printer drivers 130, 140, and 150 via a final print data output module 128. The real printer drivers 130, 140, and 150 cause the final print data to undergo a required series of processing, such as color conversion or halftoning, suitable for each printer, which is not carried out by the virtual printer driver, and transmit the processed final print data to the corresponding printers 60, 70, and 80.

The distributed printing utility 120 has a printer monitoring module 129, which monitors the conditions of the respective printers 60, 70, and 80, based on signals output from the real printer drivers 130, 140, and 150. The printer monitoring module 129 monitors the length of a waiting queue and occurrence of any error (for example, failure, paper jam, or out-of-paper) in each of the printers. The output data control module 124 receives signals output from the printer monitoring module 129 and changes the output resource of the allocated print data or stops the output with regard to the printer having a long waiting queue or being in any error state.

The performance information of the respective printers 60, 70, and 80 transmitted from the real printer drivers 130, 140, and 150 is utilized by the distributed printing utility 120 as described above, while being transmitted to the virtual printer driver 110 via a performance information output module 12a.

A3. Virtual Printer Driver

The following describes a change in state of the operating system when the virtual printer driver 110 is installed in the computer 10. The description regards an example wherein Windows95 (trade mark by Microsoft Inc.) is adopted as the operating system, on which the virtual printer driver 110 works.

Figure 5:
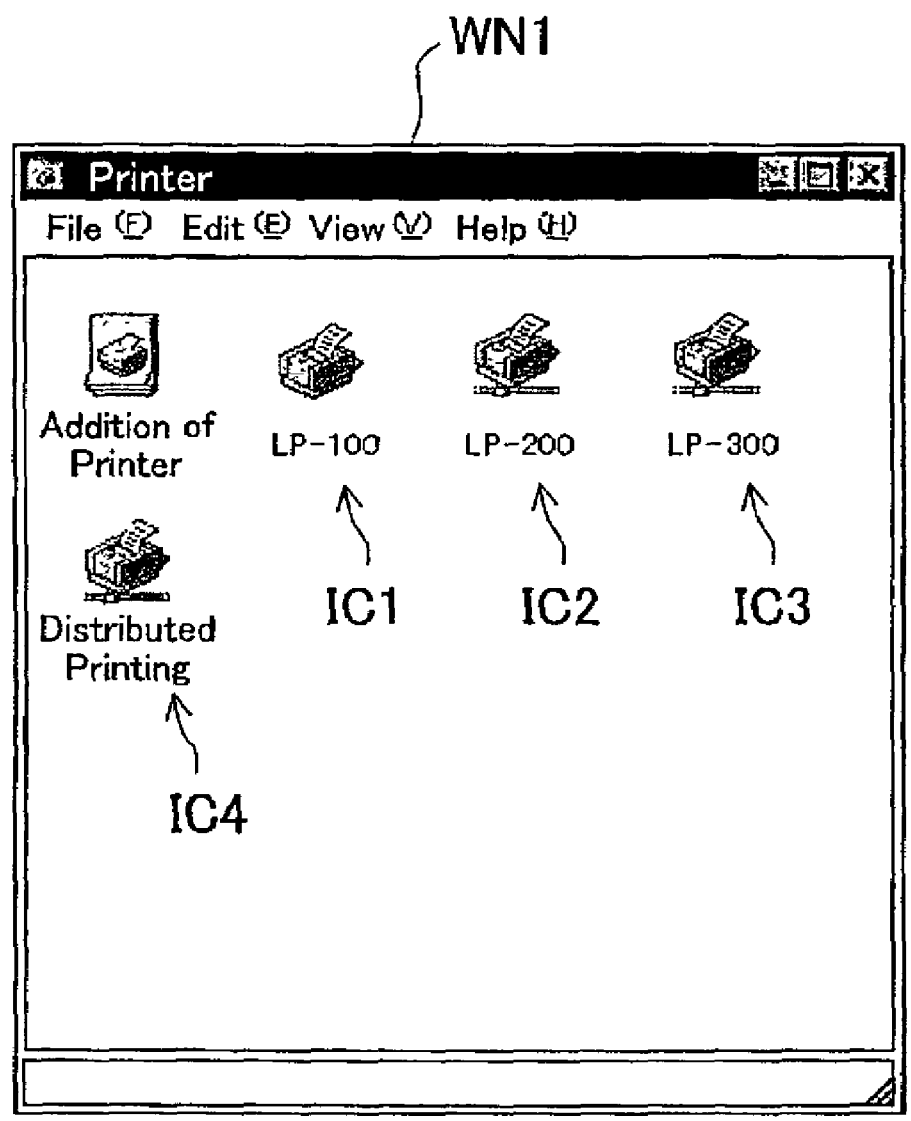
FIG. 5 illustrates a 'Printer' window WN1.

The user (operator) operates the computer 10 in the following sequence to open a dialog box for setting various pieces of information required for printing on the screen of the CRT display 12. The sequence of operations 'Start'→'Settings'→'Printer' opens a 'Printer' window. FIG. 5 shows this 'Printer' window. In the case where the virtual printer driver 110 is installed in the computer 10, an icon IC4 that corresponds to the virtual printer driver 110 and is expressed as, for example, 'Distributed Printing' is displayed in the illustrated 'Printer' window WN1, in addition to icons IC1, IC2, and IC3 representing the real printer drivers 130, 140, and 150 individually provided for the respective types of the printers 60, 70, and 80. Like the real printer driver, installation of the virtual printer driver 110 causes the icon IC4 corresponding to the virtual printer driver 110 to be displayed in the 'Printer' window WN1.

The operator double clicks the icon IC4 'Distributed Printing' corresponding to the virtual printer driver 110 on the 'Printer' window WN1 to open a window of the virtual printer driver 110 and clicks 'Printer' and 'Properties' in the window. This series of operations opens a dialog box 'Distributed Printing Properties' for setting various pieces of information with regard to the virtual printer. The operator can input the settings of the various pieces of information in the dialog box 'Distributed Printing Properties' through the operations of the mouse 20 and the keyboard 18. This dialog box 'Distributed Printing Properties' corresponds to the user interface 116 mentioned previously.

A4. User Interface

Figure 6:
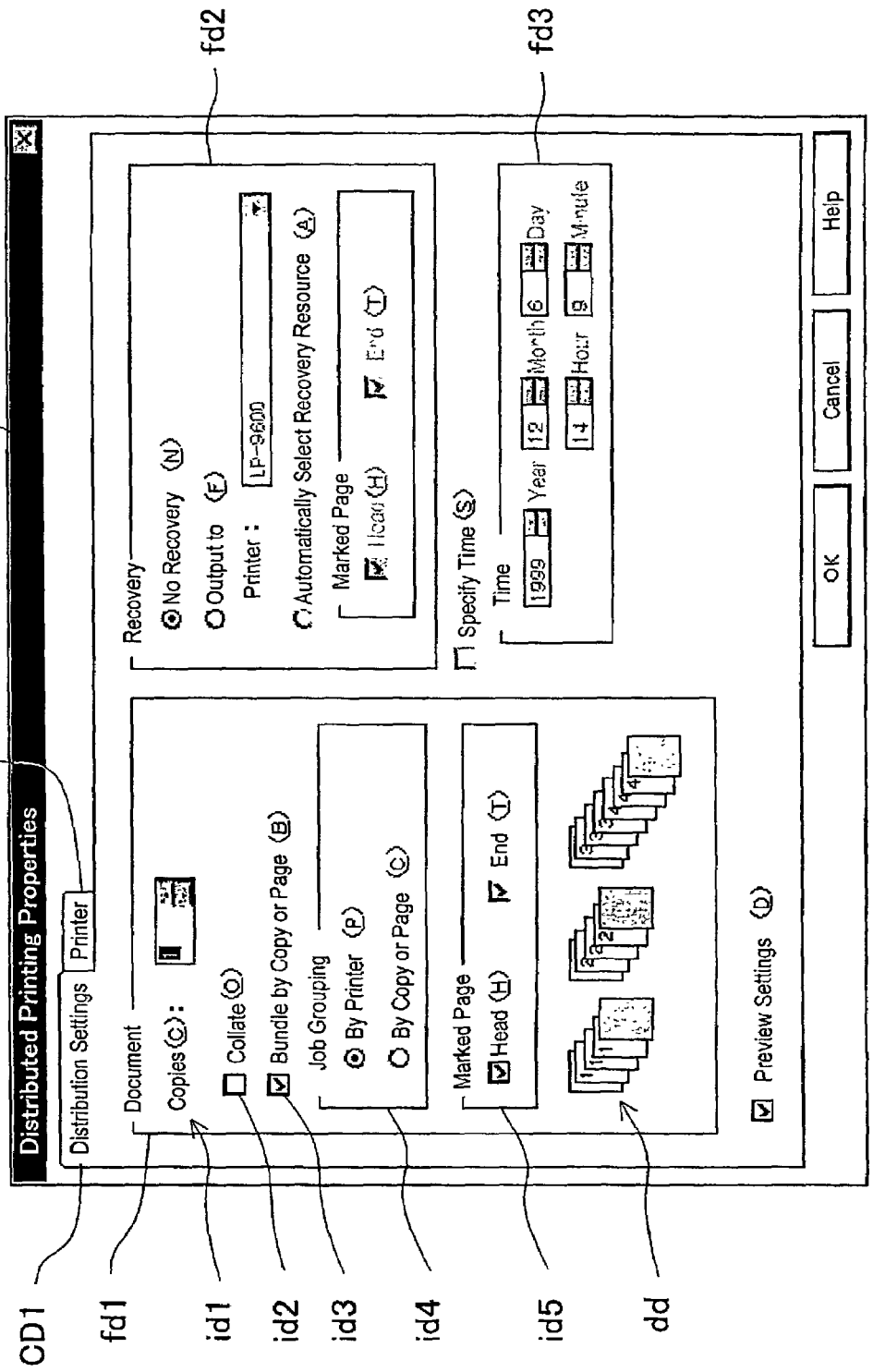
FIG. 6 illustrates a 'Distribution Settings' card CD1 displayed on a 'Distributed Printing Properties' dialog box WN2.

FIG. 6 illustrates the dialog box WN2 'Distributed Printing Properties'. Two cards CD1 'Distribution Settings' and CD2 'Printer' are provided in the dialog box WN2 'Distributed Printing Properties'. The 'Distribution Settings' card CD1 is used to set the information with regard to the distributed form in the distributed printing process. The 'Printer' card CD2 is used to set the information with regard to the printer group as the potential destinations of distribution, the basic settings of printing, and the paper settings. The operator selects either of the two cards CD1 and CD2 to be displayed in the dialog box WN2 through operations of the mouse 20. In the state of FIG. 6, the 'Distribution Settings' card CD1 is selected. The division of the information into the cards CD1 and CD2 is not restricted to the above example, but the information may all be included in one card or may be divided into three or more cards.

As illustrated, the 'Distribution Settings' card CD1 includes three fields 'Document', 'Recovery', and 'Time' fd1, f2, and fd3. The 'Document' field fd1 is used to set the specification of printing a document, and has a data input box id1 'Copies', a check box id2 'Collate', a check box id3 'Bundle by Page or Copy', a data input box id4 'Job Grouping', and a data input box id5 'Marked Page'. The respective data input boxes (including check boxes in the following description) id1 to id5 are designed in the following specification:

1) 'Copies' Data Input Box id1:

The number of copies to be printed is input in this data input box. The default is the setting by the application program 100.

2) 'Collate' Check Box id2:

Gathering print is selected by checking this check box id2, and otherwise stack print is selected. The gathering print carries out printing by the unit of copy and in the order of pages in each copy. The stack print, on the other hand, carries out printing by the unit of page and by the number of copies in each page. Namely printing is carried out by the unit of copy when the check box id2 is checked, while being carried out by the unit of page when the check box id2 is not checked.

3) 'Bundle by Copy or Page' Check Box id3:

A check in this check box id3 prohibits one copy or one set of identical pages from being printed with multiple printers. No check in the check box id3, on the other hand, allows the copy or the set of identical pages to be printed with multiple printers. In the off state of this check box id3, that is, in the case of not 'Bundle by Copy or Page', the number of pages allocated to each printer is varied according to the performance of the printing speed (hereinafter referred to as the printing speed performance) of the printer, so as to conclude the printing operation substantially simultaneously in all the printers specified as the destinations of distribution. Hereinafter this working state in which the number of pages allocated to each printer is varied according to the printing speed performance is referred to as the 'speed preference' mode, which will be discussed later in detail.

4) 'Job Grouping' Data Input Box id4:

When one radio button 'By Printer' is selected in this data input box id4, all the pages output from one printer are handled as one group. The selection of this radio button prevents the results of a user's specified print job from being mixed with the results of printing required by another user in the share computer 70 or 80 connecting with the network. When the other radio button 'By Copy or Page' is selected, one copy or one set of identical pages is handled as one group. The latter is utilized in the case where a user's specified print job is distributed to the local printer 60 or in the case where no problem arises even if the results of the print job are mixed with the results of printing required by another user.

5) 'Marked Page' Data Input Box id5:

The marked page represents a head page or an end page of each group to allow discrimination in the case where resulting prints of a specified group are mixed with resulting prints required by another user. In response to a check in a 'Head' check box, the marked page is printed at the head position of each group. In response to a check in an 'End' check box, on the other hand, the marked page is printed at the end position of each group. The name of the document to be printed, the number of copies, the total number of pages, and the name of the user are printed on the marked page.

The 'Document' field fd1 includes a distributed form display box dd representing the distributed form specified by the settings in the data input boxes id1 to id 5, in addition to the data input boxes id1 to id5 discussed above. An illustrated image in the distributed form display box dd shows the distributed form specified by the settings in the data input boxes id1 to id5.

The check box id2 'Collate' corresponds to the module of inputting the 'third command' specified in the claims; the check box id3 'Bundle by Copy or Page' corresponds to the module of inputting the 'first command' specified in the claims; and the check box id4 'Job Grouping' corresponds to the module of inputting the 'second command' specified in the claims.

The following describes a change of the illustrated image in the distributed form display box dd by the combination of the settings in the data input boxes id1 to id5 with reference to FIGS. 7 through 10. The description first regards a change of the illustrated image by the combination of the settings in the 'Copies' data input box id1, the 'Collate' check box id2, and the 'Bundle by Copy or Page' check box id3.

Figure 7:
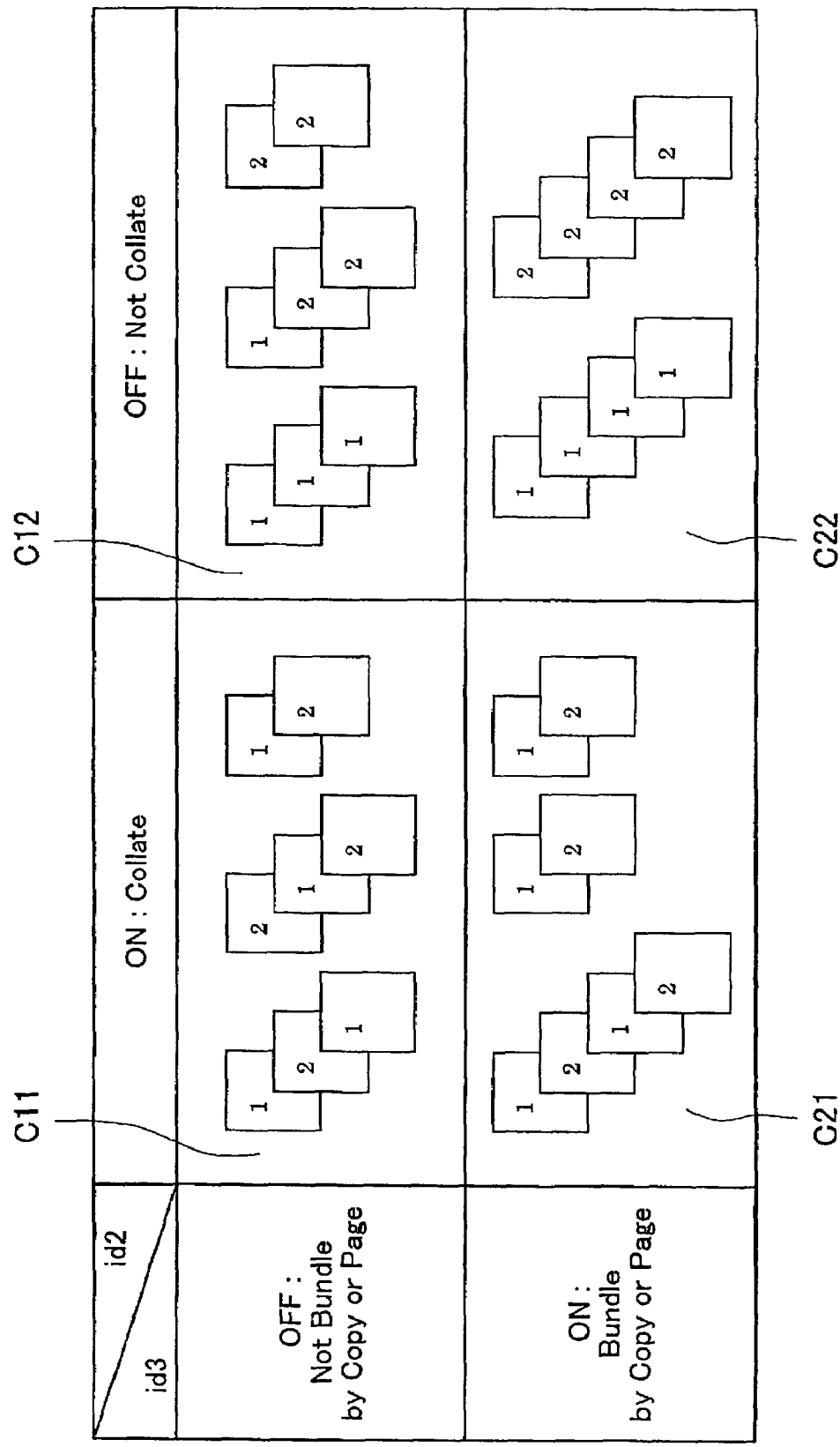
FIG. 7 shows a change of an illustrated image in a distributed form display box by the combination of the settings in data input boxes id1 to id3.

FIG. 7 shows a change of the illustrated image in the distributed form display box dd by the combination of the settings in the data input box id1 and the two check boxes id2 and id3. In the illustration of the table, the columns show whether or not the print job is to be collated, that is, the on-off settings in the 'Collate' check box id2. The rows show whether or not the print job is to be bundled by copy or page, that is, the on-off settings in the 'Bundle by Copy or Page' check box id3. In the example of the table, it is assumed that the number of copies set in the 'Copies' data input box id1 is four copies.

In the combination of 'Collate' and not 'Bundle by Copy or Page', the gathering print is selected. As shown in a cell C11 of the first row and the first column in the table, the illustrated image shows that the $1^{st}$ and the $2^{nd}$ pages of the $1^{st}$ copy and the $1^{st}$ page of the $2^{nd}$ copy are printed with the first printer 60, that the $2^{nd}$ page of the $2^{nd}$ copy and the $1^{st}$ and the $2^{nd}$ pages of the $3^{rd}$ copy are printed with the second printer 70, and that the $1^{st}$ and the $2^{nd}$ pages of the $4^{th}$ copy are printed with the third printer 80.

In the combination of not 'Collate' and not 'Bundle by Copy or Page', the stack print is selected. As shown in a cell C12 of the first row and the second column in the table, the illustrated image shows that three copies of the $1^{st}$ page are printed with the first printer 60, that the remaining copy of the $1^{st}$ page and two copies of the $2^{nd}$ page are printed with the second printer 70, and that the remaining copies of the $2^{nd}$ page are printed with the third printer 80.

In the combination of 'Collate' and 'Bundle by Copy or Page', printing each specified group with multiple printers is prohibited. As shown in a cell C21 of the second row and the first column in the table, the illustrated image shows that the $1^{st}$ page of the $1^{st}$ copy to the $2^{nd}$ page of the $2^{nd}$ copy are printed with the first printer 60, that the $1^{st}$ and the $2^{nd}$ pages of the $3^{rd}$ copy are printed with the second printer 70, and that the $1^{st}$ and the $2^{nd}$ pages of the $4^{th}$ copy are printed with the third printer 80.

In the combination of not 'Collate' and 'Bundle by Copy or Page', as shown in a cell C22 of the second row and the second column in the table, the illustrated image shows that the required number of copies of the $1^{st}$ page are printed with the first computer 60 and that the required number of copies of the $2^{nd}$ page are printed with the second computer 70.

The example shown in the cells C11 and C12 of the first row in the table of FIG. 7 is on the assumption that the printers 60, 70, and 80 specified as the destinations of distribution have substantially equal printing speed performances. When the printers 60, 70, and 80 have substantially equal printing speed performances, practically similar numbers of pages are allocated to the respective printers. When the printers 60, 70, and 80 specified as the destinations of distribution have different printing speed performances, on the other hand, different numbers of pages are allocated to the different types of printers. This is allocation of distributed printing in the 'speed preference' mode. For example, the printing speed performance of the first printer 60 is 20 ppm (pages per minute), the printing speed performance of the second printer 70 is 40 ppm, and the printing speed performance of the third printer 80 is 40 ppm. In this example, the ratio of the printing speed performance of the respective printers 60, 70, and 80 is 1:2:2. In the case of allocation of distributed printing in the 'speed preference' mode (that is, in the case of not 'Bundle by Copy or Page' corresponding to the first row in the table), the numbers of pages allocated to the respective printers are determined to follow this ratio of the printing speed performance. The printers 60, 70, and 80 can thus conclude the printing operations almost simultaneously.

Figure 8:
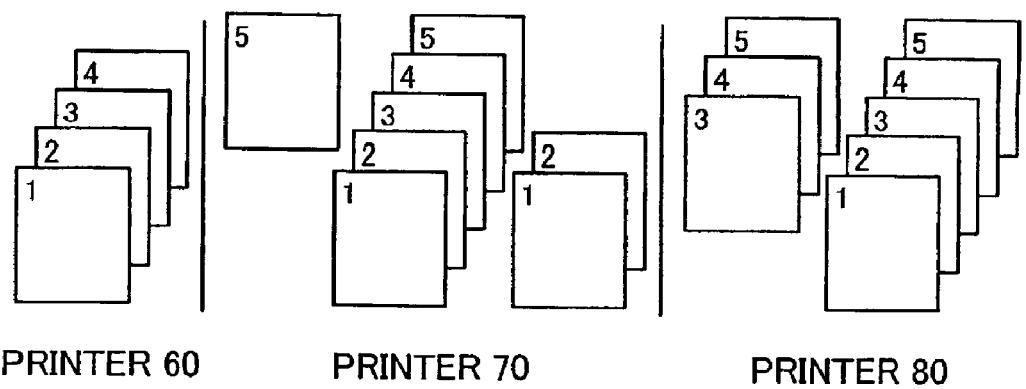
FIG. 8 shows an exemplified allocation of distributed printing in a speed preference mode.

FIG. 8 shows an exemplified allocation of distributed printing in the 'speed preference' mode. In this example, the job of printing four copies of a document including 5 pages is distributed into the three printers 60, 70, and 80. The printing speed performances of the printers 60, 70, and 80 are respectively 20 ppm, 40 ppm, and 40 ppm as mentioned above. In this case, the total number of pages to be printed is 20. The allocation to the first printer 60, to the second printer 70, and to the third printer 80 are respectively 4 pages, 8 pages, and 8 pages according to the ratio of the printing speed performance (1:2:2) of the respective printers 60, 70, and 80. In the case of 'Collate', gathering print is selected as shown in FIG. 8. The $1^{st}$ to the $4^{th}$ pages of the $1^{st}$ copy are printed with the first printer 60. The $5^{th}$ page of the $1^{st}$ copy, the $1^{st}$ to the $5^{th}$ pages of the $2^{nd}$ copy, and the $1^{st}$ and the $2^{nd}$ pages of the $3^{rd}$ copy are printed with the second printer 70. The $3^{rd}$ to the $5^{th}$ pages of the $3^{rd}$ copy and the $1^{st}$ to the $5^{th}$ pages of the $4^{th}$ copy are printed with the third printer 80. In the case of not 'Collate', stack printing is selected, and the numbers of pages allocated to the respective printers 60, 70, and 80 are similarly determined according to the ratio of the printing speed performance (1:2:2) of the respective printers 60, 70, and 80.

Figure 9:
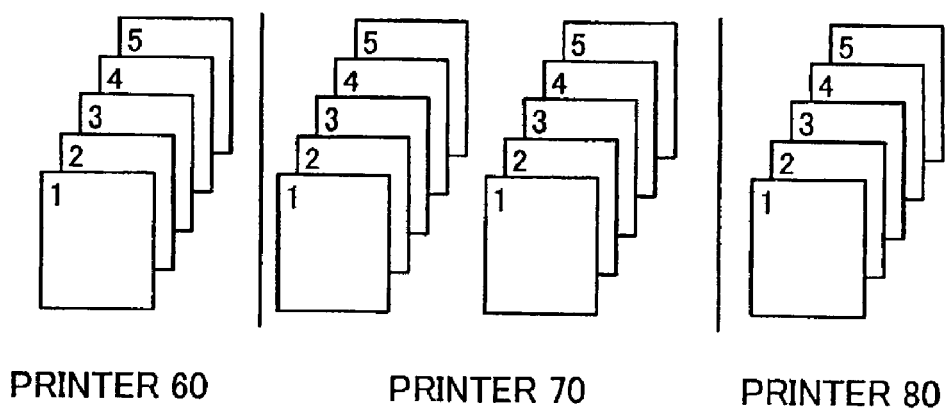
FIG. 9 shows an exemplified allocation of distributed printing in a handling preference mode.
Figure 35:
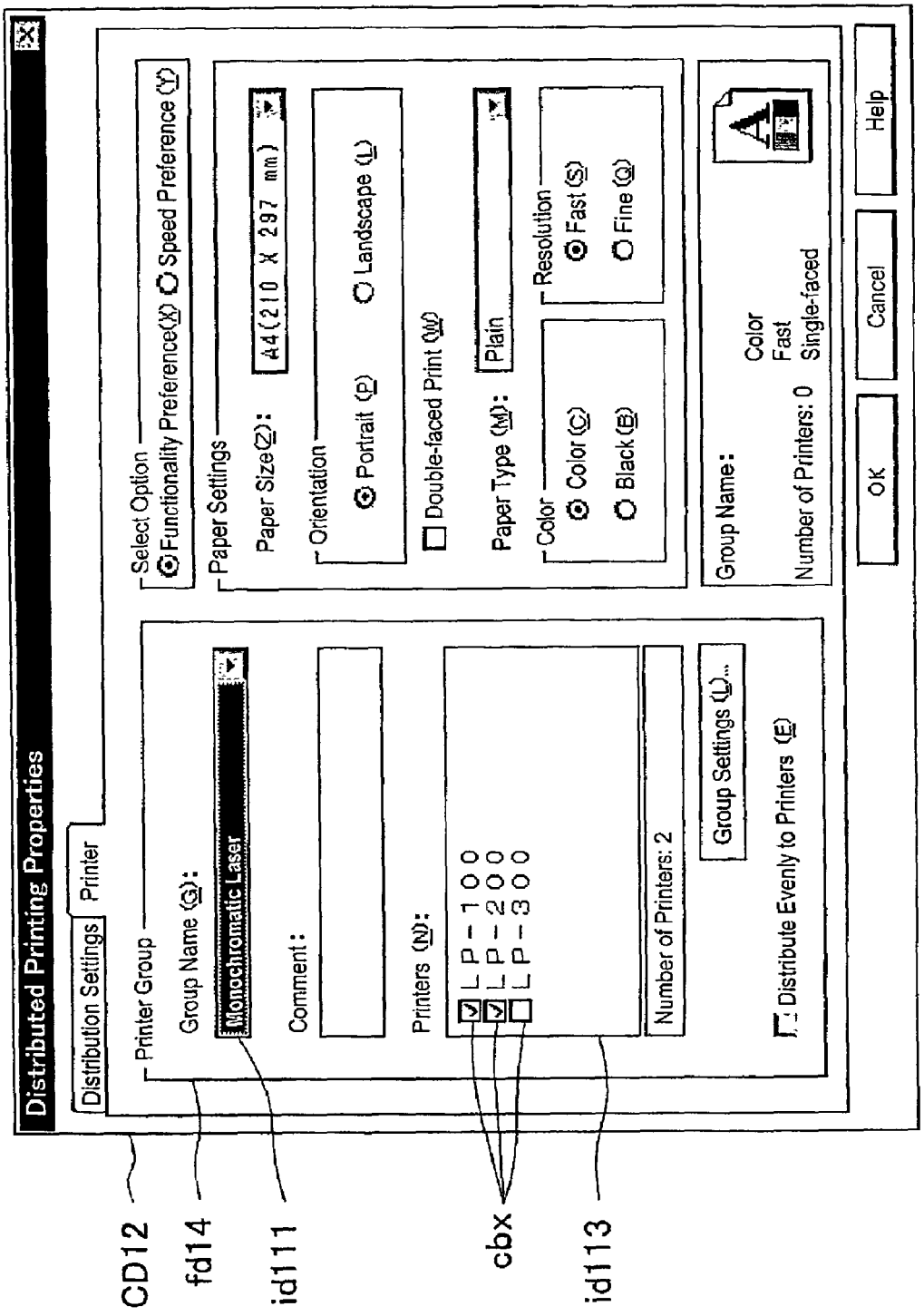
FIG. 35 illustrates a 'Printer' card CD12 in one modified example of the present invention.

In the arrangement of this embodiment, in the case of not 'Bundle by Copy or Page' on the first row in the table of FIG. 7, allocation of distributed printing is specified in the 'speed preference' mode as discussed above. In the case of 'Bundle by Copy or Page' on the second row in the table of FIG. 7, on the other hand, allocation of distributed printing is specified with preference given to handling (hereinafter this is referred to as the 'handling preference' mode). FIG. 9 shows an exemplified allocation of distributed printing in the 'handling preference' mode. In the 'handling preference' mode, 'Bundle by Copy or Page', that is, allocation of distributed printing to prohibit one copy or one set of identical pages from being printed with multiple printers, facilitates collection of resulting prints from the respective printers. Like the example shown in FIG. 8, in the example of FIG. 9, the job of printing four copies of a document including 5 pages is distributed into the three printers 60, 70, and 80. In the gathering print, the $1^{st}$ to the $5^{th}$ pages of the $1^{st}$ copy are printed with the first printer 60. The $1^{st}$ to the $5^{th}$ pages of the $2^{nd}$ copy and the $1^{st}$ to the $5^{th}$ pages of the $3^{rd}$ copy are printed with the second printer 70. The $1^{st}$ to the $5^{th}$ pages of the $4^{th}$ copy are printed with the third printer 80. In the example of FIG. 35, the second printer 70 prints two copies. This satisfies both the speed preference mode and the handling preference mode. In the speed preference mode, according to the ratio of the printing speed performance 1:2:2, it is expected that the first printer 60 prints one copy, the second printer 70 prints two copies, and the third printer 80 prints two copies. Since only five copies are required, however, the third printer 80 prints the residual one copy.

In the case of 'Bundle by Copy or Page' on the second row in the table of FIG. 7, allocation of distributed printing may be specified to satisfy not the speed preference mode but the handling preference mode. In this case, in the handling preference mode that prohibits one copy or one set of identical pages from being printed with multiple printers, the pages are equally allocated to the respective printers irrespective of the printing speed performances of the printers. In the case where the number of copies can not be equally divided by the number of printers specified as the destinations of distribution as in the examples of FIGS. 8 and 9, the greater number of copies is allocated to the printer having the smaller ordinal number. For example, in the job of printing four copies of a 5-page document with the three printers, the first printer 60 prints two copies, while the second printer 70 and the third printer 80 respectively print one copy.

As described above, in the case of 'Bundle by Copy or Page' on the second row in the table of FIG. 7, allocation of distributed printing may be specified to satisfy both the handling preference mode and the speed preference mode or to satisfy not the speed preference mode but the handling preference mode. The changeover between these two states is based on the settings in the 'Job Grouping' data input box id4. When the radio button 'By Printer' is selected in the data input box id4, all the pages output from one printer are handled as one group. The speed preference mode is thus active to take into account the printing speed performances of the respective printers. When the other radio button 'By Copy or Page' is selected in the data input box id4, one copy or one set of identical pages is handled as one group, so that the speed preference mode is inactive. In the case of selection of the radio button 'By Copy or Page' in the data input box id4, irrespective of the printing speed performances of the respective printers, one copy is allocated to each of available printers and the residual copies are sequentially allocated to the available printers.

The description then regards a further change of the illustrated image specified by the settings in the data input boxes id1 to id3 by the combination of the settings in the 'Job Grouping' data input box id4 and the 'Marked Page' data input box id5. FIG. 10 shows a change of the illustrated image in the distributed form display box dd by the combination of the data input boxes id4 and id5. The example of FIG. 10 shows a further change of the illustrated image, which is specified by the settings in the data input boxes id1 to id3 in the cell C11 of FIG. 7, by the combination of the settings in the data input boxes id4 and id5.

In the table of FIG. 10, the columns show the settings in the 'Job Grouping' data input box id4, that is, selection of either 'By Printer' or 'By Copy or Page'. The rows show the settings in the 'Marked Page' data input box id5, that is, checks in the two check boxes 'Head' and 'End'.

In the case of a click of the radio button 'By Printer' in the 'Job Grouping' data input box id4, as shown by a cell CE11 of the first row and the first column in the table, the illustrated image in the cell C11 of FIG. 7 is not changed and all the pages printed with one printer are handled as one group. In the case of a click of the other radio button 'By Copy or Page', on the other hand, as shown by a cell CE12 of the first row and the second column, each copy or each page is handled as one group and distinguished from a subsequent group. In the actual services, since no marked page is selected, the same printing results are obtained both in the case of the click of the radio button 'By Printer' and in the case of the click of the other radio button 'By Copy or Page'.

When the marked page is specified in the 'Marked Page' data input box id5, on the other hand, as shown by the second, the third, and the fourth rows in the table, the illustrated image is changed to make the marked pages (closed figures in the table) are inserted at the head, at the end or at both the head and the end of the respective groups specified in the first row. The illustrated image specified by this table is displayed in the distributed form display box dd.

Referring back to FIG. 6, the 'Recovery' field fd2 specifies another printer as a recovery resource in the case of occurrence of any error in the printer specified for distributed printing. The 'Recovery' field fd2 has three radio buttons 'No Recovery', 'Output to', and 'Automatically Select Recovery Resource'. In the case of selection of the 'No Recovery' radio button, no recovery is performed even when an error occurs in the printer specified for distributed printing. In the case of selection of the 'Output to' radio button, the output resource input in a 'Printer' data input box is set to the recovery resource. In the case of selection of the 'Automatically Select Recovery Resource' radio button, the same type of a printer as the printer with the error is set to the recovery resource. When there is no same type of printer, an available printer is set to the recovery resource.

The 'Time' field fd3 specifies the time of printing. When a check box 'Specify Time' is checked, the printing operation starts at the time specified in the 'Time' field fd3.

Figure 11:
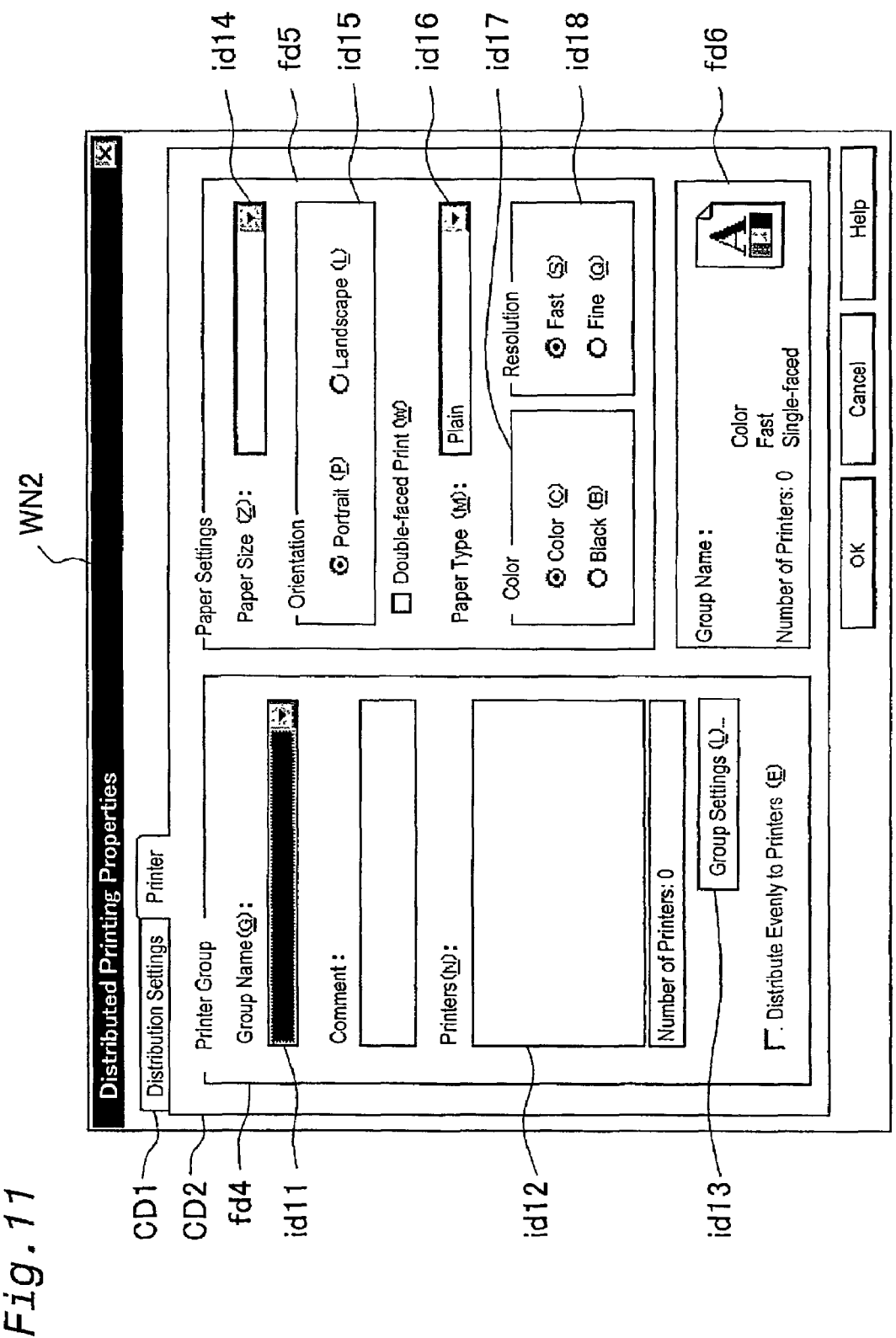
FIG. 11 illustrates a 'Printer' card CD2 displayed on the 'Distributed Printing Properties' dialog box WN2.

The following describes the 'Printer' card CD2 on the 'Distributed Printing Properties' dialog box WN2 with reference to FIG. 9. As illustrated in FIG. 11, the 'Printer' card CD2 includes a 'Printer Group' field fd4, and 'Paper Settings' field fd5, and a settings display box fd6.

The 'Printer Group' field fd4 specifies a group of printers, which are used for distributed printing of a document and has a 'Group Name' data input box id11, a 'Printers' display box id12, and a 'Group Setting' button id13. The 'Group Name' data input box id11 sets the name of the printer group and preset group names are provided as possible options. The 'Printers' display box id12 displays the names of the printers belonging to the printer group set in the 'Group Name' data input box id11. A click of the 'Group Setting' button id13 opens a non-illustrated new window and accepts user's data input, so as to allow addition and deletion of an option to and from the options provided in the 'Group Name' data input box id11. The computer 10 gives an instruction of distributed printing to all the printers belonging to the printer group specified in the 'Printer Group' field fd4, that is, the respective printers displayed in the 'Printers' display box id12. Among all the printers connected to the computer main body 16 locally or via the computer network 90, the printers included in the printer group specified in the 'Printer Group' field fd4 are thus set as the destinations of distributed printing.

The 'Paper Settings' field fd5 sets the paper and the printing quality and has data input boxes 'Paper Size' 'Orientation', 'Paper Type', 'Color', and 'Resolution' id14, id15, id16, id17, and id18.

The 'Paper Size' data input box id14 sets the paper size, and examples of possible options include 'A4 210×297 mm', 'A4 Lateral 210×297 mm', 'Envelop 120×235 mm', and 'Postcard 100×147 mm'. The 'Orientation' data input box id15 represents the orientation of paper set in the printer and has two options 'Portrait' and 'Landscape'. The 'Paper Type' data input box id16 specifies the type of paper, and 'Plain', 'Superfine', and 'Glossy' are provided as possible options. The 'Color' data input box id17 specifies the type of ink used in the printer 14, and 'Color' and 'Black' are provided as possible options. The 'Resolution' data input box id18 sets the printing resolution, and 'Fast' and 'Fine' are provided as possible options. Here 'Fast' and 'Fine' respectively represent the resolutions of 360×360 (dots) and 720×720 (dots).

The settings display box fd6 displays desired data among the settings in the 'Printer Group' field fd1 and the 'Paper Settings' field fd5.

Various pieces of information regarding the settings in the 'Distributed Printing Properties' dialog box WN2 are input into the computer main body 16 through the user's operations of the mouse 20 and the keyboard 18. The acceptance of the input data is restricted according to the performance information of the respective printers 60, 70, and 80. For example, when the performance information of the respective printers 60, 70, and 80 specifies the printable size up to A4 in all the printers 60, 70, and 80, paper sizes of greater than A4 are excluded from the options in the 'Paper Size' data input box id14 in the 'Distributed Printing Properties' dialog box WN2. Namely the input data regarding paper sizes of greater than A4 is not acceptable.

A5. Computer Programs

The respective modules 111 through 119 in the virtual printer driver 110 shown in FIG. 3 are actualized by the virtual printer driver 110 as the computer program and series of processing executed by the CPU 30 according to the virtual printer driver 110. The respective modules 121 through 129 in the distributed printing utility 120 shown in FIG. 4 are actualized by the distributed printing utility 120 as the computer program and series of processing executed by the CPU 30 according to the distributed printing utility 120.

Like the virtual printer driver 110, the distributed printing utility 120 is stored in advance in the floppy disk 22 and is installed from the floppy disk drive 24 into the computer 10 according to an activated preset installation program. The installed distributed printing utility 120 is stored in the HDD 41, and is incorporated in the operating system and loaded into a predetermined area of the RAM 32 in response to power supply to the computer 10. Like the virtual printer driver 110, the distributed printing utility 120 may be stored in another portable recording medium (carriable recording medium), such as a CD-ROM, a magneto-optic disc, or an IC card, in place of the floppy disk 22. The distributed printing utility 120 may be program data, which are downloaded from a specific server connecting with an external computer network (for example, the Internet) via the computer network and transferred to either the RAM 32 or the HDD 41.

Figure 12:
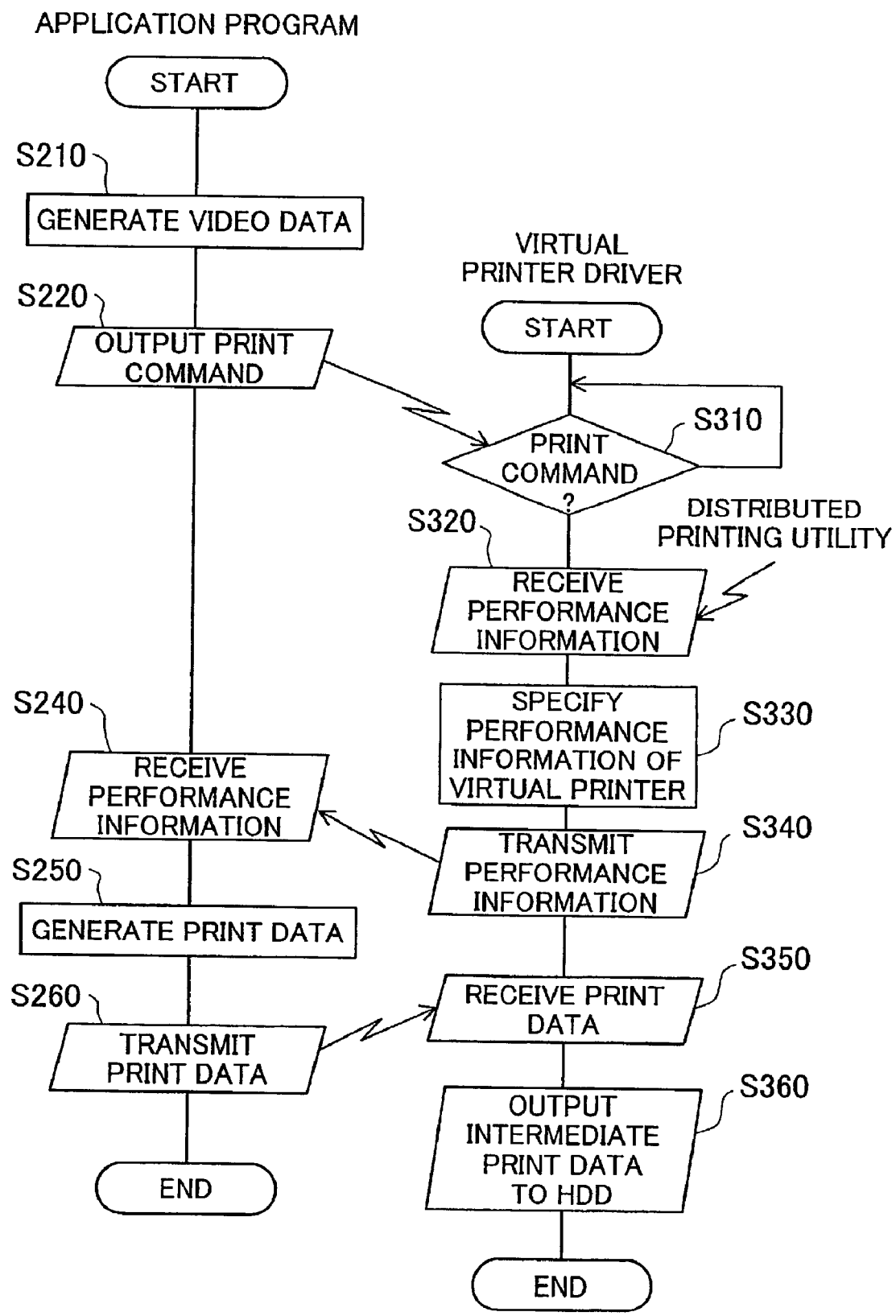
FIG. 12 is a flowchart showing a series of processing described in an application program 100 and a series of processing described in a virtual printer driver 110.

FIG. 12 is a flowchart showing a processing routine described in the virtual printer driver 110 as well as a processing routine described in the application program 100 The CPU 30 in the computer main body 16 starts the processing in the application program 100 and carries out a series of image processing to generate video data (step S210). The application program 100 may be a general purpose application program used to create documents and pictures, and video data is generated by the functions characteristic of each application program.

Figure 13:
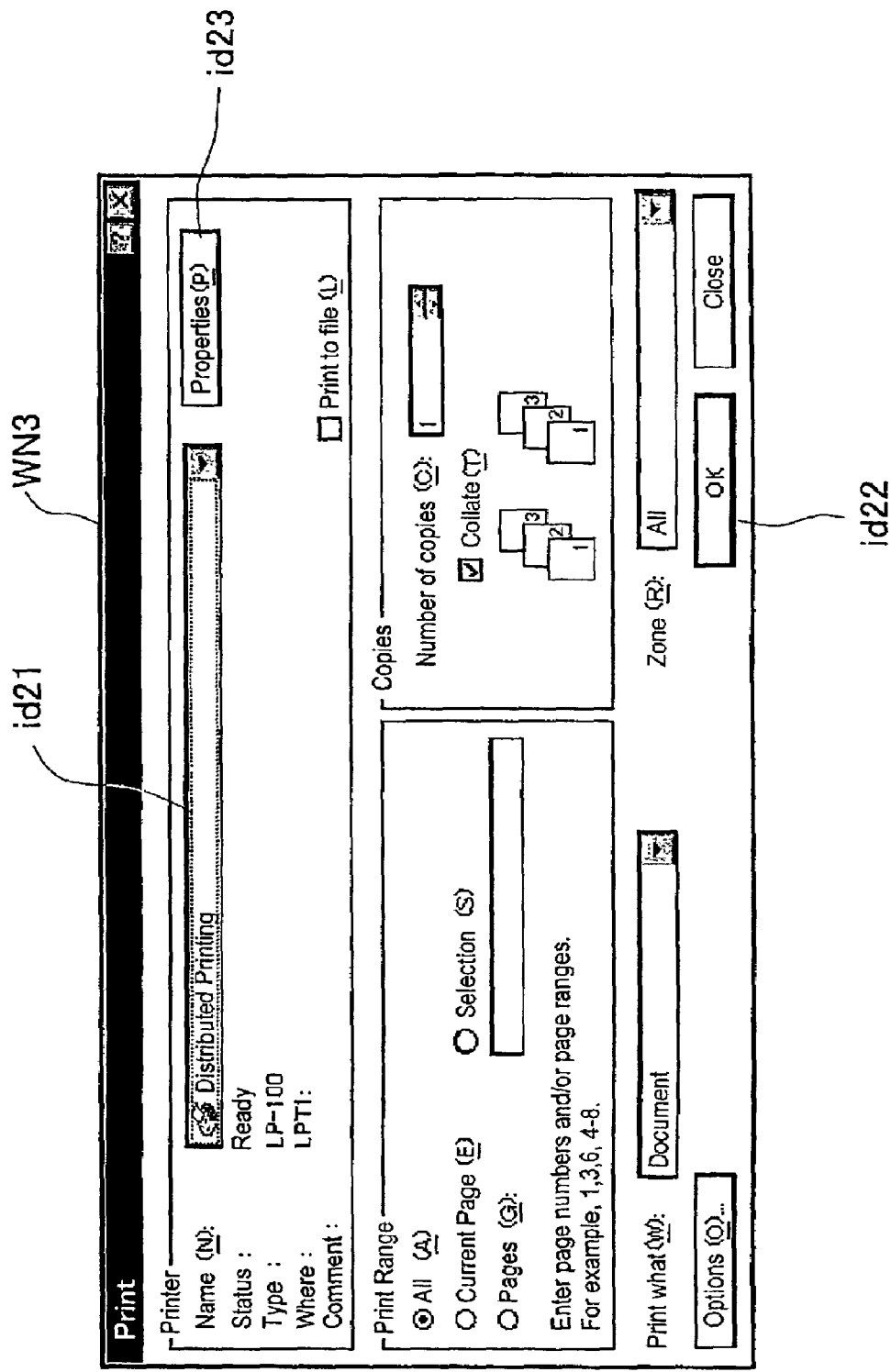
FIG. 13 illustrates a 'Print' dialog box WN3 open on a CRT display 12 in response to execution of a 'Print' command on the application program 100.

The CPU 30 executes a 'Print' command provided in the application program and thereby outputs a print command for distributed printing (step S220). FIG. 13 illustrates a 'Print' dialog box WN3 open on the CRT display 12 in response to execution of the 'Print' command on the application program 100. As illustrated, the 'Print' dialog box WN3 has a 'Printer Name' data input box id21. The print command for distributed printing is output from the application program 100 to the virtual printer driver 110 in response to a click of an 'OK' button id22 with the mouse 20, while a series of letters 'Distributed Printing', which corresponds to the 'Distributed Printing' icon IC4 discussed previously with FIG. 5, is selectively input in the 'Printer Name' data input box id21. A click of a 'Properties' button id23 in the 'Print' dialog box WN3 shifts the processing to a distribution information setting routine executed in the virtual printer driver 110. The process opens the 'Distributed Printing Properties' dialog box WN2 on the CRT display 12 and reads input data from the keyboard 18 and the mouse 20, so as to set various pieces of information regarding the distributed printing. The print command may be output from the application program via the operating system.

Figure 14:
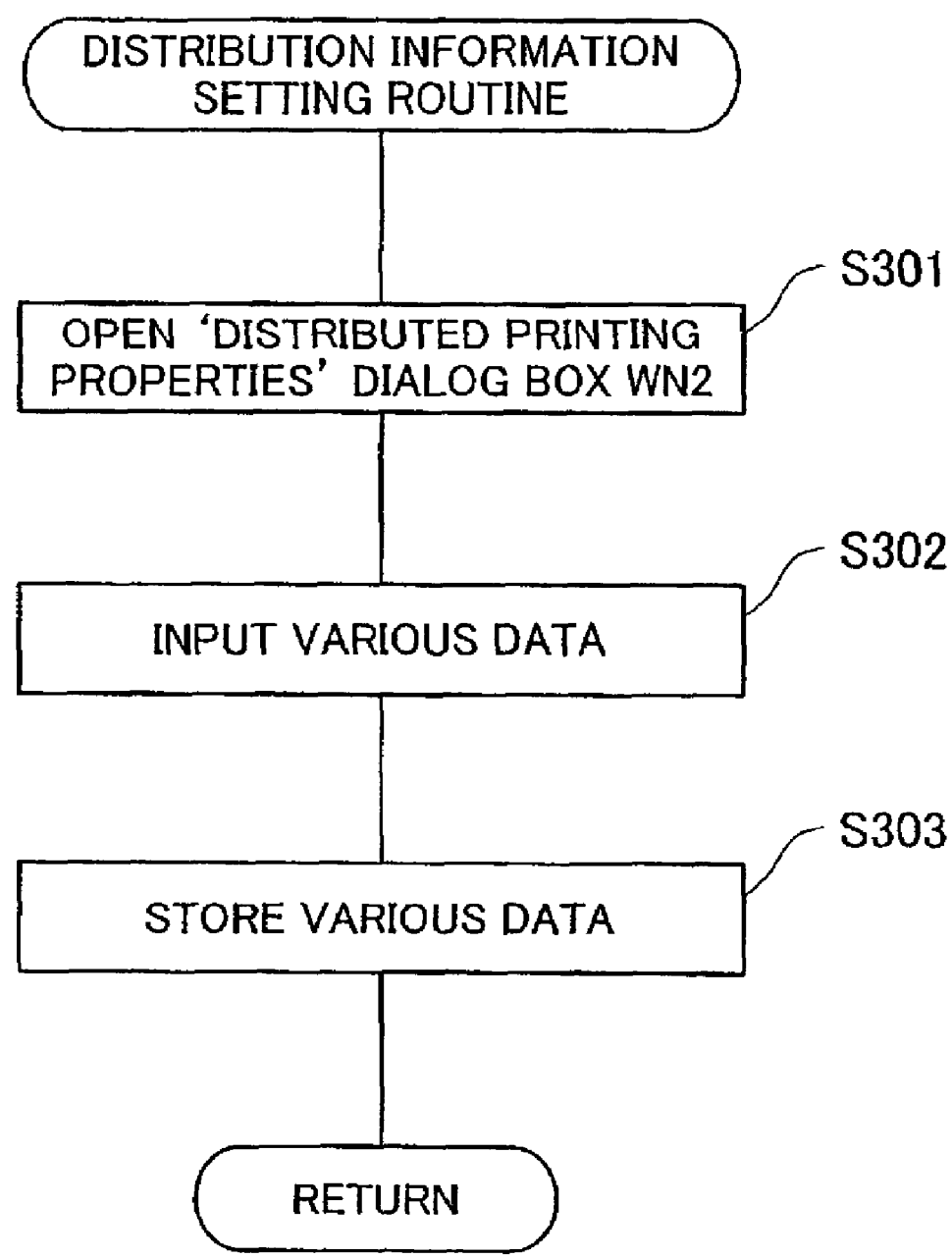
FIG. 14 is a flowchart showing a distribution information setting routine executed by a CPU 30.

FIG. 14 is a flowchart showing a distribution information setting routine executed by the CPU 30. When the program enters this routine, the CPU 30 first opens the 'Distributed Printing Properties' dialog box WN2 shown in FIG. 6 on the CRT display 12 (step S301). The CPU 30 subsequently inputs various pieces of data through data input operations of the keyboard 18 and the mouse 20 by the operator who checks the display on the CRT display 12 (step S302). The various pieces of data can be input in the 'Distributed Printing Properties' dialog box WN2 shown in FIGS. 6 and 11 and include information regarding the form of distributed printing, information regarding the printer group, information regarding the basic settings of printing, and information regarding the paper settings. An illustrated image generated from the various pieces of input data is shown in the distributed form display box dd in the 'Distributed Printing Properties' dialog box WN2. The illustrated image may be any of the images shown in FIGS. 7 to 10. The CPU 30 then stores the various pieces of data input at step S302 as printer property data into the RAM 32 (step S303). The program then goes to RETURN and exits from this routine.

After completion of the processing according to this distribution information setting routine, the print command is output in response to a click of the 'OK' button id22 in the 'Print' dialog box WN3 with the mouse 20. In the case where the 'Properties' button id23 is not clicked but the 'OK' button id22 is clicked immediately with the mouse 20, the printer property data stored in the RAM 32 in the previous cycle of the distribution information setting routine (in the first cycle, preset initial printer property data) are maintained without any modification.

In response to the output of the print command at step S220, the CPU 30 shifts the processing to the virtual printer driver 110 and determines whether or not the print command is input from the application program 100 (step S310). In the case of no input of the print command, the CPU 30 iteratively carries out the decision at step S310 and waits for input of the print command from the application program 100. In the case of input of the print command at step S310, on the other hand, the CPU 30 carries out the series of processing discussed below.

The CPU 30 first reads from the distributed printing utility 120 the performance information of the respective printers 60, 70, and 80, which has been transmitted from the real printer drivers 130, 140, and 150 provided for the respective types of the printers 60, 70, and 80 to the distributed printing utility 120 (step S320). The CPU 30 then extracts the highest performance out of the performance information of the respective printers 60, 70, and 80 and specifies the extracted highest performance as the performance information of the virtual printer (step S330). The CPU 30 then transmits the performance information of the virtual printer to the application program 100 (step S340).

When the performance information of the virtual printer is transmitted from the virtual printer driver 110, the CPU 30 shifts the processing to the application program 100 and receives the transmitted performance information of the virtual printer (step S240). The CPU 30 subsequently converts the video data generated at step S210 into print data adequate for the virtual printer, based on the performance information as well as the information regarding the basic settings of printing and the information regarding the paper settings, which are included in the printer property data stored in the RAM 32 in the distribution information setting routine discussed above (excluding the information regarding the printer group and the distributed form) (step S250). After the data conversion, the CPU 30 transmits the converted print data to the virtual printer driver 110 (step S260). On completion of the processing at step S260, the CPU 30 exits from the processing routine in the application program 100.

When the print data adequate for the virtual printer is transmitted from the application program 100, the CPU 30 shifts the processing to the virtual printer driver 110 and receives the transmitted print data (step S350). The CPU 30 subsequently outputs the input print data as intermediate print data to the HDD 41 (step S360). A data set or a set of the intermediate print data is then stored as an intermediate print file MF into the HDD 41. On completion of the processing at step S360, the CPU 30 exits from the processing routine in the virtual printer driver 110.

Figure 15:
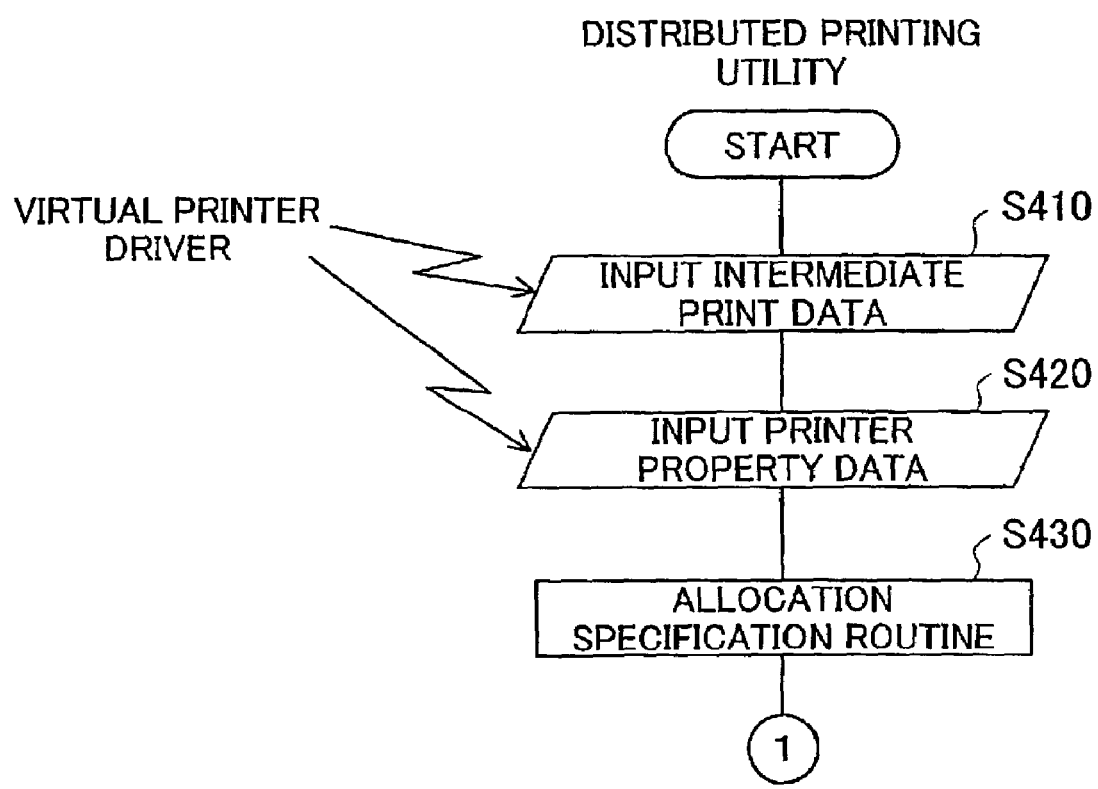
FIG. 15 is a flowchart showing a first half of a processing routine described in a distributed printing utility 120.
Figure 16:
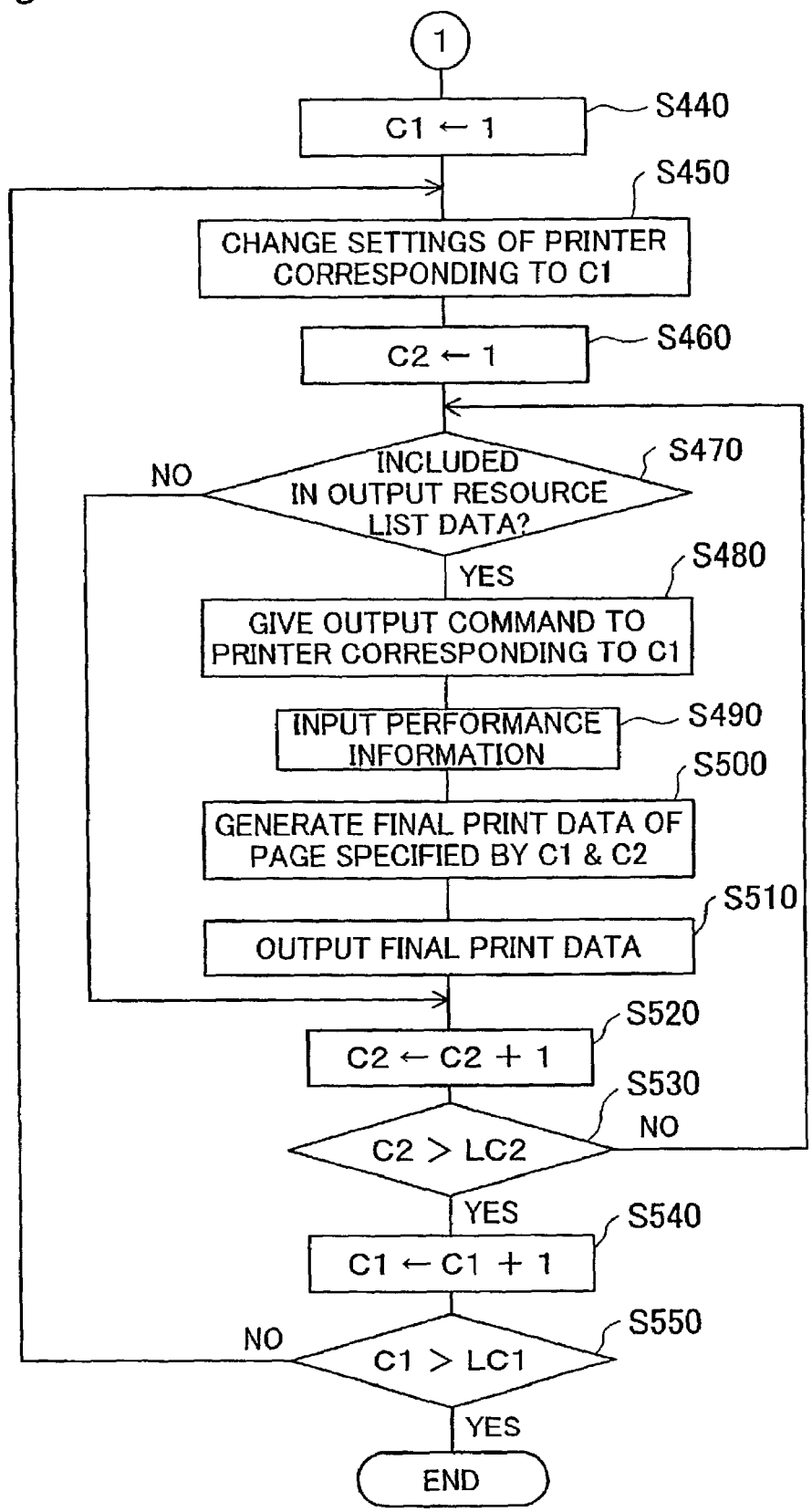
FIG. 16 is a flowchart showing a latter half of the processing routine described in the distributed printing utility 120.

FIGS. 15 and 16 are flowcharts showing a processing routine described in the distributed printing utility 120. This processing routine is activated after conclusion of the processing routine in the virtual printer driver 110. When the program enters this processing routine, as shown in FIG. 15, the CPU 30 first reads the intermediate print data in the intermediate print file MF from the HDD 41 (step S410). The CPU 30 subsequently reads the printer property data, which include the various pieces of information set in the distribution information setting routine (step S420).

The CPU 30 then carries out an allocation specification routine (step S430), which specifies allocation of the intermediate print data input at step S410, based on the information with regard to the printer group and the distributed form included in the printer property data input at step S420. The allocation specification routine specifies allocation of the respective pages included in the intermediate print data to the respective printers 60, 70, and 80 belonging to the specified printer group. The respective pages of the intermediate print data are allocated to the printers 60, 70, and 80, in order to attain the distributed form set in the 'Distributed Printing Properties' dialog box WN2 (that is, the distributed form displayed in the distributed form display box dd of the 'Distribution Settings' card CD1 shown in FIG. 10).

Figure 17:
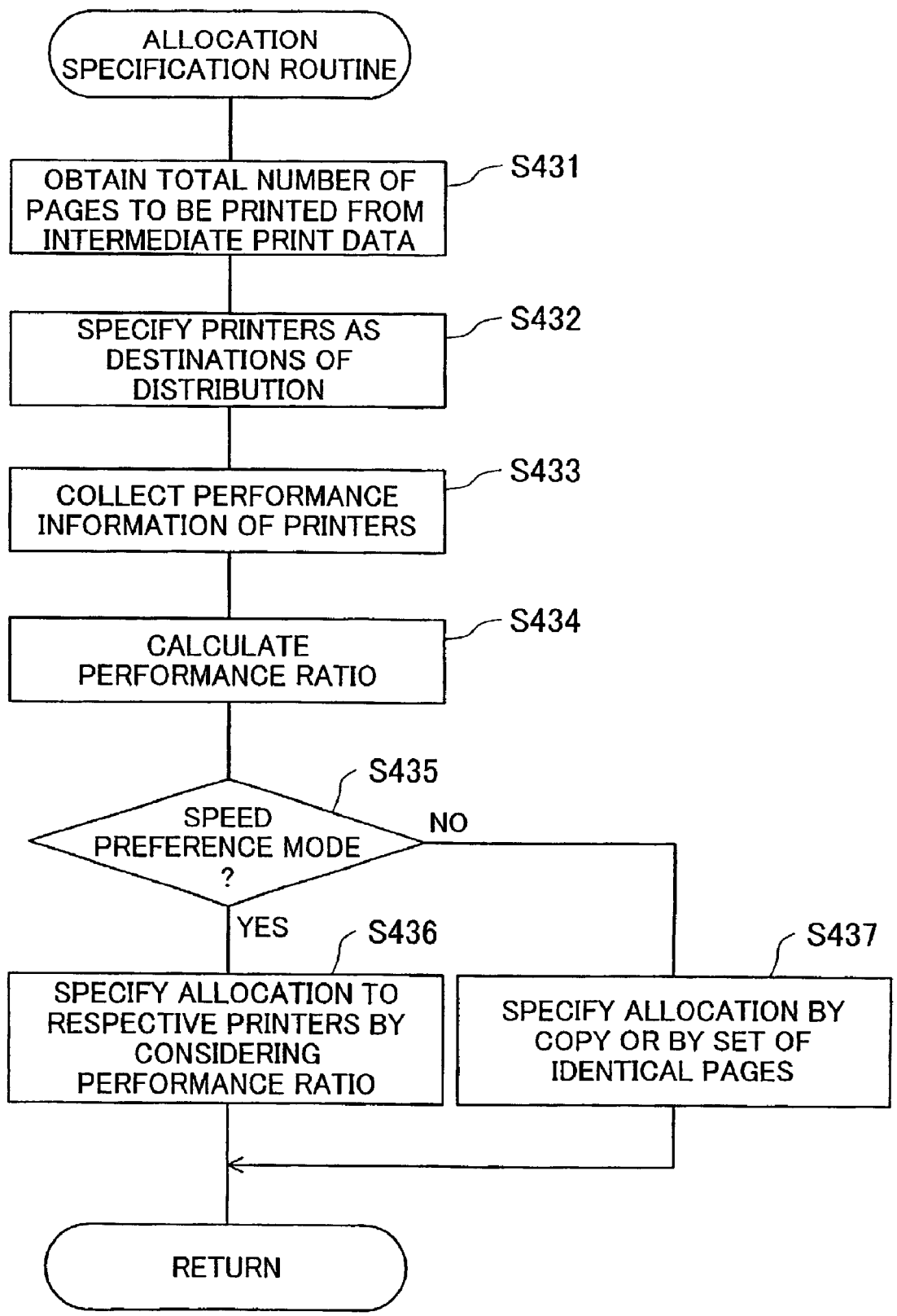
FIG. 17 is a flowchart showing details of the allocation specification process executed at step S430.

FIG. 17 is a flowchart showing the details of the allocation specification routine executed at step S430. When the program enters this routine, the CPU 30 first specifies the total number of pages to be printed according to the intermediate print data input at step S410 (step S431). The CPU 30 then specifies printers as destinations of distribution, based on the information with regard to the printer group included in the printer property data read at step S420 (step S432). The CPU 30 collects the performance information of the respective printers 60, 70, and 80 from the real printer drivers 130, 140, and 150, which are respectively prepared for the printers 60, 70, and 80 specified as the destinations of distribution (step S433). The CPU 30 then reads the printing speed performances of the respective printers 60, 70, and 80 from the collected information and calculates the performance ratio of the printers 60, 70, and 80 with regard to the printing speed from the printing speed performances (step S434).

The CPU 30 subsequently determines whether or not the speed preference mode is set (step S435). The concrete procedure reads the information with regard to the distributed form included in the printer property data read at step S420 and carries out the determination based on activation or inactivation of the 'Bundle by Copy or Page' command, that is, the on-off state of the check box id3. In the speed preference mode, that is, in the off state of the check box id3, the CPU 30 specifies allocation of the intermediate print data input at step S410 by taking into account the performance ratio calculated at step S434 (step S436). The concrete procedure first specifies the ratio of pages allocated to the respective printers corresponding to the performance ratio calculated at step S434. For example, when the performance ratio of the printers 60, 70, and 80 is 1:2:2, the ratio of pages allocated to the respective printers 60, 70, and 80 is also set equal to 1:2:2. The concrete procedure then divides the intermediate print data input at step S410 by page and allocates the preset pages to the respective printers 60, 70, and 80 belonging to the specified printer group, in order to attain the distributed form set in the 'Distributed Printing Properties' dialog box WN2. The division of the pages should satisfy the specified ratio of the pages allocated to the respective printers. Information regarding the preset pages allocated to the respective printers is stored as output resource list data into the RAM 32.

FIG. 18 shows an example of the output resource list data. The illustrated example follows the allocation of FIG. 8. In the illustrated example, pages 1, 2, 3, and 4 are allocated to the first printer 60 (the printer having the first ordinal number) in this sequence as page numbers to be printed. Pages 5, 1, 2, 3, 4, 5, 1, and 2 are allocated to the second printer 70, and pages 3, 4, 5, 1, 2, 3, 4, and 5 are allocated to the third printer 80 (the printer having the last ordinal number) in the respective sequences.

When it is determined at step S435 that the speed preference mode is not set, that is, in the on state of the check box id3, on the other hand, the CPU 30 specifies allocation of the intermediate print data input at step S410, in order to prevent one copy or one set of identical pages from being printed with multiple printers, that is, to attain the handling preference mode (step S437). The concrete procedure divides the intermediate print data input at step S410 by page and allocates the preset pages to the respective printers 60, 70, and 80 belonging to the specified printer group, in order to prevent each copy or a set of identical pages (this depends upon the state of the check box id2) from being printed with multiple printers and attain the distributed form set in the 'Distributed Printing Properties' dialog box WN2. Information regarding the preset pages allocated to the respective printers is stored as output resource list data into the RAM 32.

FIG. 19 shows an example of the output resource list data. The illustrated example follows the allocation of FIG. 9. In the illustrated example, pages 1, 2, 3, 4, and 5 are allocated to the first printer 60 in this sequence as page numbers to be printed. Pages 1, 2, 3, 4, 5, 1, 2, 3, 4, and 5 are allocated to the second printer 70, and pages 1, 2, 3, 4, and 5 are allocated to the third printer 80 in the respective sequences.

After conclusion of either step S436 or step S437, the program goes to END and exits from this processing routine.

The following series of processing is carried out to actualize the printing operation according to the allocation of the pages to the output resources specified at either step S436 or step S437. Referring to the flowchart of FIG. 16, the CPU 30 first sets a value '1' to a printer counter C1 representing a target printer used for printing (step S440). The printer counter C1 shows each available printer as the destination of distribution; the value '1' represents the first printer 60, the value '2' represents the second printer 70, and the value '3' represents the third printer 70.

The CPU 30 subsequently gives an instruction to change the settings to the printer specified by the value of the printer counter C1 (step S450). This processing makes the target printer ready for printing via the printer driver by transmitting the required information on the settings among the information with regard to the basic settings of printing and the information with regard to the paper settings included in the printer property data input at step S420 to the printer driver. For example, the procedure informs the printer driver of the paper type 'Glossy' to make the printer ready for printing suitable for the glossy paper.

The CPU 30 sets a value '1' to a page counter C2 representing the page number to be printed (step S460). The CPU 30 then determines whether or not the output resource list data obtained at step S430 includes the page specified by the values of the printer counter C1 and the page counter C2 (step S470). When the result of the determination shows that the output resource list data includes the specified page, the following series of processing is carried out. The CPU 30 gives an output command to the real printer driver 130 (140 or 150) of the printer specified by the value of the printer counter C1 to make the specified printer carry out printing (step S480). The real printer driver 130 (140 or 150) receiving the output command returns the performance information of the corresponding printer 60 (70 or 80), and the CPU 30 inputs the transmitted performance information (step S490).

The CPU 30 subsequently generates final print data with regard to the page specified by the values of the page counter C2 and the printer counter C1, based on the input performance information as well as the information with regard to the basic settings of printing and the paper settings included in the printer property data input at step S420 (excluding the information with regard to the printer group and the distributed form) (step S500). The concrete procedure of step S500 extracts page data regarding the page corresponding to the value of the page counter C2 from the intermediate print data input at step S410 and carries out the rendering process to convert the extracted page data into data suitable for the printer 60 (70 or 80) corresponding to the value of the printer counter C1 based on the performance information, the information regarding the basic settings of printing, and the information regarding the page settings, so as to generate the final print data.

The CPU 30 then outputs the generated final print data to the real printer driver 130 (140 or 150) of the printer 60 (70 or 80) corresponding to the value of the printer counter C1 (step S510). Prior to execution of printing at steps S480 to S510, one modified procedure may monitor the status of each printer 60, 70, or 80 based on the signal output from the corresponding real printer driver 130, 140, or 150. When the result of monitoring shows that there is a long queue of print jobs in the printer specified as the output resource or the specified printer is in an error state, the modified procedure may change the output resource to another printer or temporarily stop the output of the print job.

The CPU 30 subsequently increments the value of the page counter C2 by one (step S520). In the case of the negative answer at step S470, the program skips the processing of steps S480 to S510 and directly proceeds to step S520. The CPU 30 then determines whether or not the current value of the page counter C2 exceeds a value LC2 representing the last page (step S530). When it is determined that the current value of the page counter C2 does not exceed the value LC2 representing the last page, the program returns to step S470 and generates and outputs the final print data on the new page specified by the incremented value. When it is determined at step S530 that the current value of the page counter C2 exceeds the value LC2 representing the last page, on the other hand, the CPU 30 increments the value of the printer counter C1 by one (step S540) and determines whether or not the current value of the printer counter C1 exceeds a value LC1 representing the last printer (step S550). When it is determined that the current value of the printer counter C1 does not exceed the value LC1 representing the last printer, the program returns to step S450 and generates and outputs the final print data on each page of the print job with the next printer 70 (80 or 60) specified by the incremented value of the printer counter C1. When it is determined at step S550 that the current value of the printer counter C1 exceeds the value LC1 representing the last printer, on the other hand, the program determines that generation and output of the final print data has been concluded for all the pages of the print job required for printing with all the printers and goes to END to exit from the processing routine in the distributed printing utility.

The processing routine in the distributed printing utility is described to generate and output the final print data regarding the first page to the last page sequentially by the printer unit, that is, from the first printer to the last printer. Such description is, however, for convenience of illustration in the flowchart. The actual procedure carries out generation and output of the final print data regarding the first page to the last page by the respective printers in parallel by time sharing. The series of processing is executed in parallel in the respective printers in the structure of the embodiment. A computer main body including multiple microprocessors may alternatively be used to attain completely parallel processing.

A6. Effects of Embodiment

Figure 20:
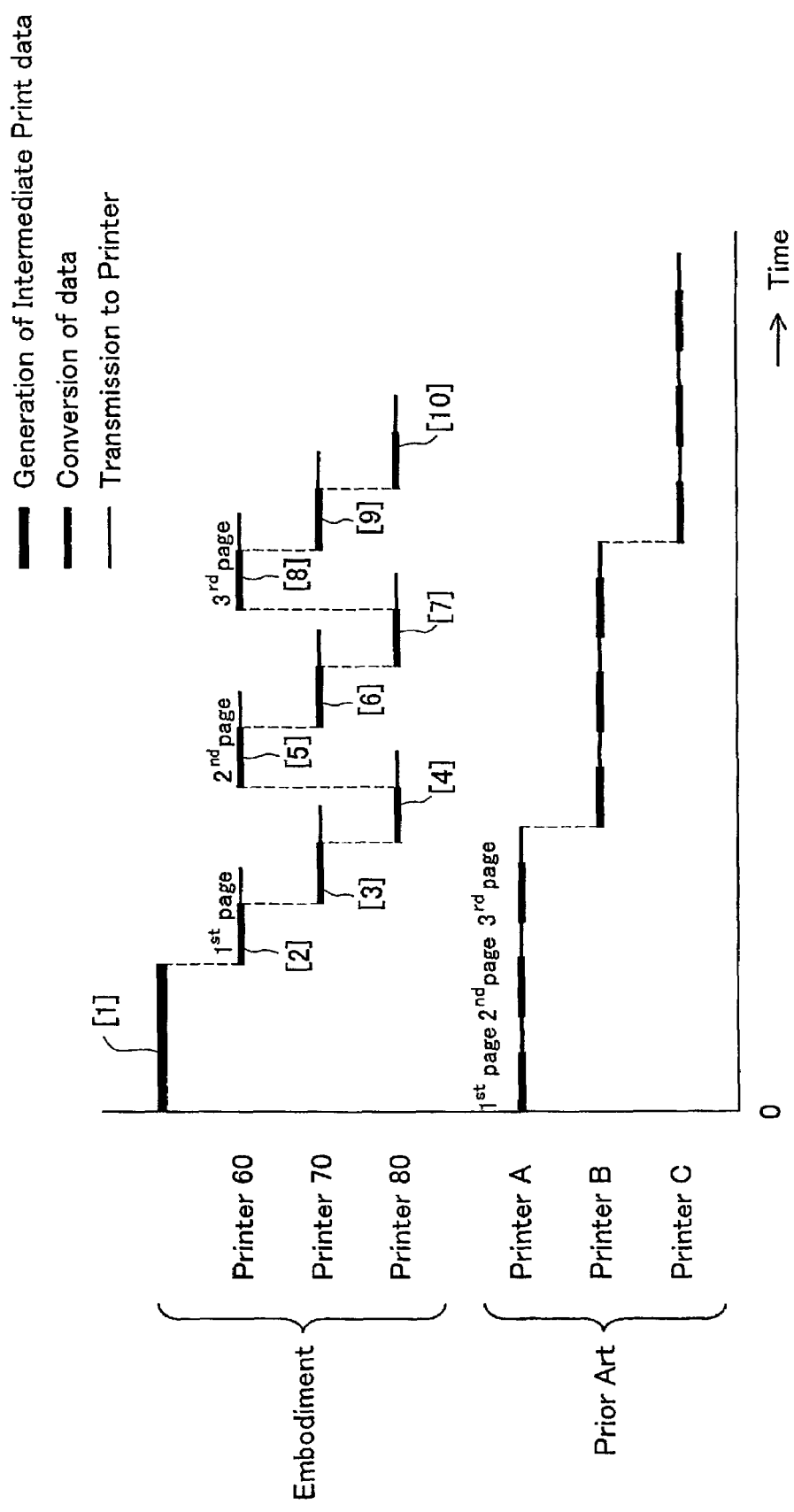
FIG. 20 is a timing chart showing the procedure of the embodiment for distributed printing, compared with a prior art procedure.

FIG. 20 is a timing chart showing a procedure of distributed printing with the computer system constructed as discussed above, compared with a prior art procedure. In the illustrated example, the print job is given to make each of the three printers 60, 70, and 80 print one copy of a document including 3 pages. The procedure of this embodiment first generates the intermediate print data ([1]) and carries out the parallel rendering process to sequentially convert the page data on the first page of the intermediate print data into data adequate for the printer 60, the printer 70, and the printer 80 ([2], [3], [4]). Transmission of the data converted for the printer 60 (that is, the final print data) to the printer 60 is carried out in parallel with the rendering process for the next printer 70. In a similar manner, transmission of the converted data to the printer 70 and to the printer 80 is carried out in parallel with the rendering process for the next printer. The procedure then carries out the parallel rendering process to sequentially convert the page data on the second page of the intermediate print data into data adequate for the printer 60, the printer 70, and the printer 80 ([5], [6], [7]). The procedure subsequently carries out the parallel rendering process to sequentially convert the page data on the third page of the intermediate print data into data adequate for the printer 60, the printer 70, and the printer 80 ([8], [9], [10]). The printing operation of the whole print job is thus concluded.

The prior art procedure first carries out the rendering process to convert the page data on the first page into data adequate for a first printer A and transmits the converted data by the rendering process to the printer A. The prior art procedure then carries out the rendering process to convert the page data on the second page into data adequate for the first printer A and transmits the converted data to the printer A. The prior art procedure subsequently carries out the rendering process to convert the page data on the third page into data adequate for the first printer A and transmits the converted data to the printer A. In the same manner as for the first printer A, the procedure sequentially carries out the rendering process for the first page, the second page, and the third page and transmission of the converted data to a second printer B. Similarly, the procedure sequentially carries out the rendering process for the first page, the second page, and the third page and transmission of the converted data to a third printer C.

The procedure of the embodiment carries out the rendering process in parallel with transmission of the processed data to the printer. Compared with the prior art procedure, the procedure of this embodiment thus effectively shortens the total time required for printing.

In the procedure of this embodiment, the intermediate print data is obtained by simple output of a print command from the application program 100 to the virtual printer driver 110, and the distributed printing of the intermediate print data with the printers 60, 70, and 80 is automatically carried out. The operator is thus only required to execute the 'Print' command once on the application program. This arrangement effectively ensures the excellent operatability.

In the structure of this embodiment, the distributed printing utility 120 automatically specifies allocation of the respective pages of print data to printers, and the operator is not required to individually output a print command to each printer specified as the destination of distribution. This ensures excellent operatability. In the speed preference mode, the procedure of the embodiment calculates the performance ratio of the respective printers 60, 70, and 80 with regard to the printing speed from the information on the printing speed performances of the printers 60, 70, and 80, and specifies allocation of the pages to the respective printers 60, 70, and 80 corresponding to the performance ratio. The printer having the high printing speed performance prints a large number of pages, while the printer having the low printing speed performance prints a little number of pages. This makes the respective printers conclude the printing operations almost simultaneously. This arrangement effectively shortens the total time required for printing.

In the handling preference mode, the procedure of the embodiment prevents each copy or a set of identical pages from being printed with multiple printers. Each copy or a set of identical pages is thus not parted in the resulting prints obtained from the respective printers. This effectively ensures the operatability in collection of the resulting prints.

In the structure of this embodiment, the mode is readily changed over between the speed preference mode and the handling preference mode by checking or non-checking of the check box id3 'Bundle by Copy or Page' in the 'Distributed Printing Properties' dialog box WN2. This ensures excellent operatability.

In this embodiment, inputting 'By Printer' in the 'Job Grouping' data input box id4 effects the speed preference even in the handling preference mode, which is set by checking the check box id3 'Bundle by Copy or Page'.

In the structure of this embodiment, the printing method is readily changed over between gathering print and stack print by checking or non-checking the check box id2 'Collate'.

The structure of this embodiment allows the operator to readily input the information with regard to the form of distributed printing and the information with regard to the printer group in the 'Distributed Printing Properties' dialog box WN2 open on the CRT display 12. Especially the illustrated image in the distributed form display box dd in the 'Distributed Printing Properties' dialog box WN2 informs the operator of the specified distributed form. The visual information of the distributed form prior to execution of actual distributed printing further enhances the operatability. In the example of FIG. 6, the printer names specified as the destinations of distribution are not added to the illustrated image in the distributed form display box dd. The printer names specified as the destinations of distribution may alternatively be added to the illustrated image. Namely the printer name specified as the destination of distribution is given to each set of pages. This distinctly informs the operator of the printer specified as the destination of distribution.

In the distributed printing control apparatus of the above embodiment according to the present invention, print data is directly output from one computer 10 to the multiple printers 60, 70, and 80. Another possible application is a client-server system, in which a server may be provided on the computer network 90 to manage distributed printing with multiple printers. In this application, the virtual printer driver is incorporated in each client, and the distributed printing utility is incorporated in the server.

B. Second Embodiment

B1. User Interface

The following describes a second embodiment of the present invention. The details of 'A1. General Hardware Structure', 'A2. Distributed Printing Process', and 'A3. Virtual Printer Driver' discussed in the first embodiment are adopted in the second embodiment of the present invention. The same parts as those of the first embodiment are expressed by the same numerals. The differences between the first embodiment and the second embodiment are part of the details of the user interface and part of the computer programs. The details of the user interface are discussed first.

Figure 21:
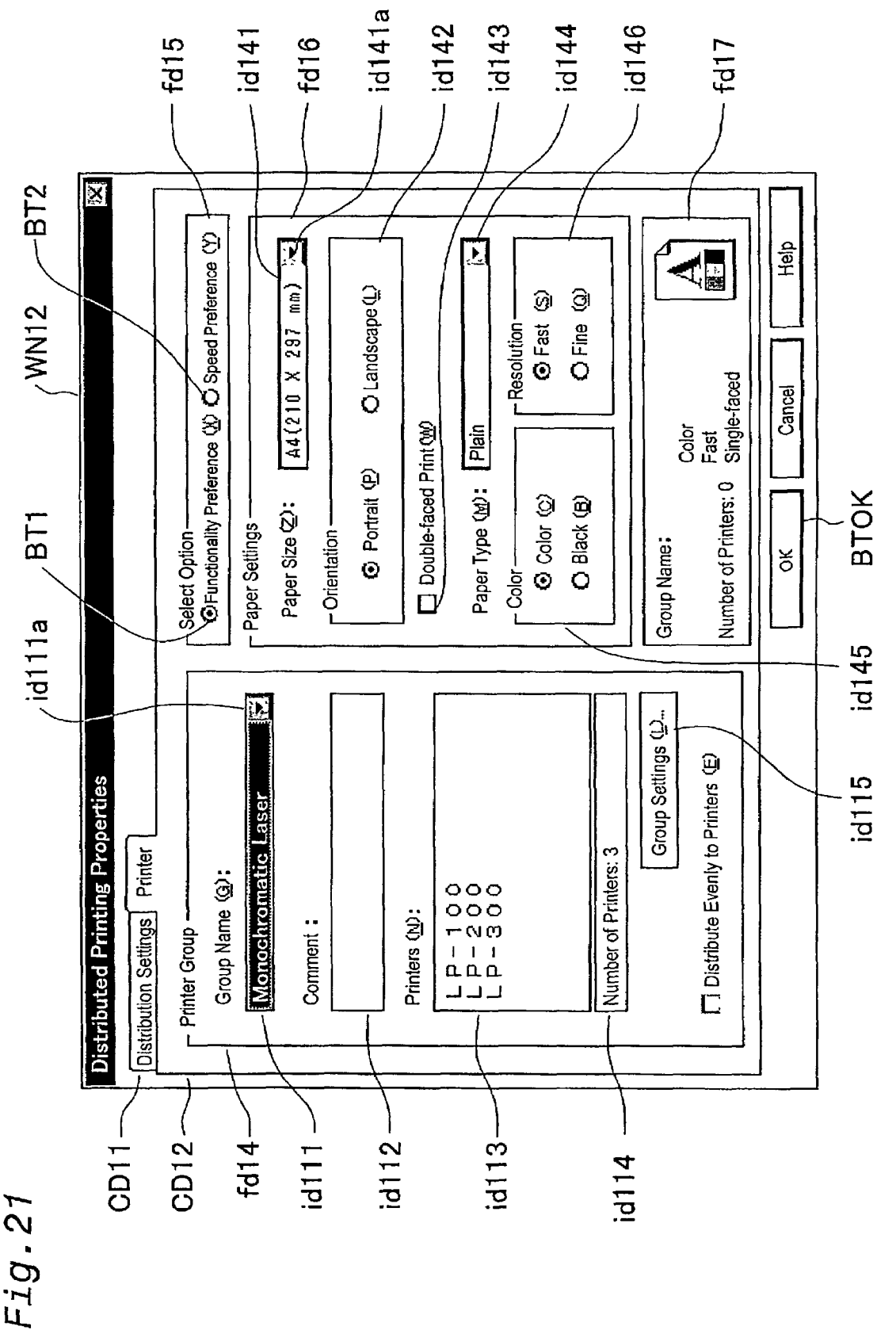
FIG. 21 illustrates a 'Printer' card CD12 displayed on a 'Distributed Printing Properties' dialog box WN12 in a second embodiment of the present invention.

Like the first embodiment, in the structure of the second embodiment, a dialog box 'Distributed Printing Properties' is provided as the user interface. FIG. 21 illustrates a dialog box WN12 'Distributed Printing Properties'. Like the first embodiment, two cards CD11 'Distribution Settings' and CD12 'Printer' are provided in the dialog box WN12 'Distributed Printing Properties'. The 'Distributed Settings' card CD11 is identical with the 'Distributed Settings' card CD1 of the first embodiment (see FIG. 6).

The 'Printer' card CD12 is used to set the information with regard to the printer group as the potential destinations of distribution, the basic settings of printing, and the paper settings. This corresponds to the card CD2 of the first embodiment. The operator selects either of the two cards CD11 and CD12 to be displayed in the dialog box WN12 through operations of the mouse 20. In the state of FIG. 21, the 'Printer' card CD12 is selected. The division of the information into the cards CD11 and CD12 is not restricted to the above example, but the information may all be included in one card or may be divided into three or more cards.

The contents of the 'Printer' card CD12 are discussed in detail. As illustrated, the 'Printer' card CD12 includes a 'Printer Group' field fd14, a 'Select Option' field fd15, a 'Paper Settings' field fd16, and a settings display box fd17.

The 'Printer Group' field fd14 specifies a group of printers, which are used for distributed printing of a document. The 'Printer Group' field fd14 includes a 'Group Name' data input box id111, a 'Comment' display box id112, a 'Printers' display box id113, a 'Number of Printers' display box id114, and a 'Group Settings' button id115. In the following discussion, the group of printers or the printer group may simply be referred to as the group.

The 'Group Name' data input box id111 sets the name of the group. A click of a button id111a with an inverse triangle on the right end opens a pull-down menu (see FIG. 31). A plurality of group names are preset as possible options in this pull-down menu. The operator clicks one of the options included in the pull-down menu with the mouse 20, so as to set a desired group name in the data input box id111.

The 'Comment' display box id112 shows any comment given to the currently selected group in the 'Group Name' data input box id111. The 'Printers' display box id113 shows the names of the printers belonging to the currently selected group in the 'Group Name' data input box id111. The 'Number of Printers' display box id114 shows the number of printers used for distribution printing.

The 'Group Settings' button id115 is a switch to start various operations, such as addition of a new group or change of settings in an existing group. The following describes the operation of adding a new group. When the operator clicks the 'Group Settings' button id115 with the mouse 20, a 'Group List' dialog box is open on the CRT display 12.

Figure 22:
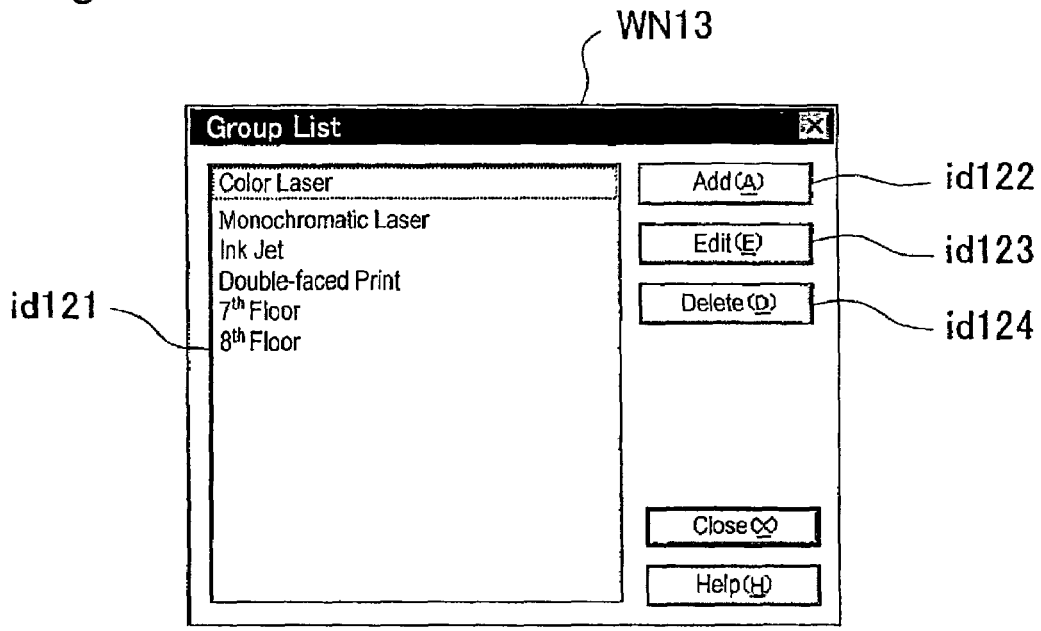
FIG. 22 shows a 'Group List' dialog box WN13.

FIG. 22 shows a 'Group List' dialog box WN13. As illustrated, the 'Group List' dialog box WN13 includes a 'List' display box id121, an 'Add' button id122, an 'Edit' button id123, and a 'Delete' button id124. The 'List' display box id121 shows a list of existing groups. The 'Add' button id122 is used to add a new group to the list. In response to a click of the 'Add' button id122 with the mouse 20, a 'Group Settings' dialog box is open on the CRT display 12.

Figure 23:
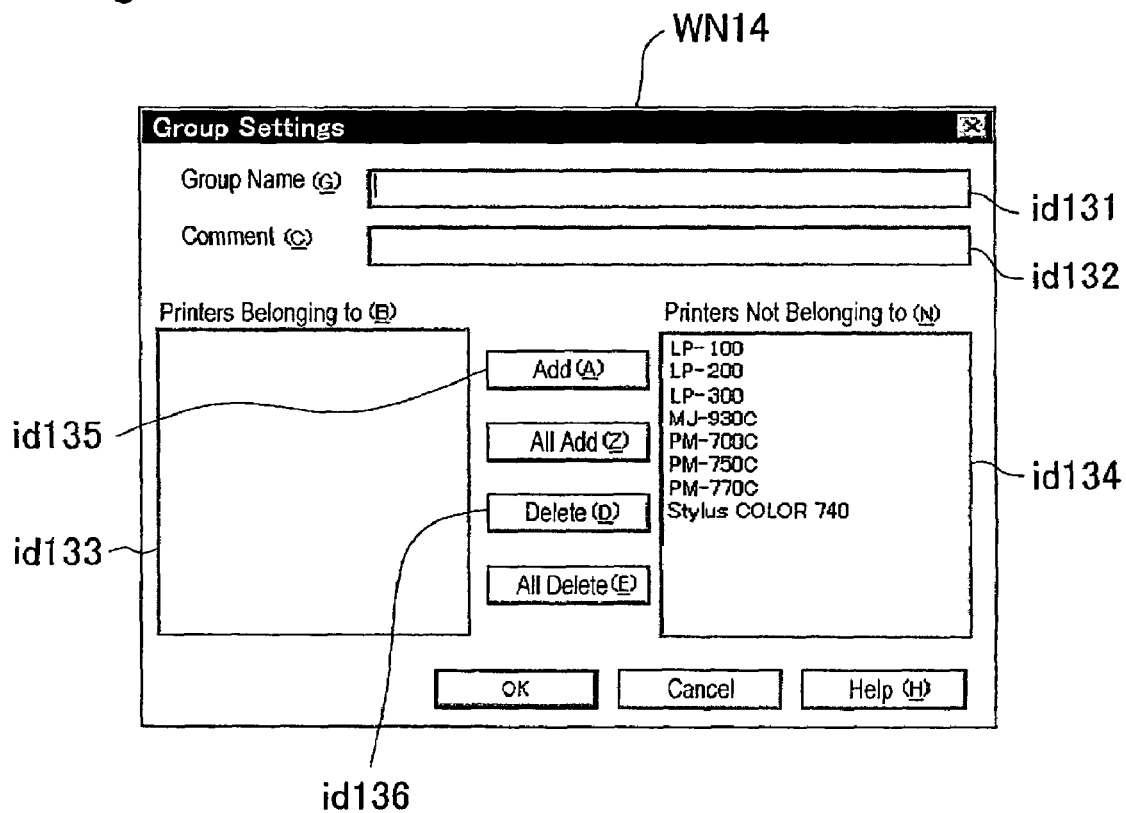
FIG. 23 shows a 'Group Settings' dialog box WN14.

FIG. 23 shows a 'Group Settings' dialog box WN14. As illustrated, the 'Group Settings' dialog box WN14 includes a 'Group Name' data input box id131, a 'Comment' data input box id132, a 'Printers Belonging to' display box id133, and a 'Printers Not Belonging to' display box id134.

The 'Group Name' data input box id131 is used to input the name of the selected group of printers. The 'Comment' data input box id132 is used to input any description of the selected group. The 'Printers Belonging to' display box id133 shows printers belonging to the selected group. The 'Printers Not Belonging to' display box id134 shows printers that are not included in the selected group among a large number of preset printer names.

Figures 24, 25:
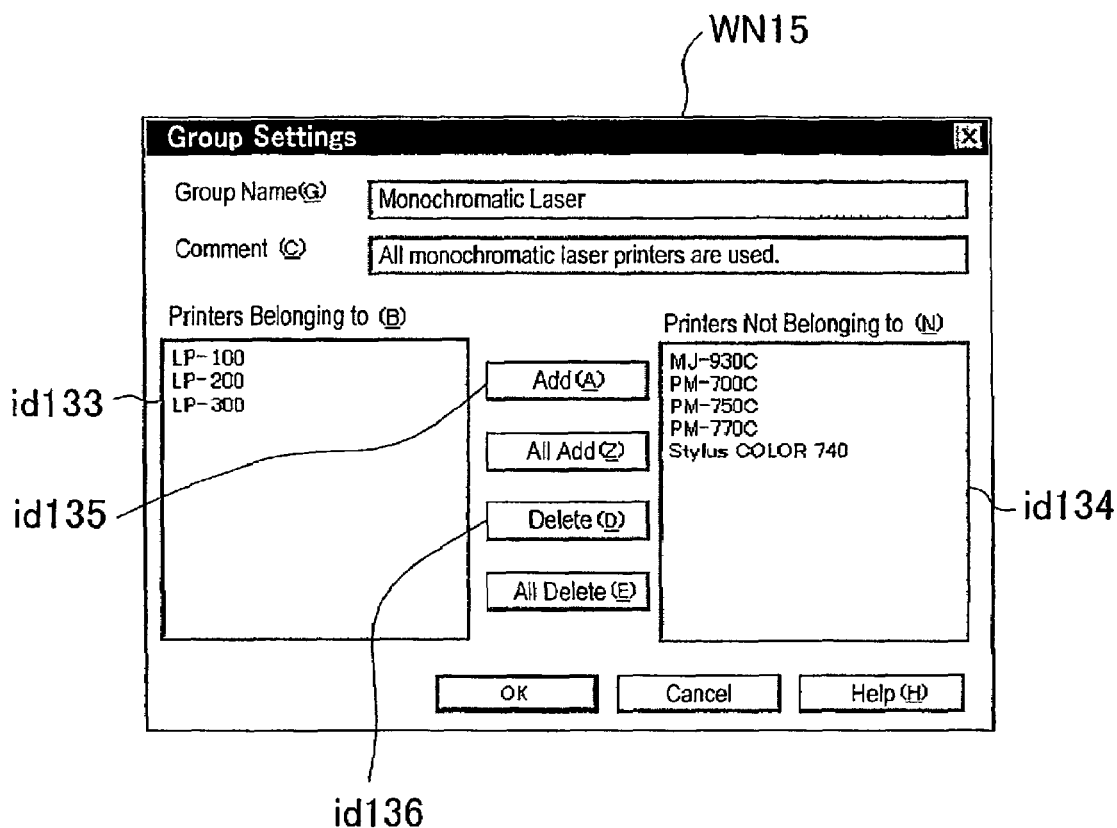
FIG. 24 shows addition to a 'Printers Belonging to' display box id33.
FIG. 25 shows an example of group registration list data PD.

The operator selects a desired one out of the printer names shown in the 'Printers Not Belonging to' display box id134 and clicks an 'Add' button id135. The selected printer name is then transferred to the 'Printers Belonging to' display box id133. In the example of FIG. 23, there are the names of eight printers in the 'Printers Not Belonging to' display box id134. When the operator selects three printers 'LP-100', 'LP-200', and 'LP-300' and clicks the 'Add' button id135, the names of the three selected printers are transferred to the 'Printers Belonging to' display box id133 as shown in FIG. 24.

The printers displayed in the 'Printers Belonging to' display box id133 have the order of priority specified by the sequence of display. The printer displayed on the top has the highest priority, and the lower positioned printer has the lower priority. The displayed sequence of the printers is coincident with the sequence of the shift to the 'Printers Belonging to' display box id133. Selection of each printer out of the printer names in the 'Printers Not Belonging to' display box id134 and a subsequent click of the 'Add' button id135 sequentially shifts the selected printer to the 'Printers Belonging to' display box id133. This specifies the sequence of printers displayed in the 'Printers Belonging to' display box id133, that is, the order of priority allocated to the respective printers. The order of priority allocated to the respective printers is utilized for allocation in the distributed printing.

A 'Delete' button id136 is used to delete a selected printer from the names of the printers included in the 'Printers Belonging to' display box id133.

One or a plurality of printers are allocated to each group through a series of operations on the 'Group Settings' dialog box WN14. The results of allocation are stored as group registration list data in the RAM 32. FIG. 25 shows an example of group registration list data PD. The group registration list data PD includes one or multiple group names, wherein one or multiple printer names and any related comment are mapped to each group name.

The group names displayed in the 'List' display box id121 on the 'Group List' dialog box WN13 are based on the group name data included in the group registration list data PD. Referring back to FIG. 21, the contents of the 'Group Name' data input box id111, the 'Comment' display box id112, and the 'Printers' display box id113 in the 'Printer Group' field fd14 are updated with the group registration list data PD, that is, the new registration in the 'Group List' dialog box WN13 and the 'Groups Settings' dialog box WN14. The pull-down menu open from the 'Group Name' data input box id111 accordingly includes the group names registered in the 'Group List' dialog box WN13. The registration in the 'Group Settings' dialog box WN14 is reflected on the contents of the 'Comment' display box id112 and the 'Printers' display box id113.

The 'Select Option' field fd15 is used to restrict the data input in the 'Paper Settings' field fd16 in two different modes 'Functionality Preference' and 'Speed Preference'. The field fd15 has a radio button BT1 corresponding to the 'Functionality Preference' mode and a radio button BT2 corresponding to the 'Speed Preference' mode. A click of the radio button BT1 or BT2 respectively activates the 'Functionality Preference' mode or the 'Speed Preference' mode and restricts the data input. Restriction of the data input in the 'Paper Settings' field fd16 in each mode will be discussed later in detail.

The 'Paper Settings' field fd16 sets the paper and the printing quality and has data input boxes 'Paper Size' 'Orientation', 'Double-faced Print', 'Paper Type', 'Color', and 'Resolution' id141, id142, id143, id144, id145, and id146.

The 'Paper Size' data input box id141 sets the paper size as well as the paper type. A pull-down menu (see FIG. 32) is open in response to a click of a button id141a with an inverse triangle on the right end. A plurality of paper sizes are preset as possible options in this pull-down menu. Examples of the possible options include 'A4 210×297 mm', 'A4 Lateral 210×297 mm', 'Envelop 120×235 mm', and 'Postcard 100×147 mm'.

The 'Orientation' data input box id142 represents the orientation of paper set in the printer and has two options 'Portrait' and 'Landscape'. The 'Double-faced Print' data input box id143 has a check box to specify double-faced printing. When this check box is clicked, only the printers having the double-faced printing function are used for distributed printing.

The 'Paper Type' data input box id144 specifies the type of paper, and 'Plain', 'Superfine', and 'Glossy' are provided as possible options. The 'Color' data input box id145 specifies the type of ink used in the printer 14, and 'Color' and 'Black' are provided as possible options. The 'Resolution' data input box id146 sets the printing resolution, and 'Fast' and 'Fine' are provided as possible options. For example, 'Fast' and 'Fine' respectively represent the resolutions of 360×360 (dots) and 720×720 (dots).

A settings display box fd17 displays desired data among the settings in the 'Printer Group' field fd14 and the 'Paper Settings' field fd16.

Various pieces of information with regard to the settings in the 'Distributed Printing Properties' dialog box WN12, for example, information on the form of distributed printing, information on the printer group as the destination of distribution, information on the paper settings, and information on the basic settings of printing, are input into the computer main body 16 through the user's operations of the mouse 20 and the keyboard 18.

B2. Computer Programs

Like the first embodiment, the computer programs are executed in the virtual printer driver 110 and the distributed printing utility 120 in the second embodiment. The distributed printing utility 120 of the second embodiment is identical with that of the first embodiment and is thus not specifically described here. The following describes the virtual printer driver 110.

Like the first embodiment, the virtual printer driver 110 is stored in advance in the floppy disk 22 and is installed from the floppy disk drive 24 into the computer 10 according to an activated preset installation program. The virtual printer driver 110 may be stored in another portable recording medium (carriable recording medium), such as a CD-ROM, a magneto-optic disc, or an IC card, in place of the floppy disk 22. The virtual printer driver 110 may be program data, which are downloaded from a specific server connecting with an external computer network (for example, the Internet) via the computer network and transferred to either the RAM 32 or the HDD 41.

Figure 26:
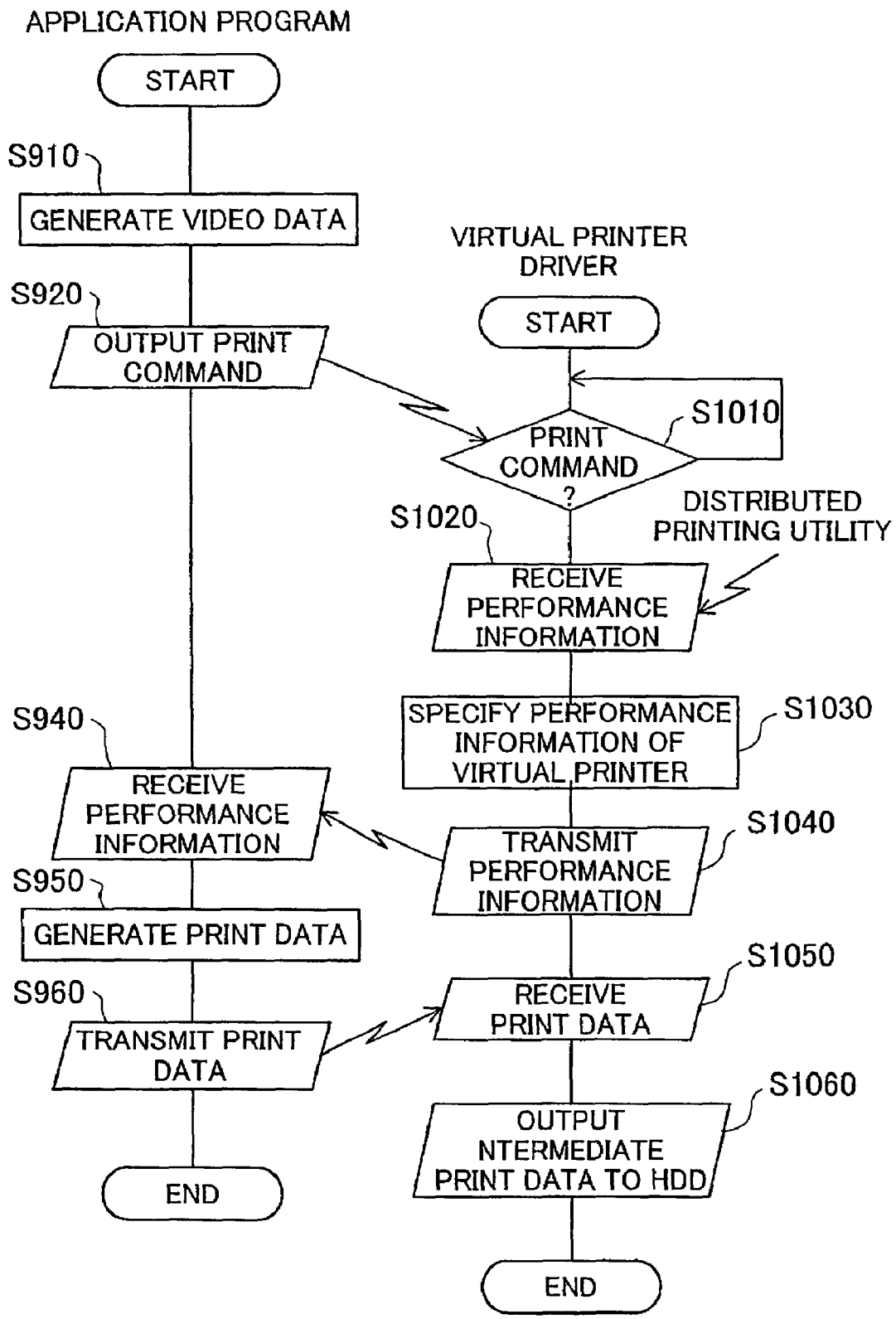
FIG. 26 is a flowchart showing a series of processing described in the application program 100 and a series of processing described in the virtual printer driver 110 in the second embodiment.

FIG. 26 is a flowchart showing a processing routine described in the virtual printer driver 110 as well as a processing routine described in the application program 100. The CPU 30 in the computer main body 16 starts the processing in the application program 100 and carries out a series of image processing to generate video data (step S910). The application program 100 may be a general purpose application program used to create documents and pictures, and video data is generated by the functions characteristic of each application program.

Figure 27:
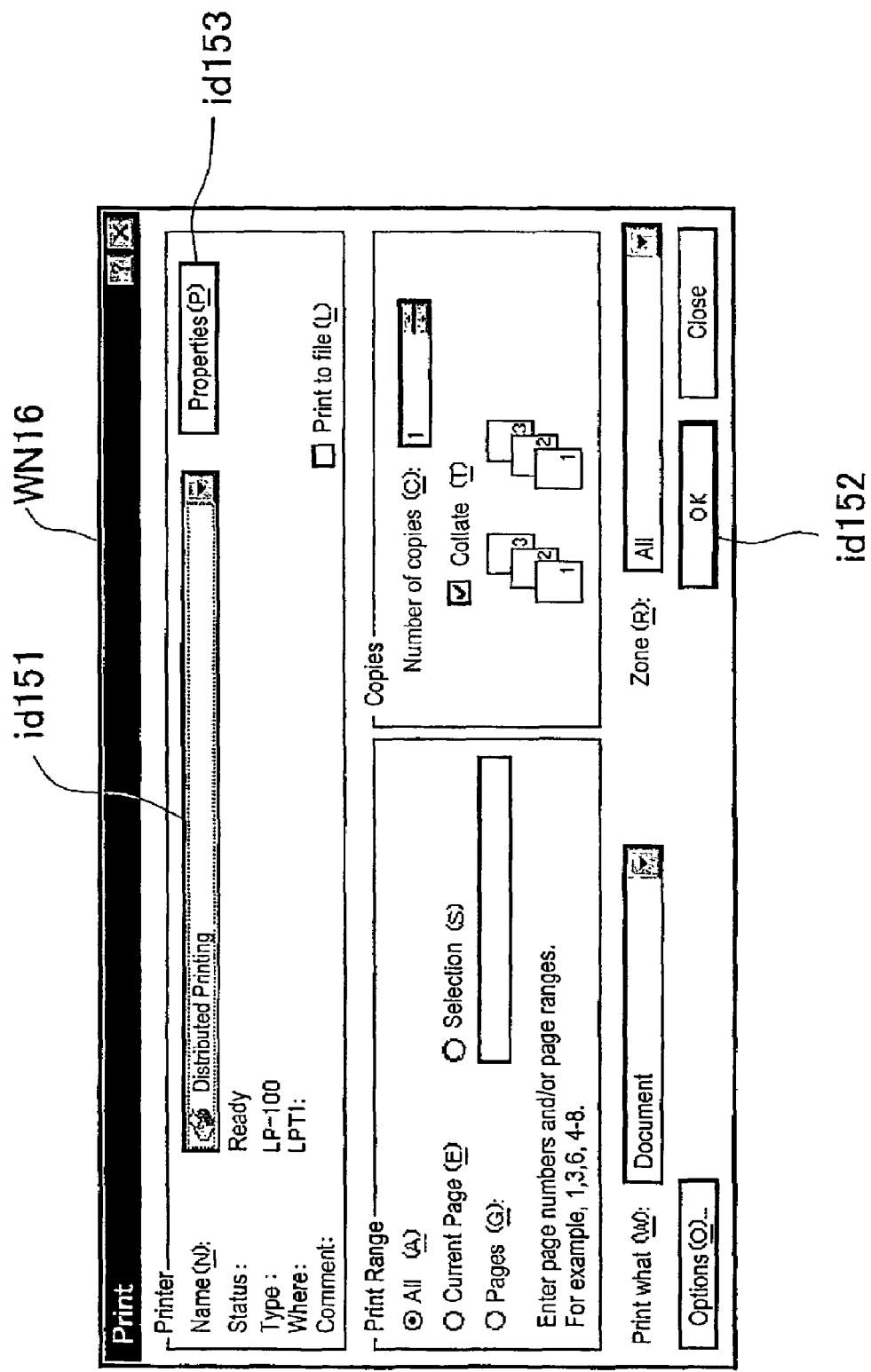
FIG. 27 illustrates a 'Print' dialog box WN16 open on the CRT display 12 in response to execution of a 'Print' command on the application program 100.

The CPU 30 executes a 'Print' command provided in the application program and thereby outputs a print command for distributed printing (step S920). FIG. 27 illustrates a 'Print' dialog box WN16 open on the CRT display 12 in response to execution of the 'Print' command on the application program 100. As illustrated, the 'Print' dialog box WN16 has a 'Printer Name' data input box id151. The print command for distributed printing is output from the application program 100 via the operating system to the virtual printer driver 110 in response to a click of an 'OK' button id152 with the mouse 20, while a series of letters 'Distributed Printing', which corresponds to the 'Distributed Printing' icon IC4 discussed previously with FIG. 5, is selectively input in the 'Printer Name' data input box id151. A click of a 'Properties' button id153 in the 'Print' dialog box WN16 shifts the processing to a distribution information setting routine executed in the virtual printer driver 110. The process opens the 'Distributed Printing Properties' dialog box WN12 on the CRT display 12 and reads input data from the keyboard 18 and the mouse 20, so as to set various pieces of information regarding the distributed printing.

Figure 28:
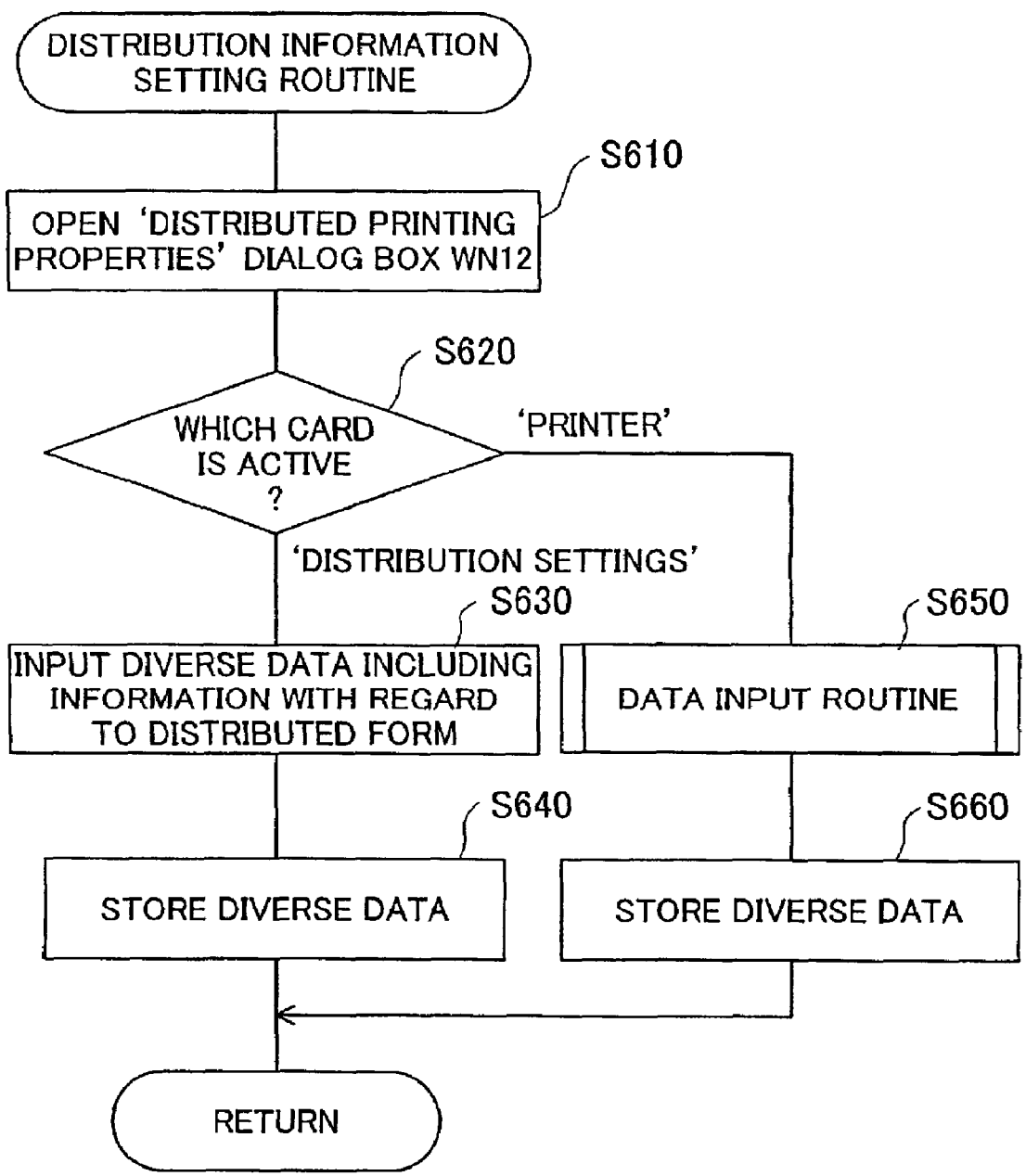
FIG. 28 is a flowchart showing a distribution information setting routine executed by the CPU 30.

The following describes a series of processing to set various pieces of information relating to the distributed printing in the 'Distributed Printing Properties' dialog box WN12. FIG. 28 is a flowchart showing a distribution information setting routine executed by the CPU 30. When the program enters this routine, the CPU 30 first opens the 'Distributed Printing Properties' dialog box WN12 shown in FIG. 21 on the CRT display 12 (step S610). The CPU 30 then determines which of the 'Distribution Settings' card CD11 and the 'Printer' card CD12 is active in this dialog box WN12 (step S620). When it is determined that the 'Distribution Settings' card CD11 is active, the program goes to step S630.

At step S630, the CPU 30 inputs diverse data through the operator's data input operations with the keyboard 18 and the mouse 20 while the operator checks the display on the CRT display 12. The diverse data input here represent the settings in the 'Distribution Settings' card CD11 in the 'Distributed Printing Properties' dialog box WN12, and includes information with regard to the form of distributed printing. The CPU 30 subsequently stores the diverse data input at step S630 as part of the printer property data into the RAM 32 (step S640). The program then goes to RETURN and exits from this processing routine.

When it is determined at step S620 that the 'Printer' card CD12 is active, on the other hand, the program goes to step S650 to execute a data input routine on the 'Printer' card CD12. The details of the data input routine will be discussed later. Information with regard to the printer group, information with regard to the paper settings, and information with regard to the basic settings of printing are input in the 'Printer' card CD 12 by execution of the data input routine. The CPU 30 subsequently stores the diverse data input at step S650 as part of the printer property data into the RAM 32 (step S660). The program then goes to RETURN and exits from this processing routine.

Figure 29:
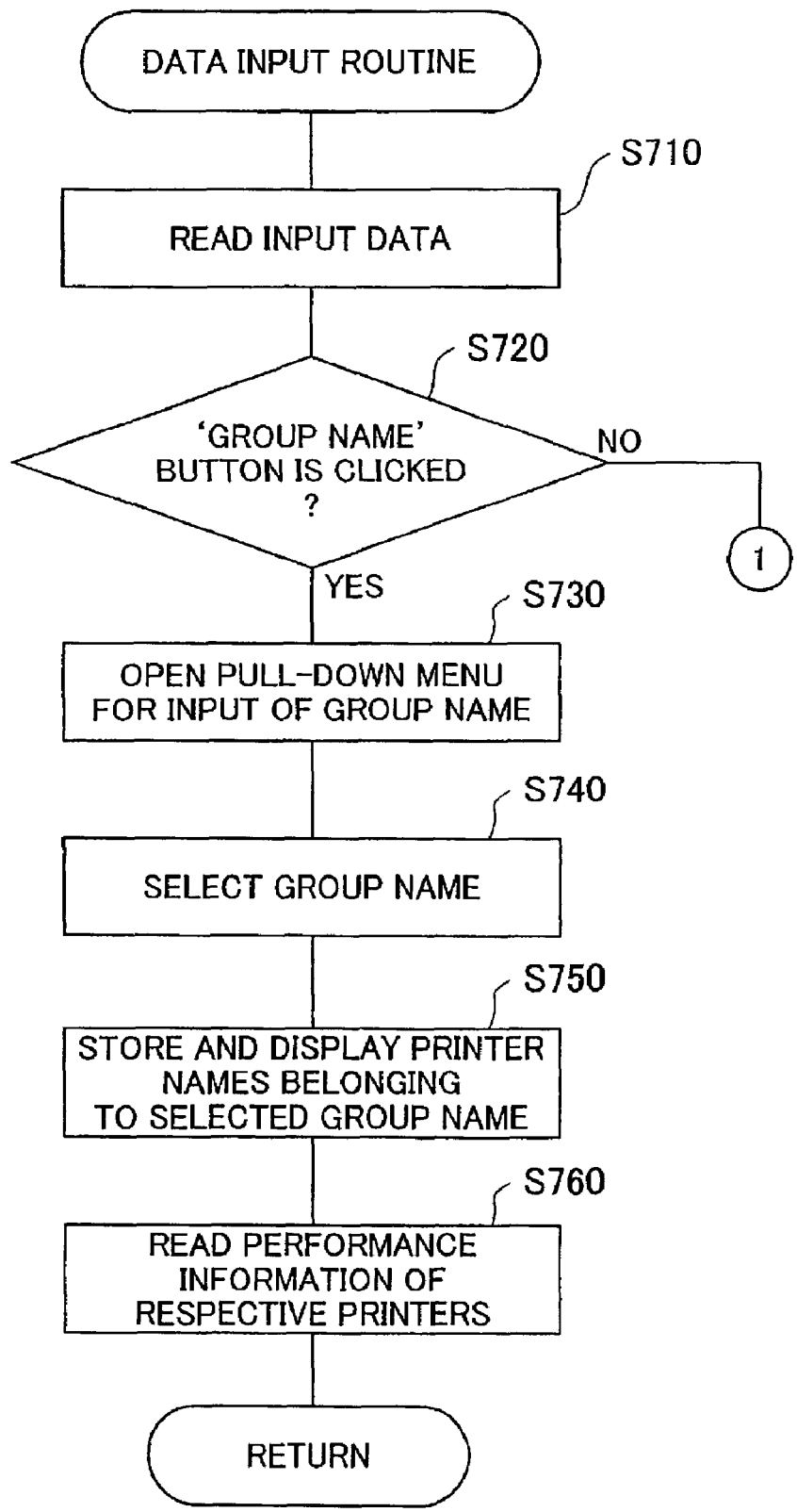
FIG. 29 is a flowchart showing a first half of a data input processing routine executed by the CPU 30.
Figure 30:
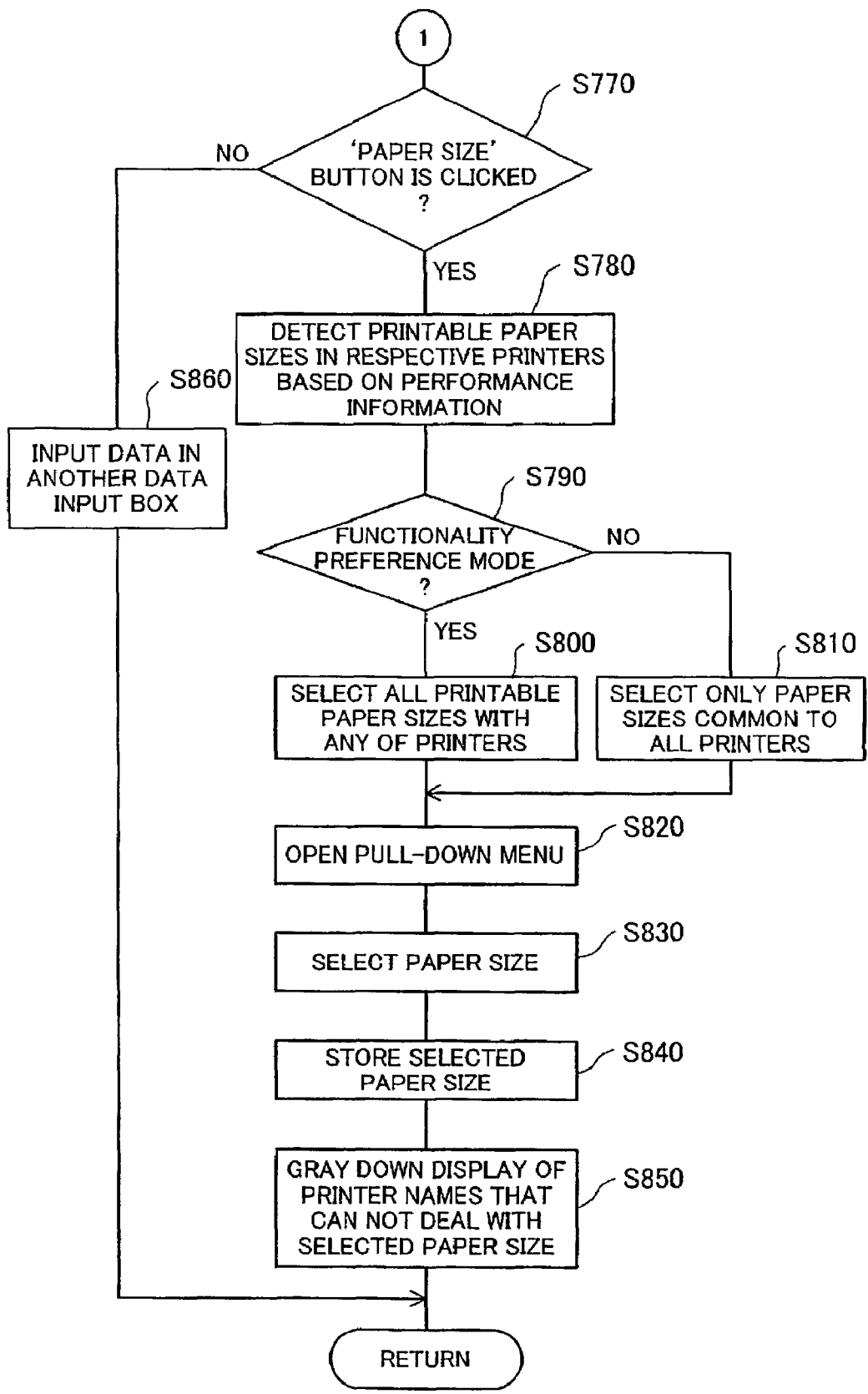
FIG. 30 is a flowchart showing a latter half of the data input processing routine.

The following describes the details of the data input routine executed at step S650. FIGS. 29 and 30 are flowcharts showing the details of the data input routine. When the program goes to step S650 in the distribution information setting routine and starts the data input routine, the CPU 30 first reads input data through the operator's input operations with the keyboard 18 and the mouse 20 (step S710) as shown in FIG. 29. The CPU 30 then determines whether or not a button id111a attached to the data input box id111 'Group Name' is clicked with the mouse 20, based on the input data (step S720). The following series of processing is carried out in response to the click.

Figure 31:
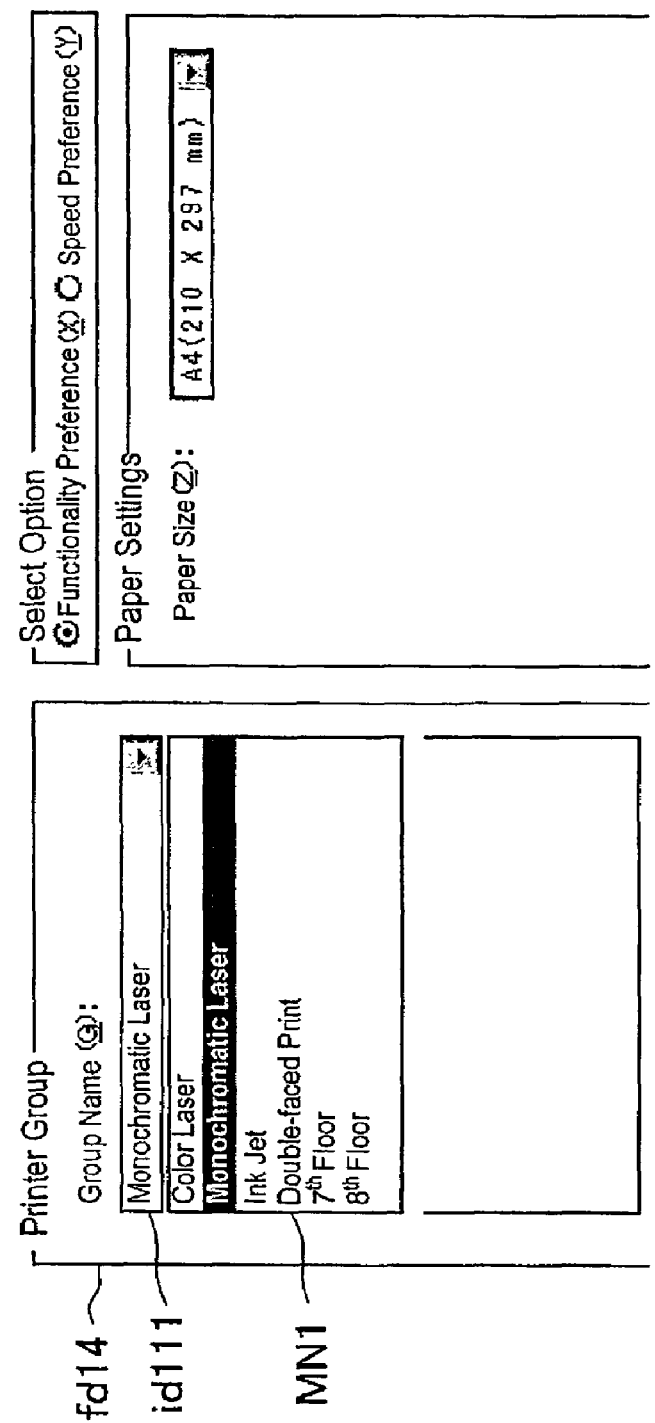
FIG. 31 shows a pull-down menu MN1 used for inputting a group name.

The CPU 30 first opens a pull-down menu MN1 for input of the group name on the CRT display 12 (step S730). FIG. 31 shows an example of the pull-down menu MN1 for input of the group name open on the CRT display 12. As illustrated, the pull-down menu MN1 is open immediately below the 'Group Name' data input box id111. The pull-down menu MN1 includes multiple group names as possible options. The concrete procedure of step S730 specifies the options to be included in the pull-down menu MN1 based on the group registration list data PD stored in the RAM 32 and opens the pull-down menu MN1 on the CRT display 12.

Figure 32:
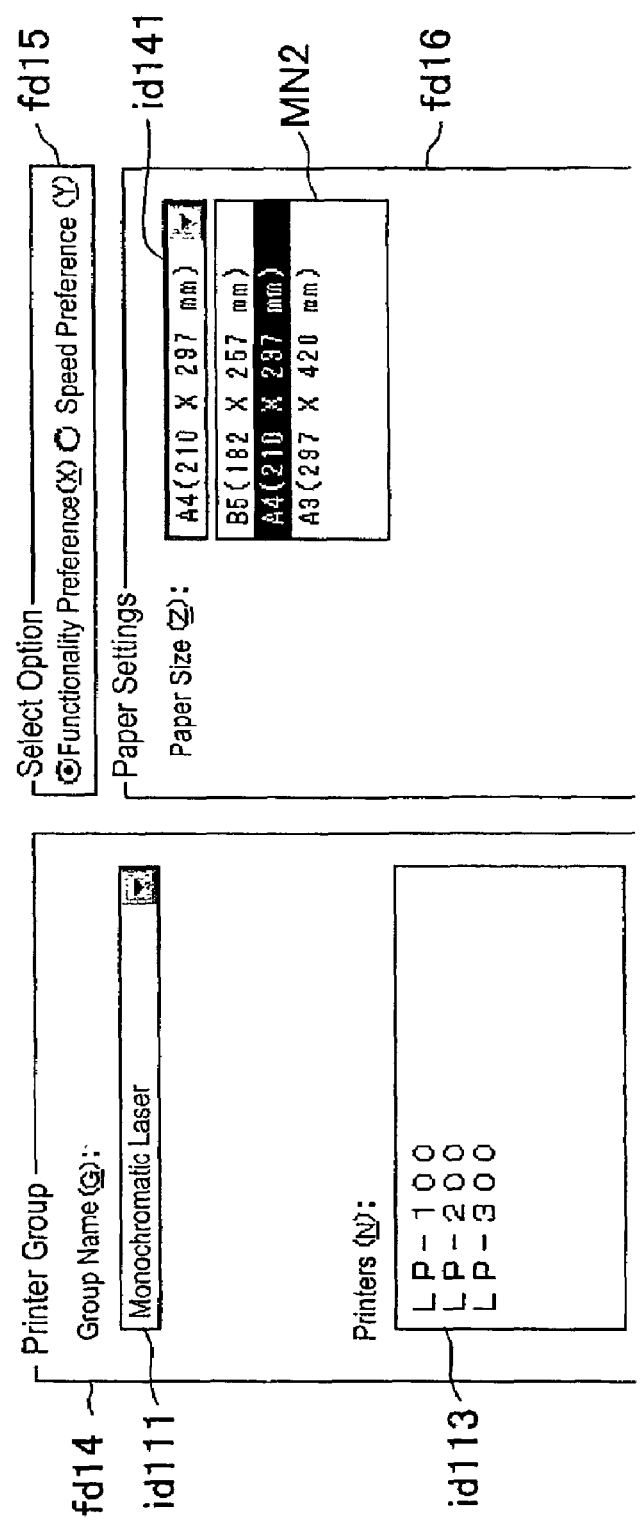
FIG. 32 shows a pull-down menu MN2 used for inputting paper size in a 'Functionality Preference' mode.

The CPU 30 then selects one group name in the pull-down menu MN1 in response to an operator's click with the mouse 20 (step S740). The names of the printers belonging to the group expressed by the selected group name are read from the group registration list data PD stored in the RAM 32, is registered into a temporary area in the RAM 32, and is displayed in the 'Printers' display box id113 on the 'Printer' card CD12 (step S750). As a result, the names of the printers belonging to the group expressed by the group name set in the 'Group Name' data input box id111 are enumerated in the 'Printers' display box id113 as illustrated in FIG. 32.

The CPU 30 subsequently reads the performance information with regard to the printers expressed by the printer names stored in the RAM 32 at step S750 (step S760). Here the performance information includes information with regard to the printable paper sizes, the printable paper types, and permission to double-faced print, and is received from the real printer drivers provided for the respective types of the printers and loaded in advance in the RAM 32. After execution of step S760, the program goes to RETURN and exits from this data input routine.

In a negative answer at step S720, on the other hand, the CPU 30 goes to step S770 in the flowchart of FIG. 30. At step S770, it is determined whether or not a button id141a attached to the 'Paper Size' data input box id141 on the 'Printer' card CD12 is clicked with the mouse 20, based on the input data read at step S710. The following series of processing is carried out in response to the click.

The CPU 30 first detects the printable paper sizes in each printer, based on the performance information of each printer read at step S760 (step S780). The CPU 30 then determines whether or not the 'Functionality Preference' mode is selected in the 'Select Option' field fd15 on the 'Printer' card CD12 (step S790). The determination depends upon selection of either the radio button BT1 corresponding to the 'Functionality Preference' mode or the radio button BT2 corresponding to the 'Speed Preference' mode.

When it is determined at step S790 that the 'Functionality Preference' mode is selected, the CPU 30 selects all the printable paper sizes with any of the printers detected at step S780 (this corresponds to execution of the OR operation) (step S800). For example, when the printable paper sizes with the printers 60 and 70 are 'B5' and 'A4' and the printable paper sizes with the printer 80 are 'B5', 'A4', and 'A3', the procedure of step S800 selects all the paper sizes 'B5, ''A4', and 'A3' as the possible options.

When it is determined at step S790 that not the 'Functionality Preference' mode but the 'Speed Preference' mode is selected, the CPU 30 selects common paper sizes to al the printers among the printable paper sizes in the respective printers detected at step S780 (this corresponds to the AND operation) (step S810). For example, when the printable paper sizes with the printers 60 and 70 are 'B5' and 'A4' and the printable paper sizes with the printer 80 are 'B5', 'A4', and 'A3', the procedure of step S810 selects the paper sizes 'B5' and 'A4' as the possible options.

After execution of either step S800 or step S810, the CPU 30 goes to step S820 to open a pull down menu MN2 for input of the paper size on the CRT display 12. FIG. 32 shows an example of the pull-down menu MN2 for input of the paper size open on the CRT display 12. As illustrated, this pull-down menu MN2 is open immediately below the 'Paper Size' data input box id141. The pull-down menu MN2 includes the paper sizes selected at either step S800 or step S810 as possible options.

As shown in FIG. 32, in the case where the 'Functionality Preference' mode is selected in the 'Select Option' field fd15, the pull-down menu MN2 for input of the paper size includes all the printable paper sizes with any of the printers belonging to the currently selected group (that is, the printers displayed in the 'Printers' display box id113). For example, the paper sizes 'B5', 'A4', and 'A3' are shown as possible options.

Figure 33:
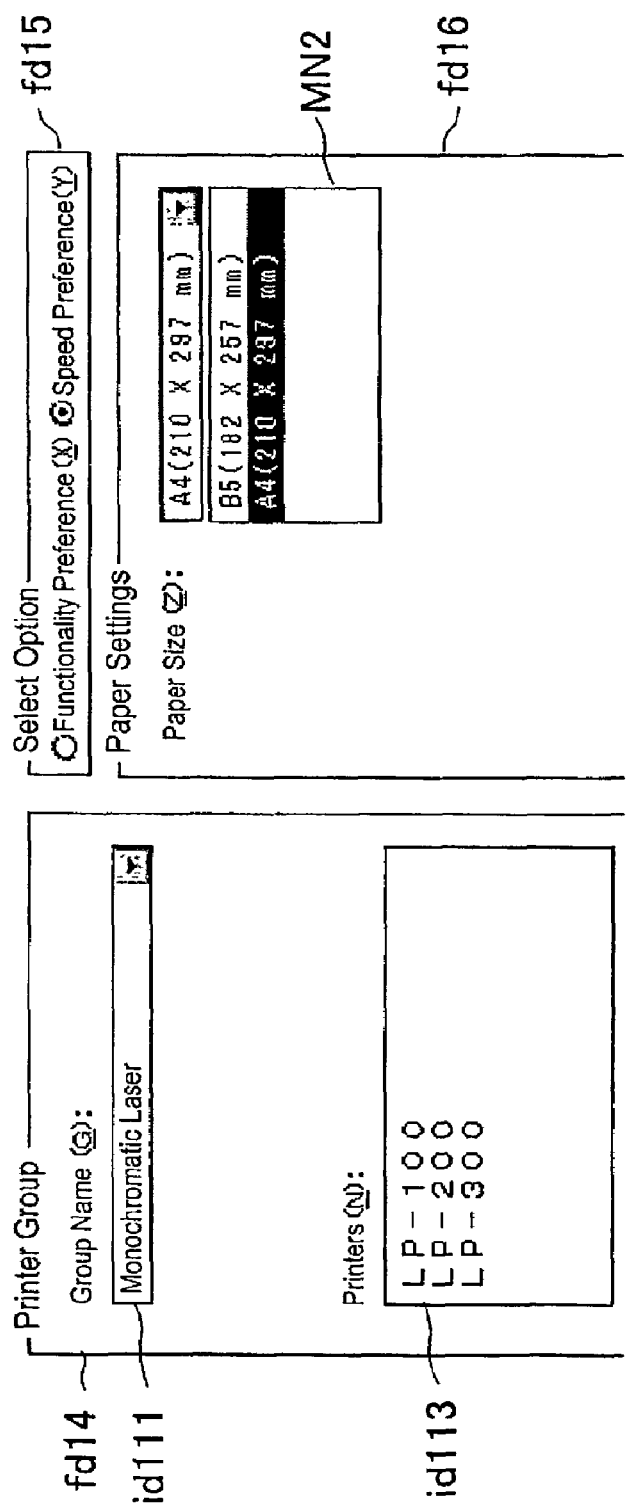
FIG. 33 shows the pull-down menu MN2 used for inputting paper size in a 'Speed Preference' mode.

As shown in FIG. 33, in the case where the 'Speed Preference' mode is selected in the 'Select Option' field fd15, on the other hand, the pull-down menu MN2 for input of the paper size includes the paper sizes common to all the printers among the printable paper sizes in the respective printers belonging to the currently selected group (that is, the printers displayed in the 'Printers' display box id113). For example, the paper sizes 'B5' and 'A4' are shown as possible options.

Comparison between the display in the 'Speed Preference' mode shown in FIG. 33 and the display in the 'Functionality Preference' mode shown in FIG. 32 shows exclusion of the 'A3' paper size from the possible options. One modified procedure of this embodiment may gray down the display of the option to be excluded. The gray-down display means to lower the density of letters in the display and forbids selection with the mouse 20, although the letters are distinguishable. This modified arrangement informs the operator of the non-settable conditions by lack of the functions in some printers.

Referring back to FIG. 30, after execution of step S820, the CPU 30 selects one paper size in the pull-down menu MN2 in response to an operator's click with the mouse 20 (step S830). The selected paper size is set in the 'Paper Size' data input box id141. The setting of the paper size is then registered into the temporary area in the RAM 32 (step S840).

The CPU 30 subsequently compares the paper size registered at step S840 with the paper sizes of the respective printers detected at step S780, selects the printer that is incapable of printing the selected paper size among the printers belonging to the currently selected group, and grays down the display of the selected printer in the 'Printers' display box id113 (step S850).

Figure 34:
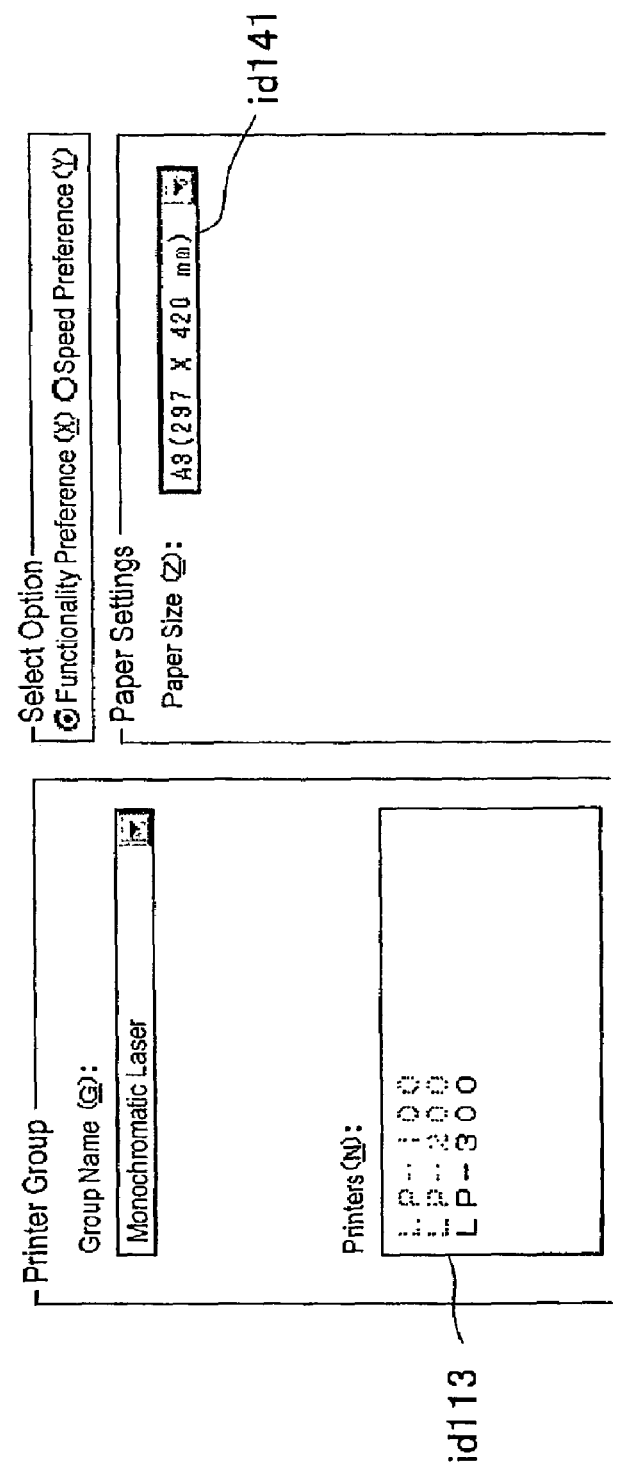
FIG. 34 shows mapping of a 'Paper Size' data input box id141 to a 'Printers' display box id113.

For example, when the 'A3' paper size is set in the 'Paper Size' data input box id141 as shown in FIG. 34, the display of the names of the printers that are incapable of printing the 'A3' paper size, for example, 'LP-100' and 'LP-200', is grayed down among the printer names displayed in the 'Printers' display box id113. The processing of step S840 is carried out only in the 'Functionality Preference' mode. Since only the paper sizes common to all the printers are selected in the 'Speed Preference' mode, the processing of step S840 is not required. This arrangement distinctly informs the operator of the printers that can not be used for distributed printing. After execution of step S850, the program goes to RETURN and exits from this data input routine.

In the case of a negative answer at step S770, on the other hand, the CPU 30 goes to step S860 to input data in another data input box on the 'Printer' card CD12 (step S860). The input data is registered into the temporary area in the RAM 32. The program then goes to RETURN and exits from this data input routine.

The data input routine starts when the processing shifts to step S650 in the distribution information setting routine, and is iteratively carried out in response to each data input in any of the various data input boxes on the 'Printer' card CD12. The data input routine is concluded in response to a click of an 'OK' button BTOK provided at the lower-most position of the 'Distributed Printing Properties' dialog box WN12. After conclusion of the data input routine, the CPU 30 goes to step S660 in the flowchart of FIG. 28 to store the various input data, which have been registered in the temporary area in the RAM 32 according to the data input routine, into the RAM 32 as part of the printer property data. Information regarding the printer group, information regarding the paper settings, and information regarding the basic settings of printing set in the 'Printer' card CD12 are then input into the computer main body 16.

In the structure of the embodiment, the options settable in the 'Paper Size' data input box id141 as one printing condition are restricted according to the performances of the respective printers belonging to the currently selected group. The input in the 'Double-faced Print' data input box id143 is also restricted by a non-illustrated flowchart according to the performances of the respective printers belonging to the currently selected group. In the case where at least one among the printers included in the currently selected group has the function of double-faced printing, data input in the 'Double-faced Print' data input box id143 is permitted (that is, input of either of the two conditions, double-faced print and no double-faced print, as the result of the OR operation of the performance information of the respective printers is allowed) in the 'Functionality Preference' mode. In the 'Speed Preference' mode, on the other hand, data input in the 'Double-faced Print' data input box id143 is prohibited (that is, input of only one condition, no double-faced print, as the result of the AND operation of the performance information of the respective printers is allowed). The concrete procedure activates the 'Double-faced Print' data input box id143 in the 'Functionality Preference' mode, while graying down and inactivating the data input box id143 in the 'Speed Preference' mode.

After setting the various pieces of information relating to the distributed printing in the 'Distributed Printing Properties' dialog box WN12, a print command is output at step S920 in the flowchart of FIG. 26 in response to a click of the 'OK' button id152 in the 'Print' dialog box WN16 as discussed previously. In the case where the 'Properties' button id153 is not clicked but the 'OK' button id152 is clicked immediately with the mouse 20, the printer property data stored in the RAM 32 in the previous cycle of the distribution information setting routine (in the first cycle, preset initial printer property data) are maintained without any modification.

In response to the output of the print command at step S920, the CPU 30 shifts the processing to the virtual printer driver 110 and determines whether or not the print command is input from the application program 100 (step S1010). In the case of no input of the print command, the CPU 30 iteratively carries out the decision at step S1010 and waits for input of the print command from the application program 100. In the case of input of the print command at step S1010, on the other hand, the CPU 30 carries out the series of processing discussed below.

The CPU 30 first reads from the distributed printing utility 120 the performance information of the respective printers 60, 70, and 80, which has been transmitted from the real printer drivers 130, 140, and 150 provided for the respective types of the printers 60, 70, and 80 to the distributed printing utility 120 (step S1020). The CPU 30 then extracts the highest performance out of the performance information of the respective printers 60, 70, and 80 and specifies the extracted highest performance as the performance information of the virtual printer (step S1030). The CPU 30 then transmits the performance information of the virtual printer to the application program 100 (step S1040).

When the performance information of the virtual printer is transmitted from the virtual printer driver 110, the CPU 30 shifts the processing to the application program 100 and receives the transmitted performance information of the virtual printer (step S940). The CPU 30 subsequently converts the video data generated at step S910 into print data adequate for the virtual printer, based on the performance information as well as the information regarding the basic settings of printing and the information regarding the paper settings, which are included in the printer property data stored in the RAM 32 in the distribution information setting routine discussed above (excluding the information regarding the printer group and the distributed form) (step S950). After the data conversion, the CPU 30 transmits the converted print data to the virtual printer driver 110 (step S960). On completion of the processing at step S960, the CPU 30 exits from the processing routine in the application program 100.

When the print data adequate for the virtual printer is transmitted from the application program 100, the CPU 30 shifts the processing to the virtual printer driver 110 and receives the transmitted print data (step S1050). The CPU 30 subsequently outputs the input print data as intermediate print data to the HDD 41 (step S1060). A data set or a set of the intermediate print data is then stored as an intermediate print file MF into the HDD 41. On completion of the processing at step S1060, the CPU 30 exits from the processing routine in the virtual printer driver 110.

After conclusion of the processing routine in the virtual printer driver, the distributed printing utility is activated, which is identical with that of the first embodiment (see FIGS. 15 and 16) as mentioned above. The series of distributed printing process executed in the distributed printing utility is identical with that of the first embodiment shown in FIG. 20.

B3. Effects of Embodiment

In the second embodiment constructed as discussed above, the paper size condition set in the data input box id141 'Paper Size' in the 'Printer' card CD12 is restricted by the performances of the respective printers belonging to the currently selected group. Namely the paper size condition set in the data input box id141 follows the performance information of the respective printers This ensures the adequate paper size condition and enables the distributed printing to be performed according to the performances of the printers, thus effectively assuring favorable resulting prints.

In the structure of the embodiment, in the case of selection of the 'Functionality Preference' mode, a set of all the printable paper sizes with any of the printers belonging to the currently selected group is displayed as options in the pull-down menu MN2 for input of the paper size. In the case of selection of the 'Speed Preference' mode, on the other hand, a set of common paper sizes to all the printers among the printable paper sizes in the respective printers belonging to the currently selected group is displayed as options in the pull-down menu MN2 for input of the paper size. In the 'Functionality Preference' mode, the printing operation utilizes the performance of any of the multiple printers specified as the destinations of distribution. This ensures the high-performance printing. In the 'Speed Preference' mode, the printing operation utilizes the performance common to all the multiple printers specified as the destinations of distribution. This allows the printing operation to be performed with any of the multiple printers, thus desirably shortening the total time required for printing.

In the structure of this embodiment, the mode is changed over between the 'Functionality Preference' mode and the 'Speed Preference' mode by selecting either of the radio buttons BT1 and BT2 on the 'Printer' card CD12 displayed on the CRT display 12. The operator can thus freely select the priority of functionality or the priority of speed. This arrangement effectively ensures the excellent operatability.

In this embodiment, the radio buttons BT1 and BT2 are specifically provided for changing over the mode. One possible modification may change over the mode between the 'Functionality Preference' mode and the 'Speed Preference' mode according to the input data in an existing data input box. For example, the process sets the 'Functionality Preference' mode in response to selection of 'Fast' in the 'Resolution' data input box id146, while setting the 'Speed Preference' mode in response to selection of 'Fine'.

In this embodiment, a plurality of printers as destinations of distribution are specified by the unit of a group in the 'Group Name' data input box id111. This arrangement does not require individual specification of each printer as a destination of distribution, thus enhancing the user's operatability. Allocation of the order of priority to the printers belonging to the selected group enhances the convenience of collection of the resulting prints.

Some examples of possible modification are given below.

(1) In the structure of the above embodiment, the 'Printers' display box id113 only shows the names of the printers belonging to the currently selected group in the 'Group Name' data input box id111. One possible modification provides check boxes cbx before the respective printer names as shown in FIG. 35. In response to setting a selected group name in the 'Group Name' data input box id111, the names of all the printers belonging to the selected group are shown in the 'Printers' display box id113. In the initial state, the check boxes cbx provided before the respective printer names are all checked. When the operator desires to prohibit output of the print data to a certain printer because of out-of-paper, failure, or any other reason, the operator releases the check in the corresponding check box cbx to exclude the printer from the output resource of the print data. This arrangement effectively ensures the excellent operatability.

Figure 36:
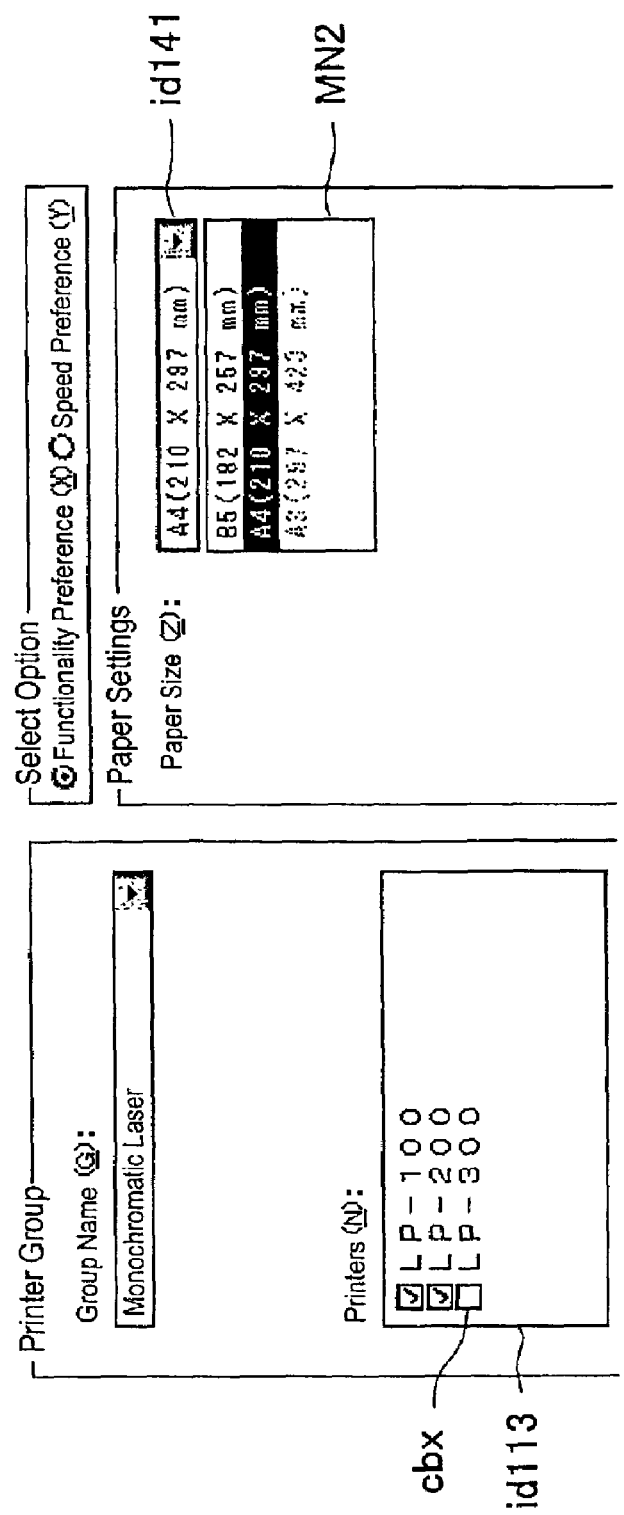
FIG. 36 shows a pull-down menu MN2 used for inputting paper size in the modified example of the present invention.

In this modified structure, the options included in the pull-down menu MN2 for input of the paper size, which is open in the 'Paper Size' data input box id141, depend upon the printers having checks in the corresponding check boxes cbx. For example, when the check box cbx 'LP-300' is inactivated to exclude the printer that is capable of printing the 'A3' paper size from the output resources of the print data as shown in FIG. 36, in the 'Functionality Preference' mode, the option 'A3' is grayed down to be not selectable in the pull-down menu MN2 for input of the paper size.

(2) In the above embodiment, the paper size is discussed as the predetermined condition relating to the printing performance of the printer. The predetermined condition is, however, not restricted to the paper size, but may be any other suitable conditions relating to the printing performance, for example, data input in the respective data input boxes id143, id144, id145, and id146 'Double-faced Print', 'Paper Type', 'Color', and 'Resolution'.

(3) In the distributed printing control apparatus of the above embodiment according to the present invention, print data is directly output from one computer 10 to the multiple printers 60, 70, and 80. Another possible application is a client-server system, in which a server may be provided on the computer network 90 to manage distributed printing with multiple printers. In this application, the virtual printer driver is incorporated in each client, and the distributed printing utility is incorporated in the server.

C. Third Embodiment

C1. Distributed Printing Process

The following describes a third embodiment of the present invention. The details of 'A1. General Hardware Structure', 'A2. Distributed Printing Process', 'A3. Virtual Printer Driver', and 'A4. User Interface' discussed in the first embodiment are adopted in the third embodiment of the present invention. The same parts as those of the first embodiment are expressed by the same numerals. The third embodiment has unique characteristics in the 'Distributed Printing Process'.

Figure 37:
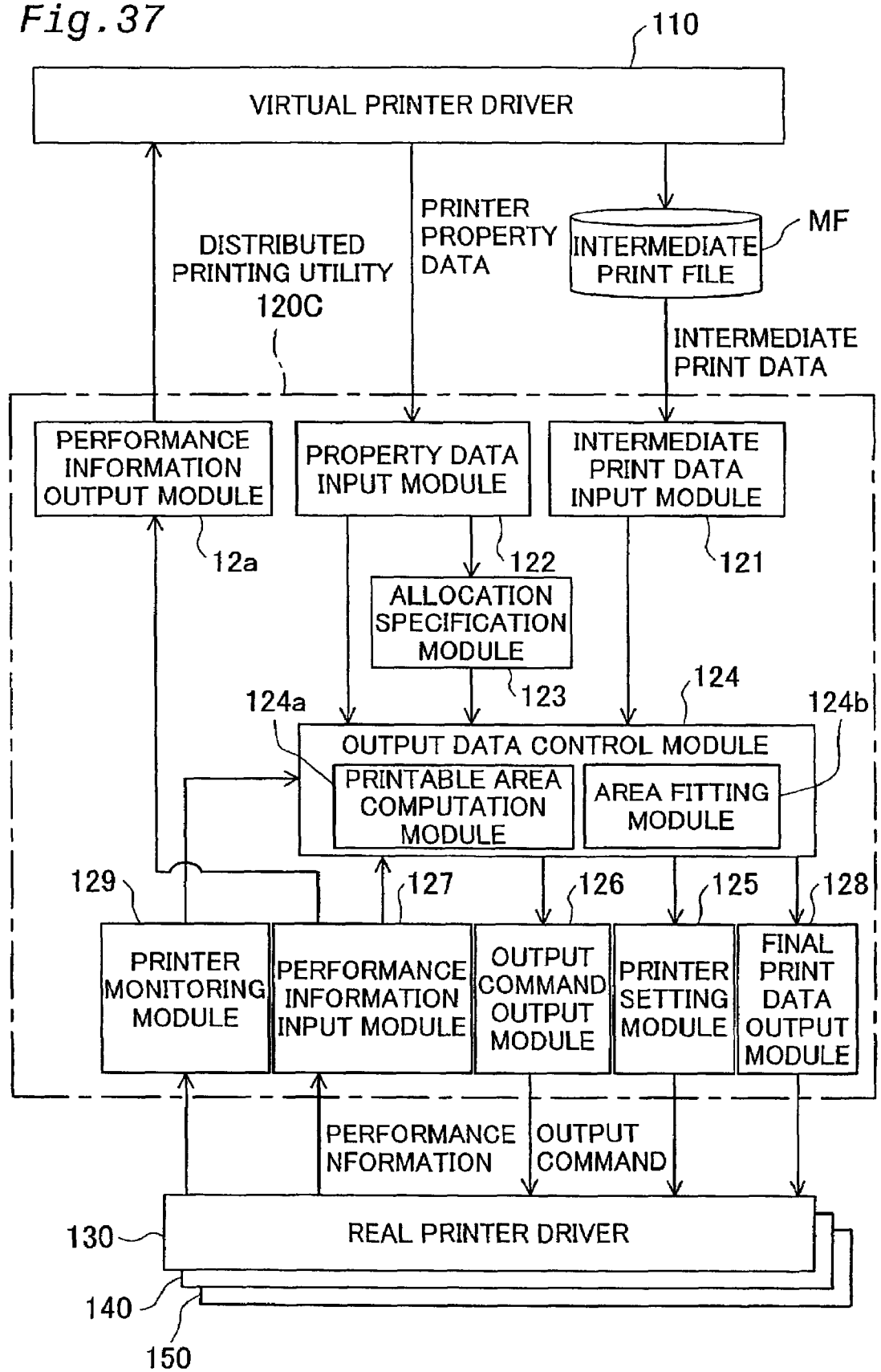
FIG. 37 is a block diagram showing the functions of a distributed printing utility 120C in a third embodiment of the present invention.

FIG. 37 is a block diagram showing the functions of a distributed printing utility 120C in the third embodiment. As illustrated, the distributed printing utility 120C includes an intermediate print data input module 121, a property data input module 122, an allocation specification module 123, an output data control module 124, a printer setting module 125, an output command output module 126, a performance information input module 127, a final print data output module 128, a printer monitoring module 129, and a performance information output module 12a, which exert the same functions as those of the corresponding elements in the distributed printing utility 120 of the first embodiment. The output data control module 124 of this embodiment exerts the same functions as those of the output data control module 124 of the first embodiment, as well as the functions of a printable area computation module 124a and an area fitting module 124b.

Prior to description of the modules 124a and 124b, the performance information transmitted from the real printer drivers 130, 140, and 150 is discussed. The performance information represents the performances of the printers 60, 70, and 80 corresponding to the real printer drivers 130, 140, and 150 as discussed above, and includes information on the printable paper sizes, the unprintable area size representing an unprintable area in the whole paper area, and permission to double-faced print. The unprintable area size is set for four directions, top, bottom, left, and right sides of paper. In general, each printer has an unprintable area, where printing is not allowable because of various reasons, for example, a sheet feed roller slips out of the end of paper. The size of the unprintable area depends upon the type of the respective printers 60, 70, and 80. The performance information input module 127 receives such various pieces of information from the real printer drivers 130, 140, and 150.

The printable area computation module 124a specifies a printable area with any of the printers 60, 70, and 80 specified as the destinations of allocation (hereinafter referred to as the common printable area), based on the value of the unprintable area size out of the performance information input into the performance information input module 127. The area fitting module 124b restricts the printing area of the intermediate print data into the common printable area, in the case where the printing area defined by the intermediate print data is partly out of the common printable area computed by the printable area computation module 124a in the process of data conversion of the intermediate print data to data suitable for each of the printers 60, 70, and 80. The converted print data output from the output data control module 124 having the above functions is transmitted as final print data to the real printer drivers 130, 140, and 150 via the final print data output module 128.

C2. Computer Programs

Like the first embodiment, the computer programs are executed in the virtual printer driver 110 and the distributed printing utility 120C in the third embodiment. The virtual printer driver 110 of the third embodiment is identical with that of the first embodiment and is thus not specifically described here. The following describes the distributed printing utility 120C.

Like the virtual printer driver 110, the distributed printing utility 120C is stored in advance in the floppy disk 22 and is installed from the floppy disk drive 24 into the computer 10 according to an activated preset installation program. The installed distributed printing utility 120 is stored in the HDD 41, is incorporated into the operating system in response to power supply to the computer 10, and is loaded to a predetermined area in the RAM 32. Like the virtual printer driver 110, the distributed printing utility 120 may be stored in another portable recording medium (carriable recording medium), such as a CD-ROM, a magneto-optic disc, or an IC card, in place of the floppy disk 22. The distributed printing utility 120 may be program data, which are downloaded from a specific server connecting with an external computer network (for example, the Internet) via the computer network and transferred to either the RAM 32 or the HDD 41.

Figure 38:
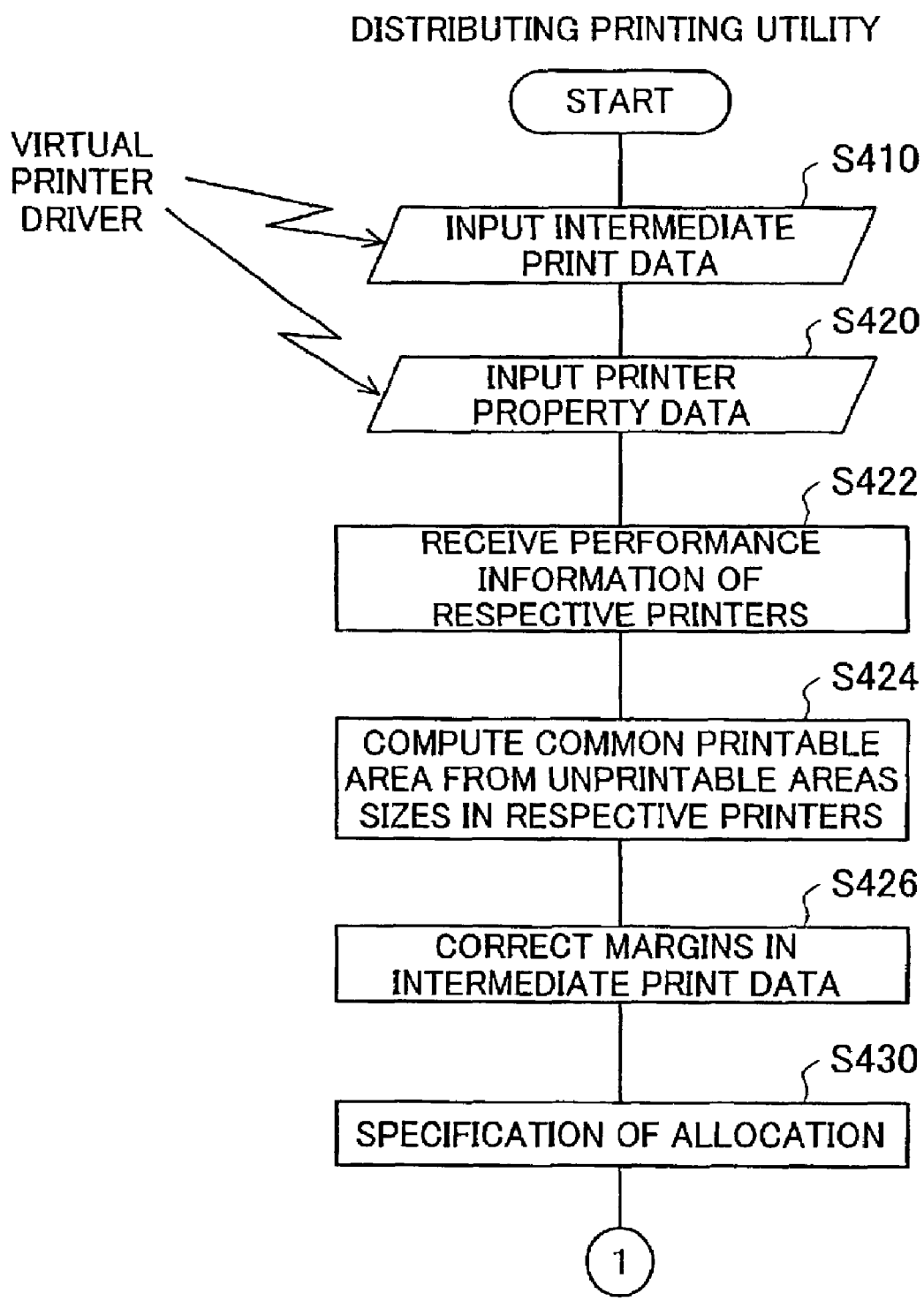
FIG. 38 is a flowchart showing a first half of a processing routine described in the distributed printing utility 120.

FIG. 38 is a flowchart showing a first half of a processing routine described in the distributed printing utility 120. This processing routine is activated after conclusion of the processing routine executed in the virtual printer driver 110. When the program enters the processing routine, as shown in FIG. 38, the CPU 30 first inputs the intermediate print data in the intermediate print file MF from the HDD 41 (step S410). The CPU 30 then inputs the printer property data as the various pieces of information set in the virtual printer driver 110 (step S420). The processes of steps S410 and S420 are identical with those of the first embodiment and are thus expressed by the same step numbers.

The CPU 30 subsequently sends a control signal to the real printer drivers 130, 140, and 150 of the respective printers 60, 70, and 80 and receives the performance information regarding the performances of the printers 60, 70, and 80 from the respective real printer drivers 130, 140, and 150 that have received the control signal (step S422). The CPU 30 then extracts data on the unprintable area size on the top, bottom, left, and right sides of the whole paper area in the respective printers from the performance information and computes a common printable area with any of the printers 60, 70, and 80 specified as the destinations of distribution from the data on the unprintable area size (step S424).

Figure 39:
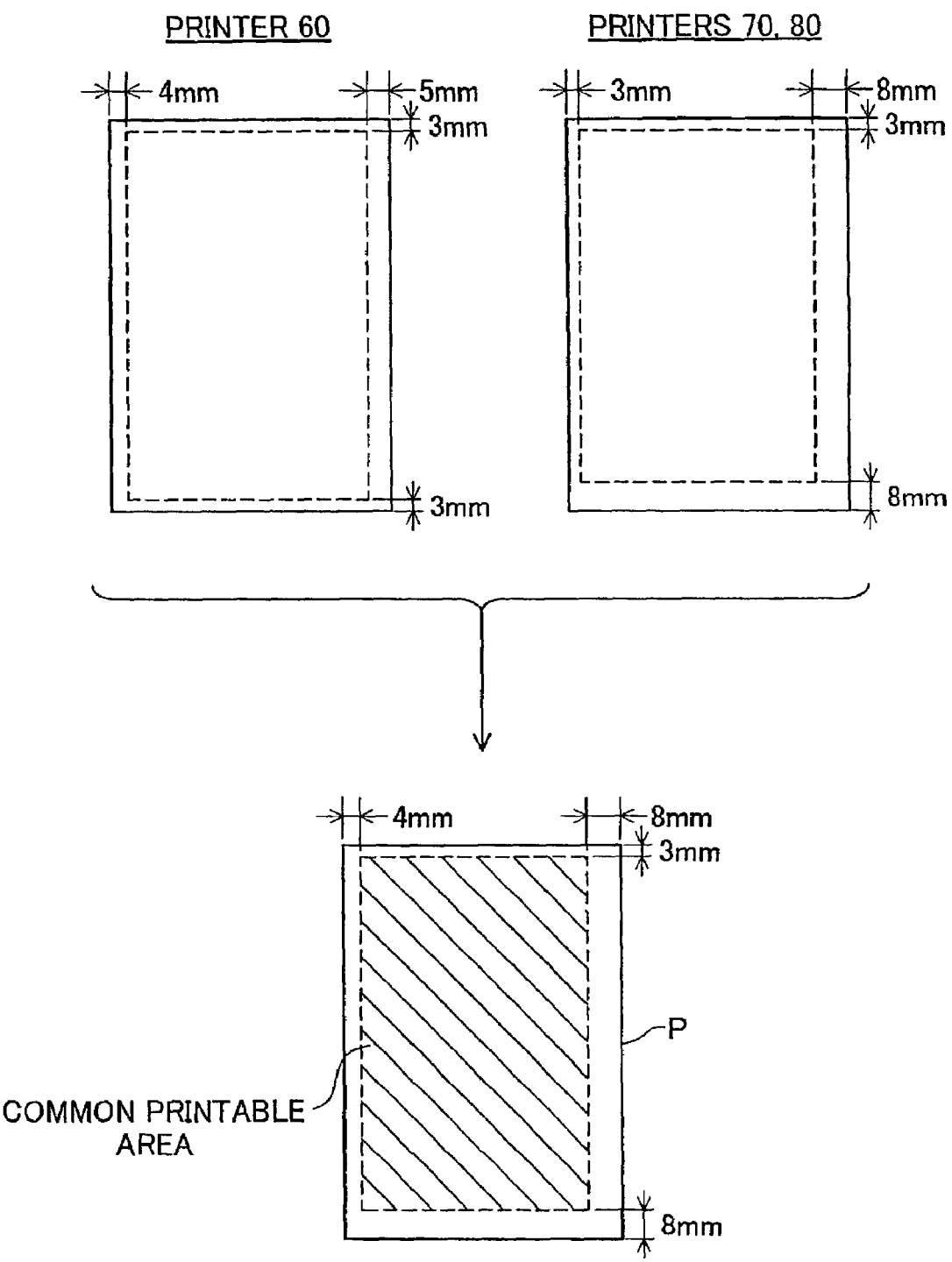
FIG. 39 shows a process of computing a common printable area in a whole paper area P.

The computation carries out comparison among the unprintable area sizes on the top, bottom, left, and right sides of the whole paper area in the respective printers 60, 70, and 80, defines a common unprintable area by the respective largest values, and specifies an area in the whole paper area excluding this common unprintable area as the common printable area. FIG. 39 shows a process of such computation. For example, when the unprintable area size of the printer 60 is left=4 mm, right=5 mm, top=3 mm, and bottom=3 mm and the unprintable are size of the printers 70 and 80 is left=3 mm, right=8 mm, top=3 mm, and bottom=8 mm, the size of the common unprintable area is left=4 mm, right=8 mm, top=3 mm, and bottom=8 mm. The area in the paper area P excluding this common unprintable area (that is, the hatched area in the illustration) is specified as the common printable area. This step S424 corresponds to the printable area computation module 124a discussed above.

The CPU 30 then corrects the margins defined by the intermediate print data based on the common printable area computed at step S424 (step S426). Here the margins represent the sizes of the top, bottom, left, and right spaces specified by the operator in the 'Page Settings' dialog box in the process of generating the print data by the application program 100. When any of the margins is out of the common printable area, the procedure of step S426 restricts the margins to values coincident with the common printable area. For example, when the common printable area has the size shown in FIG. 14 and the top, bottom, left, and right margins set by the application program are all equal to 5 mm, the top, bottom, left, and right margins are corrected to 5 mm, 8 mm, 5 mm, and 8 mm. This step S426 corresponds to the area fitting module 124b discussed above.

The CPU 30 subsequently specifies allocation of the intermediate print data, which has been subjected to the margin correction at step S426, based on the information with regard to the printer group and the information with regard to the distributed form included in the printer property data input at step S420 (step S430). This process specifies allocation of the respective pages included in the intermediate print data to the printers 60, 70, and 80 belonging to the selected printer group. The concrete procedure of step S430 specifies allocation of the respective pages of the intermediate print data to the printers 60, 70, and 80, in order to attain the distributed form set in the 'Distributed Printing Properties' dialog box WN2 (that is, the distributed form displayed in the distributed form display box dd of the 'Distribution Settings' card CD1 shown in FIG. 10). Information regarding the preset pages allocated to the respective printers is stored as output resource list data into the RAM 32.

FIG. 40 shows an example of the output resource list data. In the illustrated example, the print job is given to make each of the three printers 60, 70, and 80 print one copy of a document including 3 pages. The $1^{st}$ to the $3^{rd}$ pages are set as the page numbers to be printed with each of the three printers 60, 70, and 80. The process of step S430 is identical with that of the first embodiment and is thus expressed by the same step number.

When allocation of the respective pages to the output resources is specified at step S430, the program goes to a latter half of the processing routine to implement the actual printing operation according to the specified allocation. The latter half follows the processing of steps S440 to S550 of the first embodiment shown in FIG. 16.

In the third embodiment, the process of step S500 shown in FIG. 16 extracts page data representing the page specified by the value of the page counter C2 from the intermediate print data, which has been input at step S410 and subjected to the margin correction at step S426, and converts the extracted page data into data suitable for the printer 60 (70 or 80) specified by the value of the printer counter C1, based on the performance information as well as the information regarding the basic settings of printing and the information regarding the paper settings, so as to generate the final print data. The margin correction of the intermediate print data at step S426 effectively restricts the printing area in each page of the final print data generated at step S500 into the common printable area to all the printers 60, 70, and 80.

The series of distributed printing process executed in the distributed printing utility 120C follows the process of the first embodiment shown in FIG. 20.

C3. Effects of Embodiment

The procedure of the third embodiment receives information on the unprintable area size, which represents an unprintable area in the whole paper area, in each of the multiple printers 60, 70, and 80 specified as the destinations of distribution, and computes a common printable area in the whole paper area with any of the printers 60, 70, and 80 from the information on the unprintable area size. The print data from the application program is then distributed and output to satisfy the condition of the common printable area. The print data accordingly occupies an identical printing area in any of the multiple printers 60, 70, and 80 specified as the destinations of distribution. The user can thus obtain resulting prints having the perfectly coincident size and position of the printing area from the multiple printers 60, 70, and 80 specified as the destinations of distribution.

The procedure of this embodiment makes the print data fit for the common printable area by simply correcting margins specified in the application program based on the common printable area. This effectively simplifies the configuration of the computer programs.

In the structure of the embodiment, the information on the unprintable area size is input from the printer drivers provided for the respective printers 60, 70, and 80. This facilitates input of the information without requiring any specific input means.

In the structure of this embodiment, when any error arises in one of the printers specified for distributed printing, another printer is used for recovery. The common printable area is also allocated to the printer specified as the recovery resource. Namely the user can obtain resulting prints having the perfectly coincident size and position of the printing area from all the printers including the printer specified as the recovery resource.

Some examples of possible modification are discussed below.

(1) The procedure of the above embodiment receives the information on the unprintable area size in the whole paper area from the multiple printers specified as the destinations of distribution and computes the common printable area to all the printers from the input information. One possible modification may receive information on the printable area and compute the common printable area from the input information. This arrangement is allowed since the printable area is complement of the unprintable area.

(2) The procedure of this embodiment makes the print data fit for the common printable area by simply correcting margins specified in the application program based on the common printable area. One possible application may carry out data conversion to restrict the printing area of each page in the final print data into the common printable area in the processing of step S500, that is, in the rendering process that generates final print data with the real printer drivers 130, 140, and 150.

(3) In the distributed printing control apparatus of the above embodiment according to the present invention, print data is directly output from one computer 10 to the multiple printers 60, 70, and 80. Another possible application is a client-server system, in which a server may be provided on the computer network 90 to manage distributed printing with multiple printers. In this application, the virtual printer driver is incorporated in each client, and the distributed printing utility is incorporated in the server.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

INDUSTRIAL APPLICABILITY

The technique of the present invention is applicable to diverse information processing apparatuses like various computers connectable with a plurality of printers.

What is claimed is:

1. A distributed printing control apparatus that controls distributed printing, comprising:
   a printer specification module that specifies multiple printers as destinations of distribution;
   a distributive output module that outputs print data, which is an object to be printed, to the multiple printers specified by said printer specification module in a distributive manner;
   a condition setting module that causes a data input box for setting a predetermined condition relating to a printing performance of each printer to be displayed on a display device, receives input data into the data input box from an input device, and sets the predetermined condition based on the input data;
   a printer performance information collection module that collects performance information with regard to the predetermined condition from each of the multiple printers specified by said printer specification module; and
   a data input restriction module that restricts the input data in the data input box according to the performance information of each printer collected by said printer performance information collection module, said data input restriction module specifying a set of performance information, which includes all the performance information of the respective printers collected by said printer performance information collection module, and restricting the input data in the data input box within a range of the specified set of performance information.

2. A distributed printing control apparatus in accordance with claim 1, wherein said data input restriction module specifies a set of common performance information, which is common to all the performance information of the respective printers collected by said printer performance information collection module, and restricts the input data in the data input box within a range of the specified set of common performance information.

3. A distributed printing control apparatus in accordance with claim 1, wherein said data input restriction module comprises:
   a mode changeover module that selectively changes over a working mode between a first mode and a second mode, the first mode specifying a set of performance information, which includes all the performance information of the respective printers collected by said printer performance information collection module, and restricting the input data in the data input box within a range of the specified set of performance information, the second mode specifying a set of common performance information, which is common to all the performance information of the respective printers collected by said printer performance information collection module, and restricting the input data in the data input box within a range of the specified set of common performance information.

4. A distributed printing control apparatus in accordance with claim 3, wherein said mode changeover module comprises:
   a module that displays a switch for the mode changeover on said display device, receives input data for operating the switch from said input device, and gives an instruction to change over the working mode based on the input data.

5. A distributed printing control apparatus in accordance with claim 1, wherein said condition setting module displays an option display box showing options possibly input in the data input box, together with the data input box, and sets one option selected among the options and specified from said input device as the predetermined condition, and
   said data input restriction module prohibits at least part of the options included in the option display box from being specified from said input device, so as to restrict the input data in the data input box.

6. A distributed printing control apparatus in accordance with claim 1, said distributed printing control apparatus further comprising:
   a group mapping module that maps a plurality of printers to each group,
   wherein said printer specification module specifies the multiple printers by a unit of group mapped by said group mapping module.

7. A distributed printing control apparatus in accordance with claim 1, wherein said printer specification module comprises a name display control module that displays names assigned to the specified multiple printers on said display device.

8. A distributed printing control apparatus in accordance with claim 7, wherein said printer specification module comprises an input control module that displays switches, which correspond to the respective printer names displayed by said name display control module and are operated to exclude the corresponding printers from the destinations of distribution, and receives operation data of the switches from said input device, and
   said distributive output module comprises an output resource exclusion module that excludes a printer, which is determined that the corresponding switch has been operated based on the operation data received by said input control module, from an output resource of the print data.

9. A distributed printing control apparatus in accordance with claim 1, wherein said printer specification module comprises:
   a priority order specification module that specifies an order of priority allocated to the specified multiple printers, and
   said distributive output module carries out the distributive output by taking into account the order of priority specified by said priority order specification module.

10. A distributed printing control apparatus in accordance with claim 1, said distributed printing control apparatus further comprising:
   a performance decision module that determines whether or not each of the multiple printers specified by said printer specification module has a printing performance represented by the predetermined condition set by said condition setting module,
   wherein said distributive output module comprises an output resource exclusion module that excludes a printer, which has been determined by said performance decision module not to have the printing performance, from an output resource of the print data.

11. A distributed printing control apparatus in accordance with claim 10, wherein said printer specification module comprises a name display control module that displays names of the specified multiple printers on said display device, and said name display control module comprises a module that prohibits distinctive display of the name of the printer, which is excluded by said output resource exclusion module.

12. A distributed printing control apparatus in accordance with claim 1, wherein said printer performance information collection module receives information regarding performances of the multiple printers from printer drivers provided for respective types of the multiple printers and collects the performance information with regard to the predetermined condition from the received information.

13. A distributed printing control method that controls distributed printing and comprises the steps of:
 (a) specifying multiple printers as destinations of distribution;
 (b) outputting print data, which is an object to be printed, to the multiple printers specified in said step (a) in a distributive manner,
 (c) causing a data input box for setting a predetermined condition relating to a printing performance of each printer to be displayed on a display device, receiving input data into the data input box from an input device, and setting the predetermined condition based on the input data;
 (d) collecting performance information with regard to the predetermined condition from each of the multiple printers specified in said step (a); and
 (e) restricting the input data in the data input box according to the performance information of each printer collected in said step (d),
 wherein said step (e) specifies a set of performance information, which includes all the performance information of the respective printers collected in said step (d), and restricts the input data in the data input box within a range of the specified set of performance information.

14. A distributed printing control method in accordance with claim 13, wherein said step (e) specifies a set of common performance information, which is common to all the performance information of the respective printers collected in said step (d), and restricts the input data in the data input box within a range of the specified set of common performance information.

15. A distributed printing control method that specifies multiple printers as destinations of distribution and outputs print data, which is an object to be printed, to the specified multiple printers in a distributive manner, thus controlling distributed printing, said distributed printing control method comprising steps corresponding to the modules included in a distributed printing control apparatus in accordance with claim 3.

16. A computer readable recording medium in which a computer program for controlling distributed printing is recorded, said computer program including program instructions for causing a computer to perform the functions of:
 (a) specifying multiple printers as destinations of distribution;
 (b) outputting print data, which is an object to be printed, to the multiple printers specified by said function (a) in a distributive manner,
 (c) causing a data input box for setting a predetermined condition relating to a printing performance of each printer to be displayed on a display device, receiving input data into the data input box from an input device, and setting the predetermined condition based on the input data;
 (d) collecting performance information with regard to the predetermined condition from each of the multiple printers specified by said function (a); and
 (e) restricting the input data in the data input box according to the performance information of each printer collected by said function (d),
 wherein said function (e) specifies a set of performance information, which includes all the performance information of the respective printers collected by said function (d), and restricts the input data in the data input box within a range of the specified set of performance information.

17. A computer readable recording medium in accordance with claim 16, wherein said function (e) specifies a set of common performance information, which is common to all the performance information of the respective printers collected by said function (d), and restricts the input data in the data input box within a range of the specified set of common performance information.

18. A computer readable recording medium in accordance with claim 16, wherein said function (e) comprises the function of:
 (e-1) selectively changing over a working mode between a first mode and a second mode, the first mode specifying a set of performance information, which includes all the performance information of the respective printers collected by said function (d), and restricting the input data in the data input box within a range of the specified set of performance information, the second mode specifying a set of common performance information, which is common to all the performance information of the respective printers collected by said function (d), and restricting the input data in the data input box within a range of the specified set of common performance information.

19. A computer readable recording medium in accordance with claim 18, wherein said function (e-1) comprises the function of:
 displaying a switch for the mode changeover on said display device, receiving input data for operating the switch from said input device, and giving an instruction to change over the working mode based on the input data.

20. A computer readable recording medium in accordance with claim 16, wherein said function (c) displays an option display box showing options possibly input in the data input box, together with the data input box, and sets one option selected among the options and specified from said input device as the predetermined condition, and said function (e) prohibits at least part of the options included in the option display box from being specified from said input device, so as to restrict the input data in the data input box.

21. A computer readable recording medium in accordance with claim 16, wherein said computer program further causes the computer to attain the function of:
(f) mapping a plurality of printers to each group,
wherein said function (a) specifies the multiple printers by a unit of group mapped by said function (f).

22. A computer readable recording medium in accordance with claim 16, wherein said function (a) comprises the function of:
(a-1) displaying names assigned to the specified multiple printers on said display device.

23. A computer readable recording medium in accordance with claim 22, wherein said function (a) comprises the function of:
(a-2) displaying switches, which correspond to the respective printer names displayed by said function (a-1) and are operated to exclude the corresponding printers from the destinations of distribution, and receiving operation data of the switches from said input device, and
said function (b) comprises the function of:
excluding a printer, which is determined that the corresponding switch has been operated based on the operation data received by said function (a-2), from an output resource of the print data.

24. A computer readable recording medium in accordance with claim 23, wherein said function (a) comprises the function of:
(a-3) specifying an order of priority allocated to the specified multiple printers, and said function (b) carries out the distributive output by taking into account the order of priority specified by said function (a-3).

25. A computer readable recording medium in accordance with claim 16, wherein said computer program further causes the computer to attain the function of:
(g) determining whether or not each of the multiple printers specified by said printer specification function has a printing performance represented by the predetermined condition set by said function (c),
said function (b) comprises the function of:
excluding a printer, which has been determined by said function (g) not to have the printing performance, from an output resource of the print data.

26. A computer readable recording medium in accordance with claim 25, wherein said function (a) comprises the function of:
(h) displaying names of the specified multiple printers on said display device, and
said function (h) comprises the function of:
prohibiting distinctive display of the name of the printer, which is excluded by said output resource exclusion function.

27. A computer readable recording medium in accordance with claim 16, wherein said function (d) receives information regarding performances of the multiple printers from printer drivers provided for respective types of the multiple printers and collects the performance information with regard to the predetermined condition from the received information.

28. A distributed printing control apparatus, comprising:
a first setting module that specifies multiple printers as destinations of distribution;
a second setting module that sets paper information with regard to paper used for printing; and
a distribution control module that processes externally input print data based on the specification by said first setting module and the setting by said second setting module and outputs plural divisions of the print data, which satisfy the paper information, to the multiple printers specified as the destinations of distribution,
said distributed printing control apparatus supplying the plural divisions of the print data output from said distribution control module to the multiple printers via printer drivers provided for the respective printers,
said distributed printing control apparatus further comprising:
an information input module that receives information with regard to an unprintable area included in a paper area in each of the multiple printers specified by said first setting module; and
a printable area computation module that computes a printable area in the paper area, which is printable with any of the multiple printers, from the information of the respective printers received by said information input module,
wherein said distribution control module comprises:
an area fitting module that causes the plural divisions of the print data to be fit to the printable area computed by said printable area computation module.

29. A distributed printing control apparatus in accordance with claim 28, wherein said area fitting module comprises a margin correction module that corrects margins on each sheet of paper defined by the print data, based on the printable area computed by said printable area computation module.

30. A distributed printing control apparatus in accordance with claim 28, wherein said information input module receives the information from the printer drivers provided for the respective printers.

31. A distributed printing control apparatus in accordance with claim 28, wherein the multiple printers are connected via a computer network.

32. A distributed printing control method, comprising the steps of:
(a) specifying multiple printers as destinations of distribution;
(b) setting paper information with regard to paper used for printing; and
(c) processing externally input print data based on the specification by said step (a) and the setting by said step (b) and outputting plural divisions of the print data, which satisfy the paper information, to the multiple printers specified as the destinations of distribution,
said distributed printing control method supplying the plural divisions of the print data output in said step (c) to the multiple printers via printer drivers provided for the respective printers,
said distributed printing control method further comprising the steps of:
(d) receiving information with regard to an unprintable area included in a paper area in each of the multiple printers specified by said step (a); and
(e) computing a printable area in the paper area, which is printable with any of the multiple printers, from the information of the respective printers received in said step (d),
wherein said step (c) comprises the step of:
(c1) causing the plural divisions of the print data to be fit to the printable area computed in said step (e).

33. A distributed printing control method in accordance with claim 32, wherein said step (c1) comprises the step of:
correcting margins on each sheet of paper defined by the print data, based on the printable area computed in said step (e).

34. A distributed printing control method in accordance with claim 32, wherein said step (b) receives the information from the printer drivers provided for the respective printers.

35. A computer readable recording medium in which a computer program is recorded, said computer program including program instructions for causing a computer to perform the functions of:
- (a) specifying multiple printers as destinations of distribution;
- (b) setting paper information with regard to paper used for printing; and
- (c) processing externally input print data based on the specification by said function (a) and the setting by said function (b) and outputting plural divisions of the print data, which satisfy the paper information, to the multiple printers specified as the destinations of distribution, wherein the plural divisions of the print data output by said function (c) are supplied to the multiple printers via printer drivers provided for the respective printers, said computer program further including program instructions for causing the computer to perform the functions of:
- (d) receiving information with regard to an unprintable area included in a paper area in each of the multiple printers specified by said function (a); and
- (e) computing a printable area in the paper area, which is printable with any of the multiple printers, from the information of the respective printers received by said function (d), wherein said function (c) comprises the function of:
- (c1) causing the plural divisions of the print data to be fit to the printable area computed in said step (e).

36. A computer readable recording medium in accordance with claim 35, wherein said function (c1) comprises the function of:
correcting margins on each sheet of paper defined by the print data, based on the printable area computed by said function (e).

37. A computer readable recording medium in accordance with claim 35, wherein said function (b) receives the information from the printer drivers provided for the respective printers.

* * * * *